US012665243B2

(12) United States Patent
Dong et al.

(10) Patent No.: US 12,665,243 B2
(45) Date of Patent: Jun. 23, 2026

(54) BATTERY

(71) Applicant: Ningde Amperex Technology Limited, Ningde (CN)

(72) Inventors: Yuyang Dong, Ningde (CN); Dongyang Yan, Ningde (CN); Qiao Zeng, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 794 days.

(21) Appl. No.: 17/957,223

(22) Filed: Sep. 30, 2022

(65) Prior Publication Data

US 2023/0037223 A1    Feb. 2, 2023

Related U.S. Application Data

(63) Continuation of application No. PCT/CN2020/130646, filed on Nov. 20, 2020.

(30) Foreign Application Priority Data

Mar. 31, 2020    (WO) ................ PCT/CN2020/082592

(51) Int. Cl.
| | |
|---|---|
| *H01M 50/14* | (2021.01) |
| *H01M 50/126* | (2021.01) |
| *H01M 50/133* | (2021.01) |

(52) U.S. Cl.
CPC ......... *H01M 50/14* (2021.01); *H01M 50/126* (2021.01); *H01M 50/133* (2021.01)

(58) Field of Classification Search
None
See application file for complete search history.

(56) References Cited

U.S. PATENT DOCUMENTS

| | | | |
|---|---|---|---|
| 9,608,294 | B2 | 3/2017 | Ko et al. |
| 9,741,974 | B2 | 8/2017 | Kwon et al. |
| 9,923,230 | B2 | 3/2018 | Jung et al. |
| 10,270,069 | B2 | 4/2019 | Jo et al. |
| 10,305,137 | B2 | 5/2019 | Honda |

(Continued)

FOREIGN PATENT DOCUMENTS

| | | |
|---|---|---|
| CN | 1612376 A | 5/2005 |
| CN | 101271985 A | 9/2008 |

(Continued)

OTHER PUBLICATIONS

WO2018074773A1 Machine translation (Year: 2018).*

(Continued)

*Primary Examiner* — Jonathan G Leong
*Assistant Examiner* — Aryana Y. Ortiz
(74) *Attorney, Agent, or Firm* — Maier & Maier, PLLC

(57) ABSTRACT

A battery includes an electrode assembly, a first insulation layer, a second insulation layer, and at least one first adhesion portion. The electrode assembly includes a first surface and a second surface provided back away from the first surface; the first insulation layer is provided on the first surface; the second insulation layer is provided on the first surface and spaced apart from the first insulation layer; and the first adhesion portion is provided on the first surface and located in a zone between the first insulation layer and the second insulation layer.

26 Claims, 49 Drawing Sheets

(56) References Cited

U.S. PATENT DOCUMENTS

| | | | |
|---|---|---|---|
| 2005/0084753 A1* | 4/2005 | Kim | H01M 10/0431 |
| | | | 429/186 |
| 2007/0160904 A1 | 7/2007 | Uh | |
| 2010/0203381 A1 | 8/2010 | Kim et al. | |
| 2015/0207179 A1 | 7/2015 | Bao et al. | |
| 2017/0117529 A1 | 4/2017 | Kang | |
| 2017/0309946 A1 | 10/2017 | Honda | |
| 2018/0083311 A1 | 3/2018 | Kim et al. | |
| 2018/0219133 A1 | 8/2018 | Park et al. | |
| 2019/0229361 A1 | 7/2019 | Kim et al. | |
| 2022/0131217 A1* | 4/2022 | Kim | B32B 7/14 |

FOREIGN PATENT DOCUMENTS

| | | | |
|---|---|---|---|
| CN | 102138244 | A | 7/2011 |
| CN | 105449255 | A | 3/2016 |
| CN | 106711388 | A | 5/2017 |
| CN | 107863550 | A | 3/2018 |
| CN | 108352429 | A | 7/2018 |
| CN | 108598491 | A | 9/2018 |
| CN | 208062159 | U | 11/2018 |
| CN | 110071322 | A | 7/2019 |
| CN | 209786105 | U | 12/2019 |
| CN | 210040423 | U | 2/2020 |
| CN | 111430583 | A | 7/2020 |
| CN | 211455732 | U | 9/2020 |
| JP | 2010092673 | A1 | 4/2010 |
| JP | 2018147749 | A | 9/2018 |
| JP | 2019102224 | A | 6/2019 |
| JP | 2022517503 | A | 3/2022 |
| KR | 1020060056630 | A | 5/2006 |
| KR | 1020180041979 | A1 | 4/2018 |
| KR | 10-2019-0090305 | A | 8/2019 |
| WO | 2017158702 | A1 | 9/2017 |
| WO | 2018074773 | A1 | 4/2018 |
| WO | WO-2019146872 | A1 * | 8/2019 .......... B32B 15/085 |

OTHER PUBLICATIONS

International Search Report mailed Feb. 22, 2021, in corresponding International Application No. PCT/CN2020/130646; 8 pages (with English Translation).

International Search Report mailed Dec. 28, 2020, in corresponding International Application No. PCT/CN2020/082592; 9 pages (with English Translation.

Office Action issued on Feb. 7, 2024, in corresponding Chinese Application No. 202010246220.8, 16 pages.

Office Action issued on Feb. 20, 2024, in corresponding Japanese Application No. 2022-517503, 10 pages.

Office Action issued on Jul. 12, 2024, in corresponding European Application No. 20929099.8, 6 pages.

Office Action issued on Feb. 16, 2024, in corresponding Indian Application No. 202227061885, 4 pages.

Office Action issued on Jan. 24, 2023, in corresponding Indian Application No. 202227061885, 5 pages.

Notice of Reasons for Refusal issued on Apr. 4, 2023, in corresponding Japan Application No. 2022-517503, 10 pages.

Notice of Reasons for Refusal issued on Sep. 26, 2023, in corresponding Japan Application No. 2022-517503, 5 pages.

Office Action issued on Nov. 4, 2025, in corresponding Japanese Application No. 2024-171072, 7 pages.

Notice of Allowance issued on Oct. 1, 2025, in corresponding Chinese Application No. 202411364978.6, 12 pages.

* cited by examiner

10(10Ea)

10(10Ea)

Z

1

BATTERY

CROSS REFERENCE TO RELATED APPLICATIONS

The present application is a Bypass Continuation of PCT international application: PCT/CN2020/130646, filed on Nov. 20, 2020, which claims priority to PCT application: PCT/CN2020/082592, filed on Mar. 31, 2020, the disclosures of which are hereby incorporated by reference in their entirety.

TECHNICAL FIELD

This application relates to a battery.

BACKGROUND

As consumer electronic products, electric vehicles, and the like are maturely used, customers are paying increasing attention to risks in whole product applications. For example, high impact resistance is required for electronic products. As an important component of electronic products, batteries are also subject to an impact resistance requirement. For a battery, when an electronic product is impacted, an electrode assembly accommodated in a housing of the battery is prone to damage the housing, or the electrode assembly is damaged due to the impact, thereby affecting safety and service life of the battery.

SUMMARY

In view of the foregoing situation, it is necessary to provide a battery that helps improve impact resistance performance, to further improve safety.

This application provides a battery, including an electrode assembly, a first insulation layer, a second insulation layer, and at least one first adhesion portion. The electrode assembly includes a first surface and a second surface provided back away from the first surface. The first insulation layer is provided on the first surface. The second insulation layer is provided on the first surface and spaced apart from the first insulation layer. The first adhesion portion is provided on the first surface and located in a zone between the first insulation layer and the second insulation layer.

In a solution of this application, the battery includes two or more first adhesion portions, and the two or more first adhesion portions are arranged into a dot array.

In a solution of this application, the battery further includes a second adhesion portion provided on a side of the first insulation layer facing away from the first surface.

In a solution of this application, an area of an orthographic projection of the second adhesion portion onto the first surface is smaller than an area of an orthographic projection of the first insulation layer onto the first surface.

In a solution of this application, the battery includes at least two second adhesion portions, and the at least two second adhesion portions are arranged into a dot array.

In a solution of this application, the first insulation layer extends from the first surface to the second surface, and the second insulation layer extends from the first surface to the second surface.

In a solution of this application, a metal portion is further provided at an end of the electrode assembly, and the first insulation layer and the second insulation layer are located at an end of the electrode assembly away from the metal portion.

In a solution of this application, an area of an orthographic projection of the at least one first adhesion portion onto the first surface is smaller than a total area of an orthographic projection of the first insulation layer and the second insulation layer onto the first surface.

In a solution of this application, the area of the an orthographic projection of the at least one first adhesion portion onto the first surface is smaller than an area of an orthographic projection of the first insulation layer onto the first surface, and is smaller than an area of an orthographic projection of the second insulation layer onto the first surface.

In a solution of this application, a distance from a part of a zone of the first surface in which the first surface is in contact with the first insulation layer to the second surface is a first distance, a distance from the first adhesion portion to the second surface is a second distance, and the first distance is less than the second distance.

In a solution of this application, a distance from a part of a zone of the first surface in which the first surface is in contact with the second insulation layer to the second surface is a third distance, and the third distance is less than the second distance.

In a solution of this application, the first distance and the third distance are unequal.

In a solution of this application, a length of the first adhesion portion in a first direction is less than a half of a length of the first surface in the first direction.

In a solution of this application, the first surface is provided with a first groove corresponding to the first adhesion portion, and the first adhesion portion is located in the first groove.

In a solution of this application, a surface of the first insulation layer corresponding to the second adhesion portion is provided with a second groove, and the second adhesion portion is located in the second groove.

In a solution of this application, the battery further includes a third adhesion portion provided on a surface of the first insulation layer facing away from the second surface, and the third adhesion portion extends to a zone of the first surface that is not provided with the first insulation layer.

In a solution of this application, the battery further includes a fourth adhesion portion, the fourth adhesion portion is provided on the first surface, a zone of the first surface that is provided with the fourth adhesion portion is spaced apart from a zone of the first surface that is provided with the first insulation layer and the second insulation layer and a zone of the first surface that is located between the first insulation layer and the second insulation layer, and the fourth adhesion portion is in contact with neither the first insulation layer nor the second insulation layer.

In a solution of this application, the electrode assembly includes at least two fourth adhesion portions with different orthographic projection shapes, and the fourth adhesion portions are arranged into a dot array.

In a solution of this application, the electrode assembly further includes a third insulation layer, the electrode assembly is of a winding structure, and the third insulation layer is provided on the second surface and fastened to an end of an outermost electrode plate of the electrode assembly.

In a solution of this application, the battery further includes a housing, and the housing encloses the electrode assembly, the first insulation layer, and the second insulation layer, and adheres to the electrode assembly through the first adhesion portion.

In a solution of this application, an average area of an an orthographic projection of the fourth adhesion portions onto the first surface is greater than an average area of an orthographic projection of the first adhesion portions onto the first surface.

In a solution of this application, an average area of an orthographic projection of the third adhesion portions onto the first surface is greater than an average area of an orthographic projection of the first adhesion portions onto the first surface and greater than an average area of an orthographic projection of the second adhesion portions onto the first surface.

Based on the battery according to this application, the first insulation layer and the second insulation layer are provided on the surface of the electrode assembly, and the first adhesion portion is provided between the first insulation layer and the second insulation layer. When the housing encloses the electrode assembly, the first adhesion portion adheres to the electrode assembly and the housing, thereby improving safety of the battery and prolonging service life of the battery when the battery is subject to an external force.

REFERENCE SIGNS OF MAIN COMPONENTS

Figure 1:
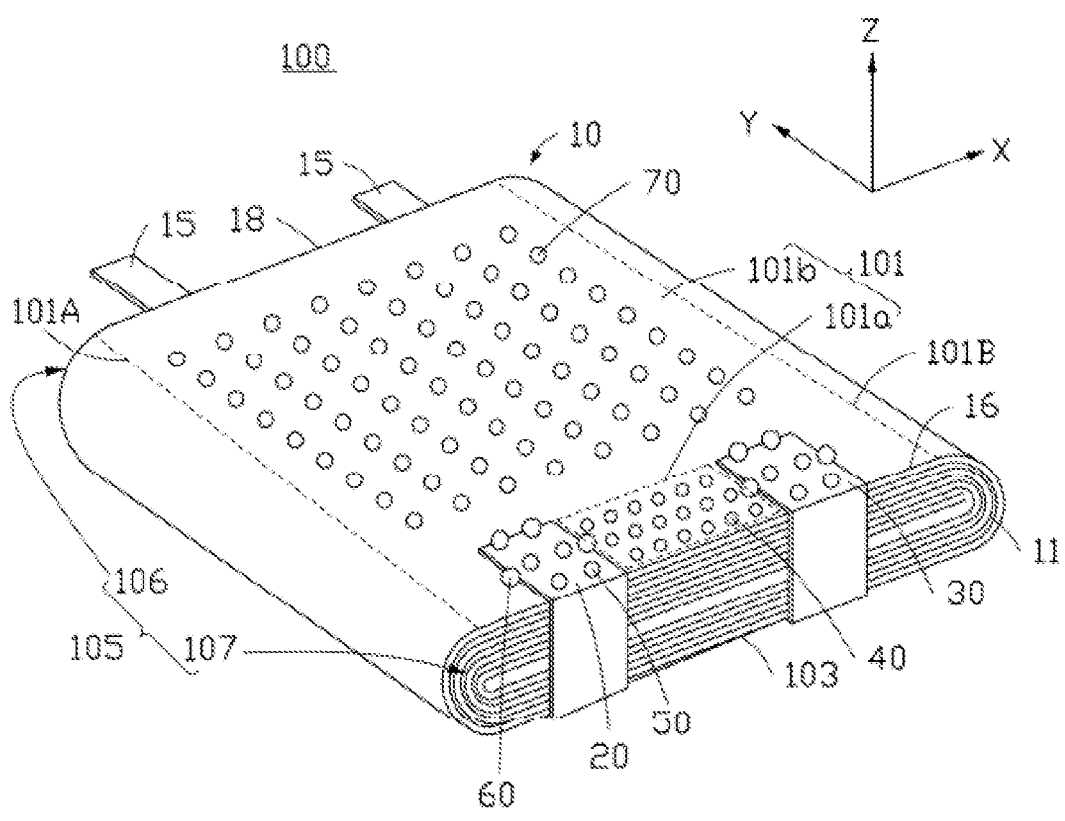
FIG. 1 is a schematic structural diagram of a battery according to an embodiment of this application.

| | |
|---|---|
| Battery | 100 |
| Electrode assembly | 10, 10' |
| First insulation layer | 20 |
| Second insulation layer | 30 |
| First adhesion portion | 40 |
| First surface | 101, 101' |
| Second surface | 103, 103' |
| Connection zone | 105, 105' |
| Electrode plate | 11 |
| First end | 101A |
| Second end | 101B |
| First conductive layer | 10A |
| First isolation layer | 10B |
| Second conductive layer | 10C |
| Second isolation layer | 10D |
| Surface | 10a, 10b, 10c, 21, 31 |
| Stacked body | 10E, 10Ea |
| Current collector | 10AA, 10CA |
| Active substance layer | 10AB, 10CB |
| First portion | 106, 106' |
| First section | 101b1, 101b1' |
| Second portion | 107, 107' |
| Second section | 101b2, 101b2' |
| Third portion | 108 |
| Fourth portion | 109 |
| Metal portion | 15, 15' |
| First metal portion | 151 |
| Second metal portion | 153 |
| Third edge | 19A |
| Fourth edge | 19B |
| First direction | X |
| First edge | 16, 16', 16A |
| Second direction | Y |
| Gap zone | 101a, 101a' |
| First recess | 120 |
| Second recess | 130 |
| First groove | 140 |
| Third direction | Z |
| Housing | 80 |
| Second adhesion portion | 50 |
| Second groove | 150 |
| Third adhesion portion | 60 |
| Fourth adhesion portion | 70 |
| Zone | 101b, 101b' |
| Second edge | 18, 18', 18A |
| Third edge | 19A, 19C |
| Fourth edge | 19B, 19D |
| Third insulation layer | 17 |
| Groove | 140', 150', 160', 170' |
| First step face | 102a |
| Second step face | 102b |

This application will be further described with reference to the accompanying drawings in the following specific embodiments.

DETAILED DESCRIPTION

The following clearly describes the technical solutions in the embodiments of this application in detail. Apparently, the described embodiments are merely some but not all of the embodiments of this application. Unless otherwise defined, all technical and scientific terms used herein shall have the same meanings as commonly understood by persons skilled in the art to which this application belongs. The terms used in this specification of this application are only used to describe specific embodiments, and are not intended to limit this application.

The following describes embodiments of this application in detail. However, this application may be embodied in many different forms, and should not be construed as being limited to the exemplary embodiments illustrated herein.

Instead, these exemplary embodiments are provided, so that this application may be thoroughly conveyed to a person skilled in the art in detail.

In addition, for brevity and clarity, in drawings, a size or a thickness of each component and layer may be enlarged. Through the specification, a same number refers to a same element. As used herein, the term "and/or" includes any one and all of combinations of one or more related listed items. In addition, it should be understood that when an element A is described to be "connected to" an element B, the element A may be directly connected to the element B, or there may be an intermediate element C that indirectly connects the element A with the element B.

Further, when "may" is used for describing the embodiments of this application, "one or more embodiments of this application" may be indicated.

The terminology used herein is intended to describe specific embodiments rather than impose a limitation on this application. As used herein, unless otherwise clearly stated in the context, a singular form is intended to also include a plural form. It should be further understood that when used in this specification, the term "include" means presence of the described feature, numerical value, step, operation, element and/or component, but does not exclude the presence or addition of one or more other features, numerical values, steps, operations, elements, components, and/or a combination thereof.

A space-related term such as "on" may be used herein for ease of description of a relationship between an element or feature and another element (a plurality of elements) or feature (a plurality of features) as illustrated in the figure. It should be understood that, in addition to the direction illustrated in the figure, the space-related term is intended to include different directions during use or operation of a device or an apparatus. For example, if the device in the figure is turned over, an element described to be "over" or "on" another element or feature is to be at an direction "under" or "beneath" said another element or feature. Therefore, the example term "on" may include directions of "over" and "beneath". It should be understood that although the terms first, second, third, and the like may be used herein to describe various elements, components, zones, layers, and/or portions, these elements, components, zones, layers and/or portions, which are not subject to a limitation by the terms. These terms are used to distinguish an element, component, zone, layer or portion from another element, component, zone, layer, or portion. Therefore, the first element, component, zone, layer, or portion described below may be referred to as the second element, component, zone, layer, or portion without departing from teachings of the exemplary embodiments. In this application, the first direction may be any direction in a plane in which the first surface is located.

The following describes some embodiments of this application in detail. In absence of conflicts, the following embodiments and features in the embodiments may be combined.

Referring to FIG. 1, a battery 100 includes an electrode assembly 10, a first insulation layer 20, a second insulation layer 30, and a first adhesion portion 40.

Referring to FIG. 1, the electrode assembly 10 includes a first surface 101, a second surface 103 provided back away from the first surface 101, and a connection zone 105 connecting the first surface 101 and the second surface 103.

Referring to FIG. 1, the electrode assembly 10 includes an electrode plate 11 and a separator (not shown), and the electrode plate 11 and the separator are wound to form a winding structure. The first surface 101, the second surface 103, and the connection zone 105 serve as a portion of an outer surface of the electrode assembly 10.

For example, FIG. 1 shows a structure formed by winding the electrode assembly 10 a plurality of times. In this case, the electrode assembly 10 has a plurality of bent portions in a direction, that is, a direction X in the figure, and the plurality of bent portions are respectively distributed on opposite sides of a center of the battery 100 in the direction X, that is, left and right sides in FIG. 1. A connection zone between an outer plane of the electrode assembly 10 and an end of a bent portion on an outermost side of a left side of a center of the battery 100 that is closest to the center of the battery 100 is a first end 101A; and a connection zone between the outer plane of the electrode assembly 10 and an end of a bent portion on an outermost side of a right side of the center of the battery 100 that is closest to the center of the battery 100 is a second end 101B.

In this embodiment, the first surface 101 is, for example, a zone enclosed by the first end 101A, the second end 101B, and two ends of the electrode assembly 10 in a direction Y, that is, a first edge 16 and a second edge 18 when viewed in a direction Z shown in FIG. 1.

For example, for a stacked electrode assembly 10 formed by stacking the electrode plate 11 and the separator in the direction Z, the electrode assembly 10 includes four edges perpendicular to the direction Z, and a zone enclosed by the four edges is the second surface 103.

The electrode assembly 10 is further described by using an example below.

Figure 3:
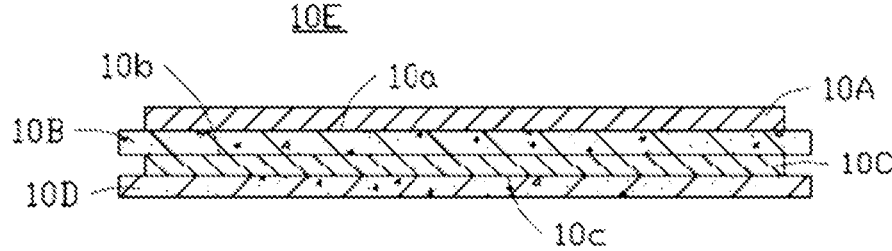
FIG. 3 is a schematic structural diagram of a stacked body according to an embodiment of this application.

Referring to FIG. 3, the battery assembly 10 may include: a first conductive layer 10A, a first isolation layer 10B, a second conductive layer 10C, and a second isolation layer 10D. The first isolation layer 10B is formed on a surface 10a of the first conductive layer 10A. The second conductive layer 10C is formed on a surface 10b of the first isolation layer 10B away from the first conductive layer 10A. The second isolation layer 10D is formed on a surface 10c of the second conductive layer 10C facing away from the first isolation layer 10B. In this way, a stacked body 10E may be formed, and the electrode assembly 10 may be formed on the basis of the stacked body 10E.

Figure 4:
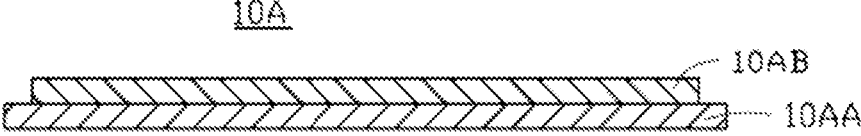
FIG. 4 is a schematic structural diagram of a first conductive layer according to an embodiment of this application.

Referring to FIG. 3 and FIG. 4, when viewed in a direction perpendicular to the surface 10a, the first conductive layer 10A may be, for example, rectangular. The first conductive layer 10A may be, for example, formed by stacking a current collector 10AA and an active substance layer 10AB. The current collector 10AA may, for example, at least include but is not limited to one or more of conductive metal thin plates such as an aluminum mesh and aluminum foil. The active substance layer 10AB may, for example, at least include but is not limited to one or more of lithium cobalt oxide, lithium nickel cobalt manganate, lithium nickel cobalt aluminate, lithium manganate oxide, lithium nickel oxide, lithium manganese iron phosphate, lithium vanadium phosphate, lithium vanadyl phosphate, lithium iron phosphate, lithium titanate, and a lithium-rich manganese-based material. The first conductive layer 10A may, for example, serve as a positive electrode plate to form the electrode assembly 10 of the battery 100.

Referring to FIG. 3, when viewed in a direction perpendicular to the surface 10b, the first isolation layer 10B may be, for example, rectangular. The first isolation layer 10B may, for example, at least include but is not limited to at least one or more of polyethylene, polypropylene, polyethylene terephthalate, polyimide, and aramid. The first isolation layer 10B may, for example, serve as a separator to form the electrode assembly 10 of the battery 100.

Figure 5:
FIG. 5 is a schematic structural diagram of a second conductive layer according to an embodiment of this application.

Referring to FIG. 3 and FIG. 5, when viewed in a direction perpendicular to the surface 10c, the second conductive layer 10C may be, for example, rectangular. The second conductive layer 10C may be, for example, formed by stacking a current collector 10CA and an active substance layer 10CB. The current collector 10CA may, for example, at least include but is not limited to one or two of conductive metal thin plates such as nickel foil and copper foil. The active substance layer 10CB may, for example, at least include but is not limited to one or more of graphite, soft carbon, hard carbon, graphene, a meso-carbon microbead, a silicon-based material, a tin-based material, lithium titanate, or another metal that may form an alloy with lithium. The second conductive layer 10C may, for example, serve as a negative electrode plate to form the electrode assembly 10 of the battery 100.

When viewed in a direction perpendicular to the surface 10b, the second isolation layer 10D may be, for example, rectangular. The second isolation layer 10D may, for example, at least include but is not limited to at least one or more of polyethylene, polypropylene, polyethylene terephthalate, polyimide, and aramid. The second isolation layer 10D may, for example, serve as a separator to form the electrode assembly 10 of the battery 100.

Figure 6:
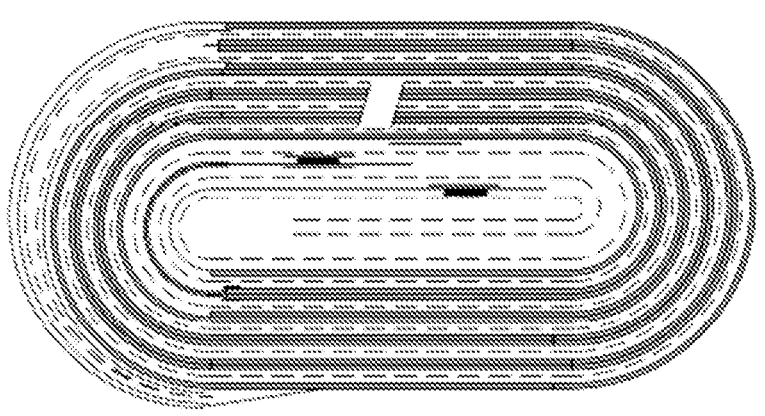
FIG. 6 is a schematic structural diagram of an electrode assembly according to an embodiment of this application.

Referring to FIG. 6, the electrode assembly 10 may be, for example, formed by winding a stacked body 10Ea formed by stacking a plurality of stacked bodies 10E. Alternatively, for example, referring to FIG. 7, the electrode assembly 10 may be formed by directly stacking a plurality of stacked bodies 10E along the direction Z.

In this embodiment, the outer surface of the electrode assembly 10 includes the first surface 101 and the second surface 103 facing away from the first surface 101. In addition, the outer surface of the electrode assembly 10 further includes the connection zone 105 perpendicular to the first surface 101 in the third direction Z.

In this embodiment, the second surface 103 is, for example, a zone corresponding to a plane of the electrode assembly 10 back away from the first surface 101 and a zone enclosed by the first end 101A, the second end 101B, and the two ends of the electrode assembly 10 in the direction Y, that is, the first edge 16 and the second edge 18, when viewed in the direction Z shown in FIG. 1.

Figure 8:
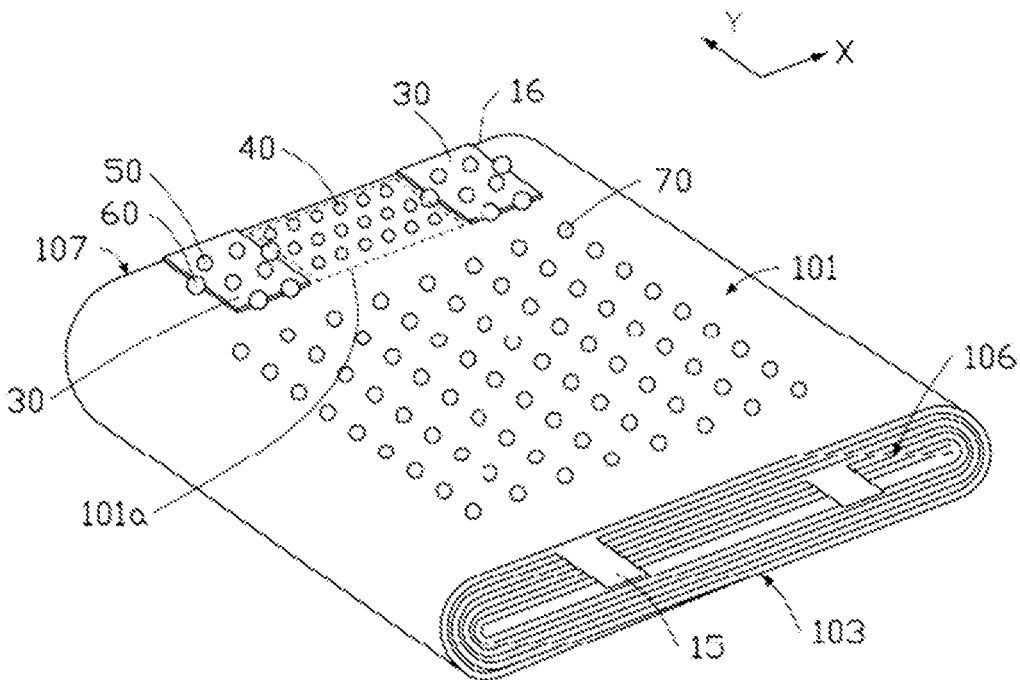
FIG. 8 is a schematic structural diagram of a battery according to an embodiment of this application.

Referring to FIG. 1 and FIG. 8, the connection zone 105 includes a first portion 106 and a second portion 107 back away from the first portion 106. The electrode assembly 10 may further include a metal portion 15, and the metal portion 15 is provided on the first portion 106. An end of the metal portion 15 is connected to the electrode plate 11, and the other end may be connected to another electronic component, to implement feasible electrical connectivity between the electrode assembly 10 and said electronic component.

The first insulation layer 20 and the second insulation layer 30 are both provided on the first surface 101, and the first insulation layer 20 and the second insulation layer 30 are spaced apart along the first direction X.

In this embodiment, when viewed in the third direction Z, the first insulation layer 20 may be, for example, rectangular. The first insulation layer 20 may, for example, at least include but is not limited to one or more of polyimide, polyvinyl chloride, polyethylene, and polypropylene. When viewed in the third direction Z, the second insulation layer 30 may be, for example, rectangular. The second insulation layer 30 may, for example, at least include but is not limited to one or more of polyimide, polyvinyl chloride, polyethylene, and polypropylene.

The first surface 101 and the second portion 107 intersect at the first edge 16. In some embodiments, the first direction X is a direction in which the first edge 16 is located. When viewed in the third direction Z, the first insulation layer 20 and the second insulation layer 30 each extend from the first edge 16 along the first surface 101 toward the first portion 106 but do not reach the first portion 106.

A length L1 of the first insulation layer 20 extending from the first edge 16 toward the first portion 106 and a length L2 of the second insulation layer 30 extending from the first edge 16 toward the first portion 106 are not particularly limited in a case that the first insulation layer 20 apart from the first portion 106 and the second insulation layer 30 apart from the first portion 106. In this embodiment, the length L1 of the first insulation layer 20 extending from the first edge 16 toward the first portion 106 is equal to the length L2 of the second insulation layer 30 extending from the first edge 16 toward the first portion 106. In this case, the foregoing length direction is defined as the second direction Y.

The first insulation layer 20 and the second insulation layer 30 may each include an adhesive layer and a substrate that are laminated. The adhesive layer adheres to the substrate and the electrode assembly 10. The adhesive layer may, for example, at least include but is not limited to at least one or more of natural rubber, synthetic rubber, acrylate, silica gel, and ethylene-vinyl acetate. The substrate may, for example, at least include but is not limited to at least one or more of polyethylene, polypropylene, Teflon, polyvinyl chloride, polyimide, and non-woven fabric.

Figure 2:
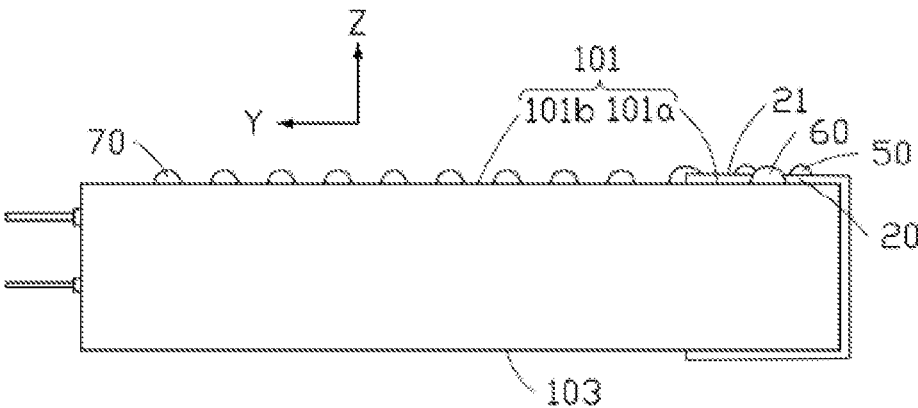
FIG. 2 is a side view of a battery according to an embodiment of this application.
Figure 9A:
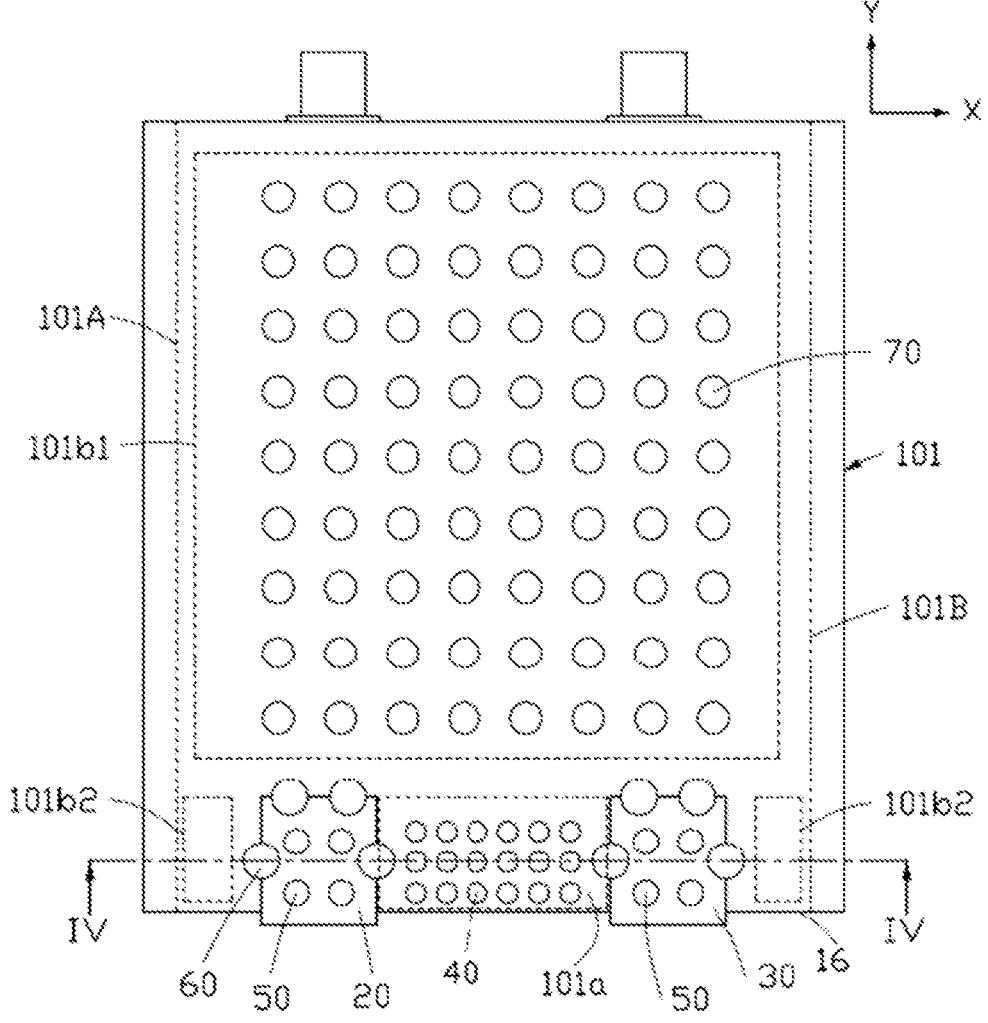
FIG. 9A is a front view of a battery according to an embodiment of this application.

Referring to FIG. 1, FIG. 2, and FIG. 9A, when viewed in the third direction Z perpendicular to the first surface 101, the first adhesion portion 40 is provided on the first surface 101 and located in a zone 101a between the first insulation layer 20 and the second insulation layer 30. In the second direction Y, the first adhesion portion 40 extends beyond neither the first insulation layer 20 nor the second insulation layer 30. In some embodiments, a length of the zone 101a in the first direction X may be less than a half of a length of the first surface 101 in the first direction X.

In some embodiments, an area of an orthographic projection of the first adhesion portion 40 onto the first surface 101, that is, an area of projection of the first adhesion portion 40 onto the first surface 101 along the third direction Z perpendicular to the first surface 101, may be less than a total area of an orthographic projection of the first insulation layer 20 and the second insulation layer 30 onto the first surface 101. Further, in some embodiments, the area of the orthographic projection of the first adhesion portion 40 onto the first surface 101 may be less than an area of an orthographic projection of the first insulation layer 20 onto the first surface 101, and may also be less than an area of an orthographic projection of the second insulation layer 30 onto the first surface 101. The first adhesion portion 40 may, for example, at least include but is not limited to one polymer or a mixture formed by a combination of any polymers in cellulose, poly(vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and polypropylene-maleic anhydride.

Figure 10:
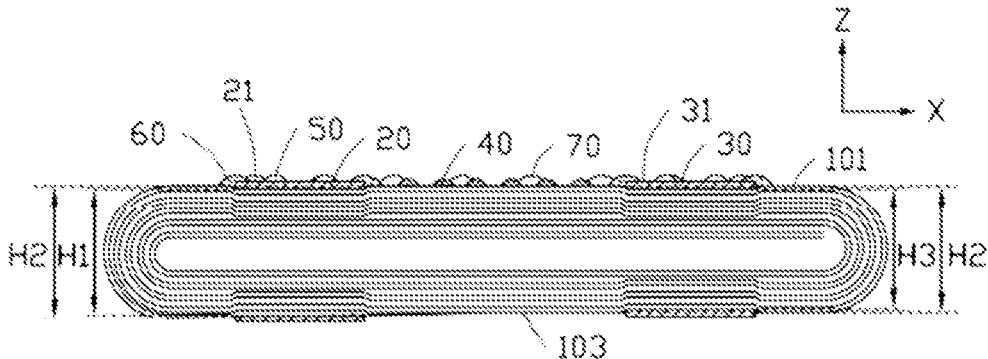
FIG. 10 is a schematic cross-sectional diagram of a battery in a first direction according to an embodiment of this application.

Referring to FIG. 10, a first distance H1 from at least a part of an overlapped zone of the first surface 101 and the first insulation layer 20 to the second surface 103 is less than a second distance H2 from the first adhesion portion 40 to the second surface 103. On the premise of ensuring that the first distance H1 is less than the second distance H2, distances from different locations in the at least a part of an overlapped zone of the first surface 101 and the first insulation layer 20 to the second surface 103 may be different. Further, referring to FIG. 1, FIG. 9A, and FIG. 10, herein, in the at least a part of an overlapped zone of the first surface 101 and the first insulation layer 20, the first distance H1 from a corresponding bottom portion of the first insulation layer 20 on the first surface 101 to the second surface 103 is less than the second distance H2 from the first adhesion portion 40 to the second surface 103.

Figure 11:
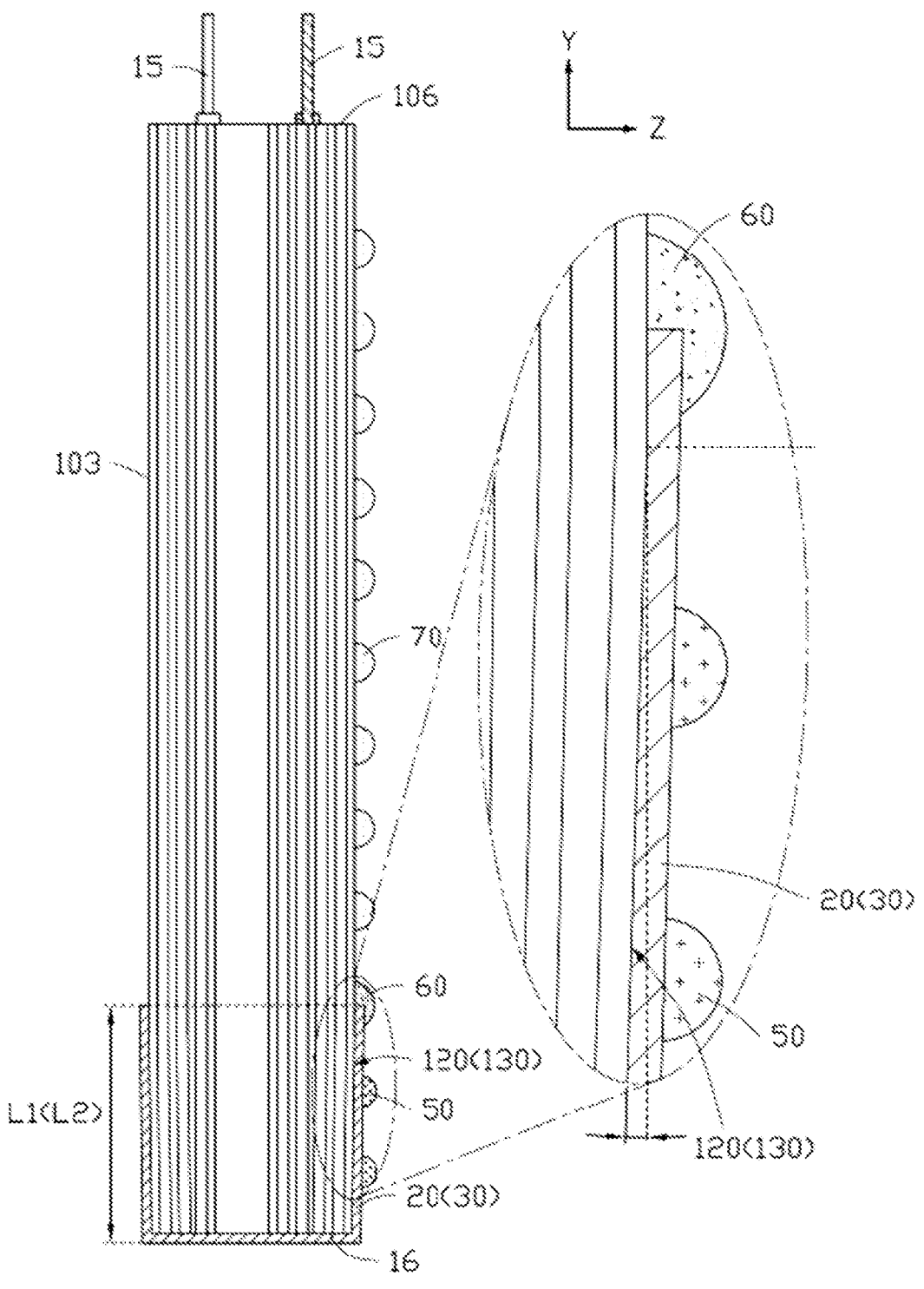
FIG. 11 is a schematic cross-sectional diagram of a battery in a second direction according to an embodiment of this application.

Specifically, referring to FIG. 11, a first recess 120 is provided on the first surface 101, and the first recess 120 is such provided that it extends from the first edge 16 toward the first portion 106. At least a portion of the first insulation layer 20 further away from the first portion 106 is provided in the first recess 120. In this embodiment, the first recess 120 may be an inclined groove whose depth gradually decreases from the first edge 16 toward the first portion 106 along the second direction Y. A portion of the first insulation layer 20 close to the first portion 106 may be located outside the first recess 120.

Referring to FIG. 1, FIG. 9A, and FIG. 10, a third distance H3 from at least a part of an overlapped zone of the first surface 101 and the second insulation layer 30 to the second surface 103 is less than the second distance H2. On the premise of ensuring that the third distance H3 is less than the second distance H2, distances from different locations in the at least a part of an overlapped zone of the first surface 101 and the second insulation layer 30 to the second surface 103 may be different. Further, herein, in the at least a part of an overlapped zone of the first edge 16 and the second insulation layer 30, the third distance H3 from a corresponding bottom portion of the second insulation layer 30 on the first surface 101 to the second surface 103 is less than the second distance H2.

Referring to FIG. 11, a second recess 130 is provided on the first surface 101, and the second recess 130 is such provided that it extends from the first edge 16 toward the first portion 106. At least a portion of the second insulation layer 30 further away from the first portion 106 is provided in the second recess 130. In this embodiment, the second recess 130 may be an inclined groove whose depth gradually decreases from the first edge 16 toward the first portion 106 along the second direction Y. A portion of the second insulation layer 30 close to the first portion 106 may be located outside the second recess 130.

Figure 12:
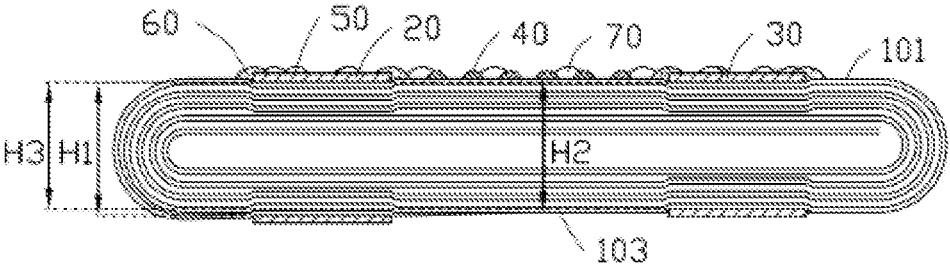
FIG. 12 is a schematic cross-sectional diagram of a battery in a first direction according to an embodiment of this application.

In some embodiments, referring to FIG. 12, the first distance H1 may not be equal to the third distance H3.

Figure 13:
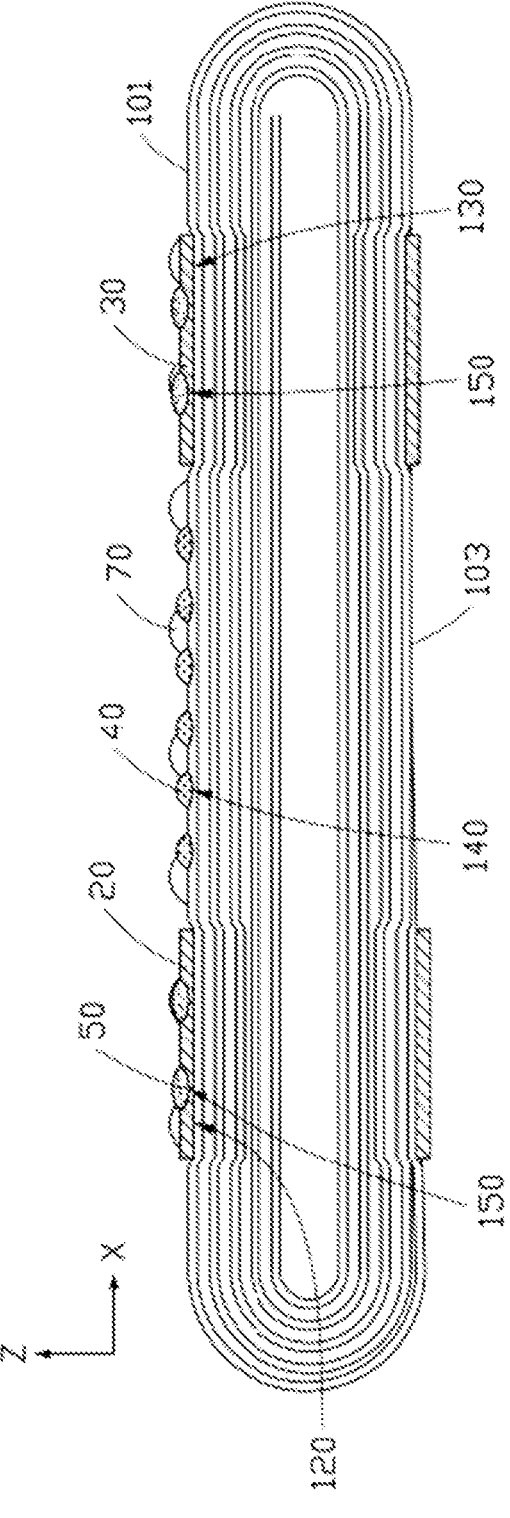
FIG. 13 is a schematic cross-sectional diagram of a battery in a first direction according to an embodiment of this application.

Referring to FIG. 13, the first surface 101 may be provided with a first groove 140, and the first adhesion portion 40 is located in the first groove 140. In this embodiment, there are a plurality of first adhesion portions 40, there are a plurality of first grooves 140, and each first adhesion portion 40 is located in one first groove 140.

Figure 9B:
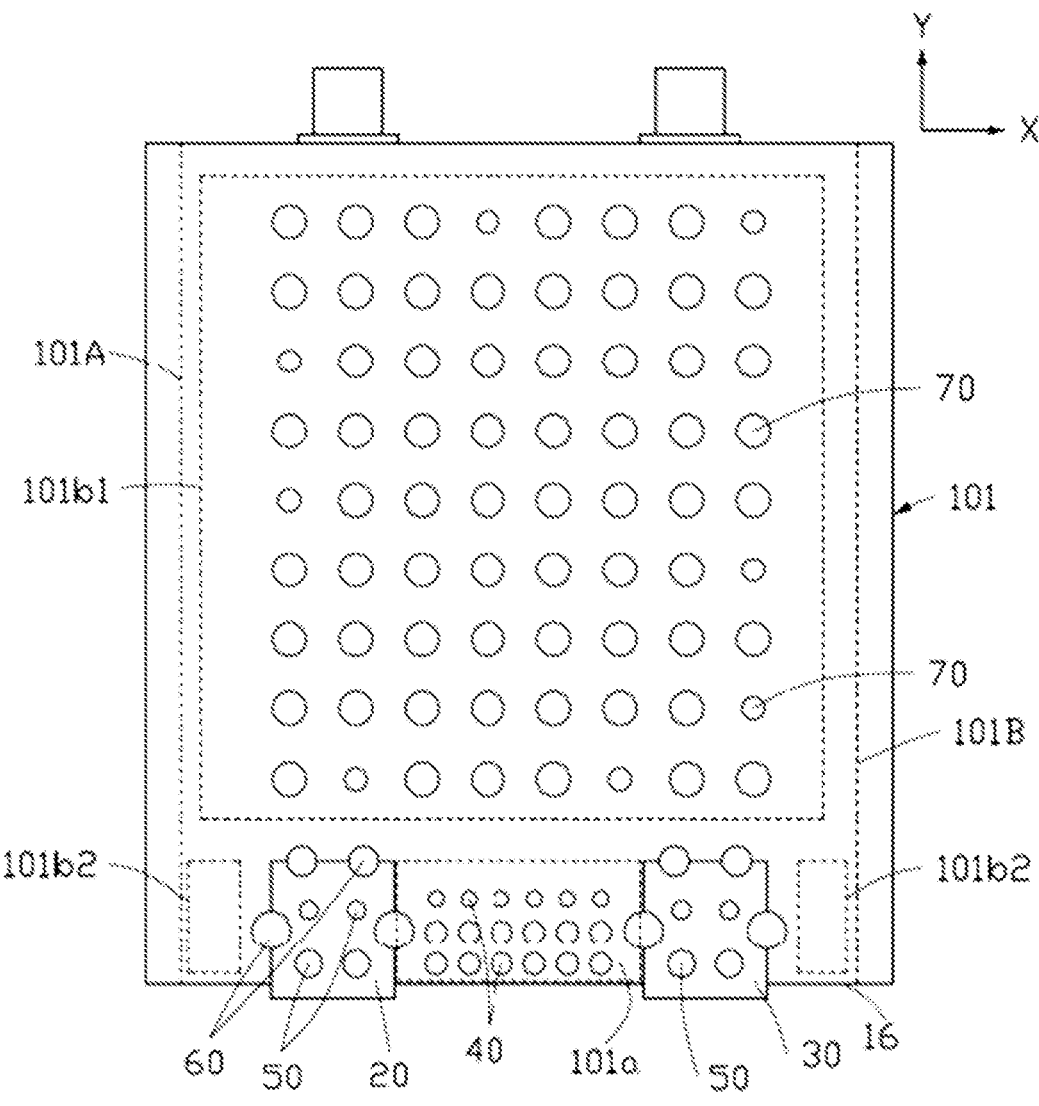
FIG. 9B is a front view of a battery according to an embodiment of this application.
Figure 14:
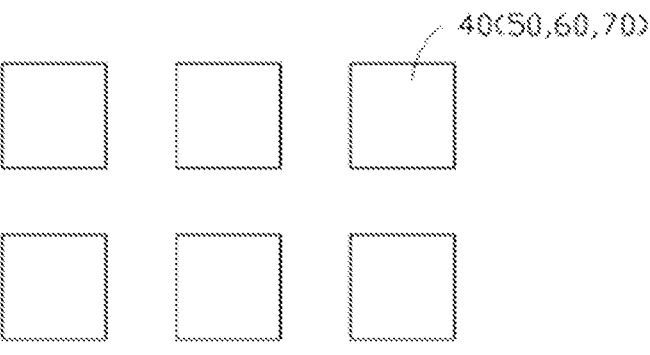
FIG. 14 is a schematic structural diagram of a first adhesion portion or a fourth adhesion portion according to an embodiment of this application.
Figure 15:
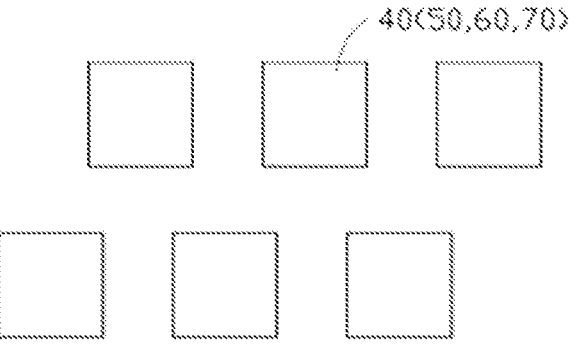
FIG. 15 is a schematic structural diagram of a first adhesion portion or a fourth adhesion portion according to an embodiment of this application.
Figure 16:
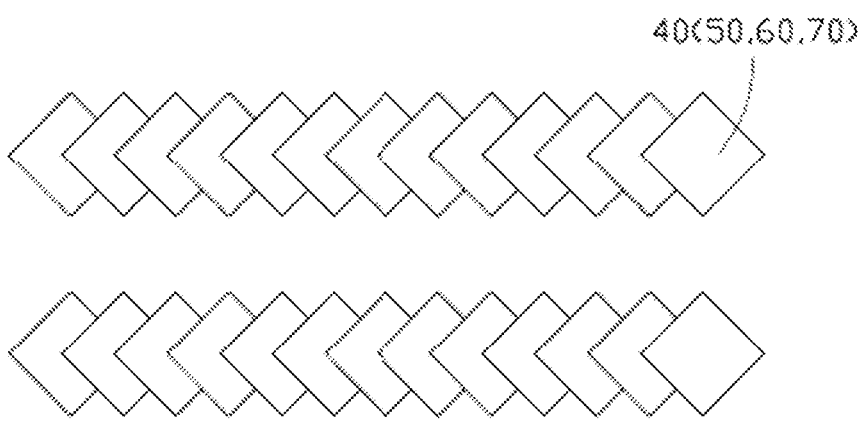
FIG. 16 is a schematic structural diagram of a first adhesion portion or a fourth adhesion portion according to an embodiment of this application.
Figure 17:
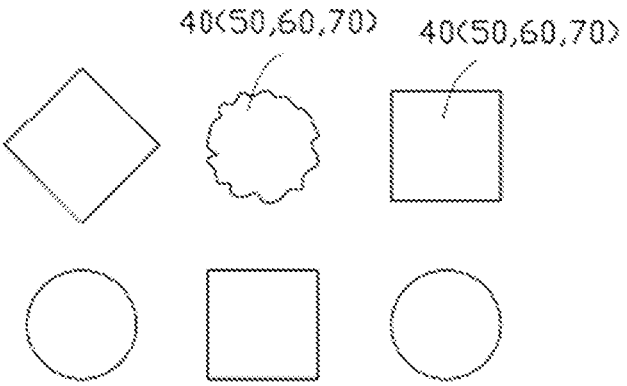
FIG. 17 is a schematic structural diagram of a first adhesion portion or a fourth adhesion portion according to an embodiment of this application.

When viewed in the third direction Z, neither a shape nor a size of the first adhesion portion 40 is limited, and the shape may be a round shape (refer to FIG. 9A), a rectangular shape (refer to FIG. 14 and FIG. 15), a strip shape (refer to FIG. 16), another regular or irregular shape, or a combination of these graphics. The number of the first adhesion portions 40 may also be set as actually needed, and may be one or more. When there are a plurality of first adhesion portions 40, the plurality of first adhesion portions 40 are spaced apart (for example, arranged into a dot array). When viewed in the third direction Z, the battery 100 may include at least two first adhesion portions 40 (refer to FIG. 17) with different shapes, or may include at least two first adhesion portions 40 of different sizes (refer to FIG. 9B). In some embodiments, referring to FIG. 9A, when viewed in the third direction Z, shapes of all the first adhesion portions 40 may also be the same.

Figure 18:
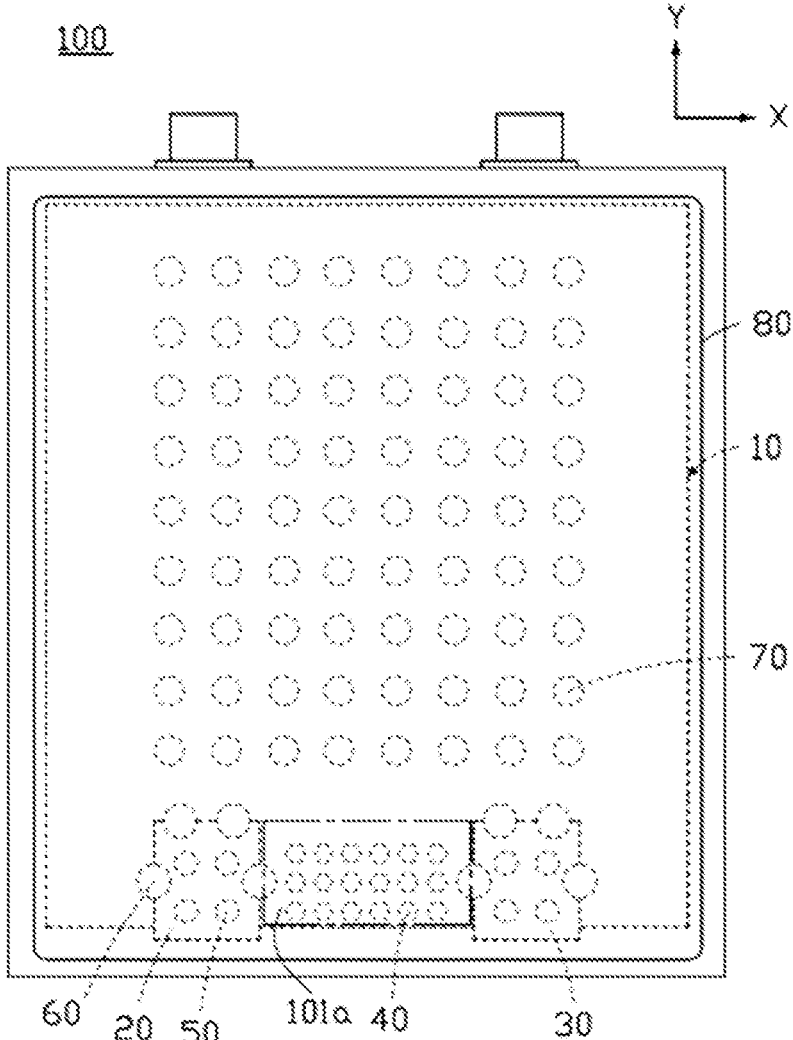
FIG. 18 is a schematic structural diagram of a battery according to an embodiment of this application.
Figure 19:
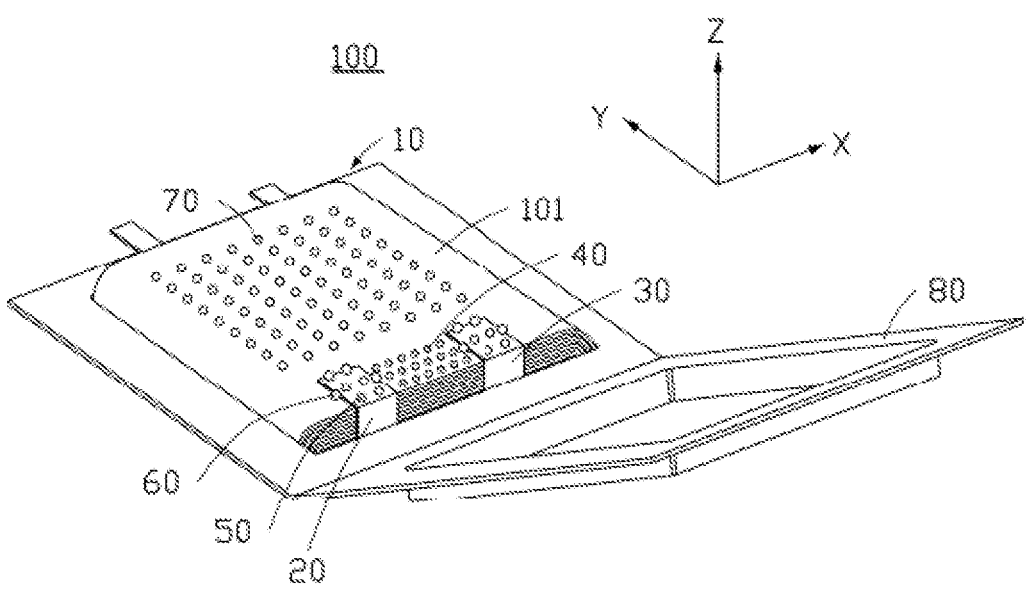
FIG. 19 is a schematic partial exploded view of a battery according to an embodiment of this application.
Figure 20A:
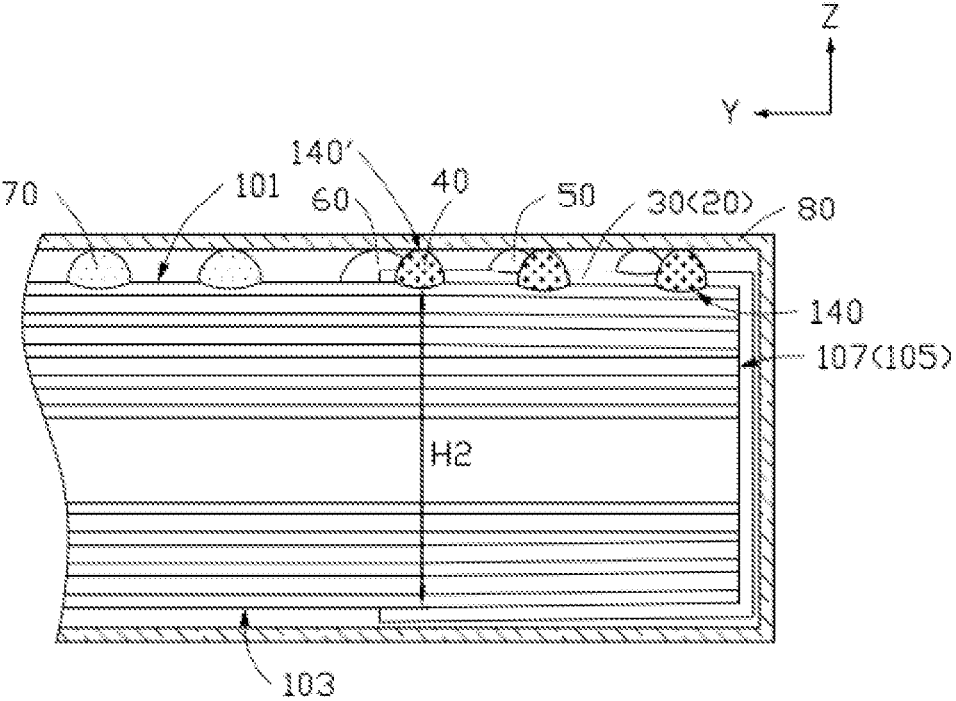
FIG. 20A is a schematic partial cross-sectional diagram of a battery in a second direction according to an embodiment of this application.
Figure 20B:
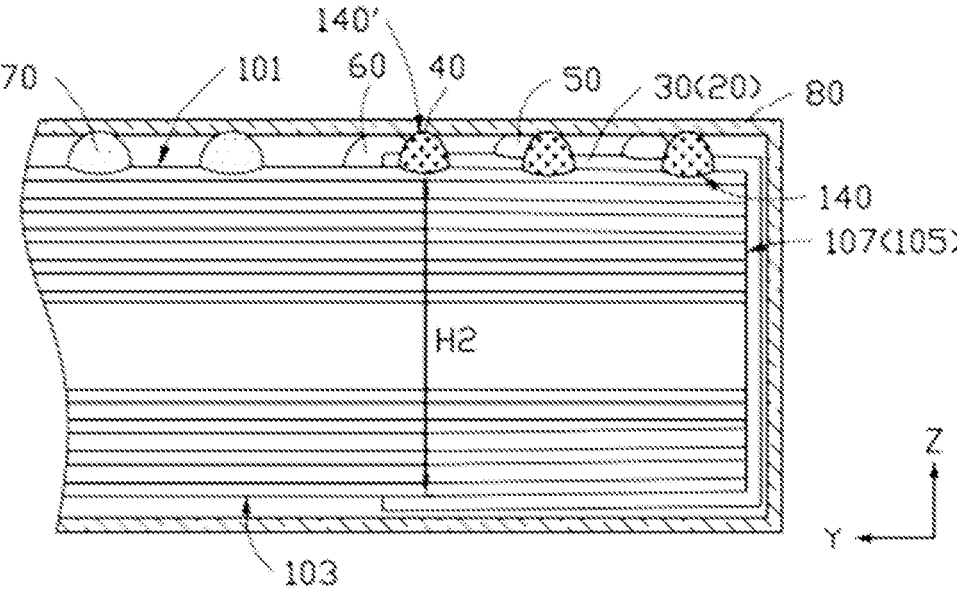
FIG. 20B is a schematic partial cross-sectional diagram of a battery in a second direction according to an embodiment of this application.

Referring to FIG. 18 and FIG. 19, the battery 100 may further include a housing 80. The housing 80 may be, for example, but is not limited to, one or more of an aluminum-plastic film, a heat shrinkable film, an aluminum housing, and a steel housing. The housing 80 encloses the electrode assembly 10, the first insulation layer 20, and the second insulation layer 30, and adheres to the electrode assembly 10 through the first adhesion portion 40 (refer to both FIG. 20A and FIG. 20B). In some embodiments, as shown in FIG. 20B, the housing 80 may be provided with a groove 140', and a portion of the first adhesion portion 40 is located in the groove 140'. The first adhesion portion 40 is provided in the zone 101a between the first insulation layer 20 and the second insulation layer 30, so that compression degrees of a zone in which each of the first insulation layer 20 and the second insulation layer 30 is provided in the battery 100 and a zone corresponding to the zone 101a in the battery during chemical conversion are more uniform in a horizontal direction, that is, along the first direction X and the second direction Y, thereby helping reduce a deformation degree of the battery 100 during use. Providing the first adhesion portion 40 between the first insulation layer 20 and the second insulation layer 30 may increase an adhesion force between the electrode assembly 10 and the housing 80, to suppress relative displacement between the electrode assembly 10 and the housing 80 when the battery 100 is subject to an external force, thereby further reducing a possibility of damage to the battery 100 due to the external force and prolonging service life of the battery 100. In addition, because the first adhesion portion 40 adheres to the housing 80 and the electrode assembly 10, thereby further helping suppress deformation of the electrode assembly 10. In addition, a shape of the first adhesion portion 40 after adhesion to the housing 80 may change. When there are a plurality of first adhesion portions 40, after the plurality of first adhesion portions 40 adhere to the housing 80, the plurality of first adhesion portions 40 may be spaced apart, or adjacent first adhesion portions 40 are connected to each other (refer to FIG. 16). When the plurality of first adhesion portions 40 are arranged into a dot array, an arrangement of the first adhesion portion 40 is more flexible, a location for providing the first adhesion portion 40 may be more accurate, and thicknesses after adhesion of the first adhesion portions 40 to the housing 80 may be more consistent.

Referring to FIG. 1, FIG. 2, FIG. 9A, and FIG. 10, the battery 100 may further include a second adhesion portion 50, and the second adhesion portion 50 is provided on a surface 21 of the first insulation layer 20 facing away from the second surface 103. An area of an orthographic projection of the second adhesion portion 50 onto the first surface 101 is less than an area of an orthographic projection of the first insulation layer 20 onto the first surface 101. A surface 31 of the second insulation layer 30 facing away from the second surface 103 may also be provided with the second adhesion portion 50. In this case, an area of an orthographic projection of the second adhesion portion 50 onto the first surface 101 is less than an area of an orthographic projection of the second insulation layer 30 onto the first surface 101.

The second adhesion portion 50 may, for example, at least include but is not limited to one polymer or a mixture formed by a combination of any polymers in cellulose, poly(vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and polypropylene-maleic anhydride.

When viewed in the third direction Z, a shape of the second adhesion portion 50 is not limited, and the shape may be a round shape, a rectangular shape, a strip shape, another regular or irregular shape, or a combination of these graphics. The number of the second adhesion portions 50 may also be set as actually needed, and may be one or more. When there are a plurality of second adhesion portions 50, the plurality of second adhesion portions 50 are spaced apart (for example, arranged into a dot array). When viewed in the third direction Z, the battery 100 may include at least two second adhesion portions 50 with different shapes. In some embodiments, when viewed in the third direction Z, shapes of all the second adhesion portions 50 may also be the same.

In some embodiments, referring to FIG. 13, a surface of the first insulation layer 20 facing away from the second surface 103 is provided with a second groove 150, and the second adhesion portion 50 is located in the second groove 150.

Figure 21A:
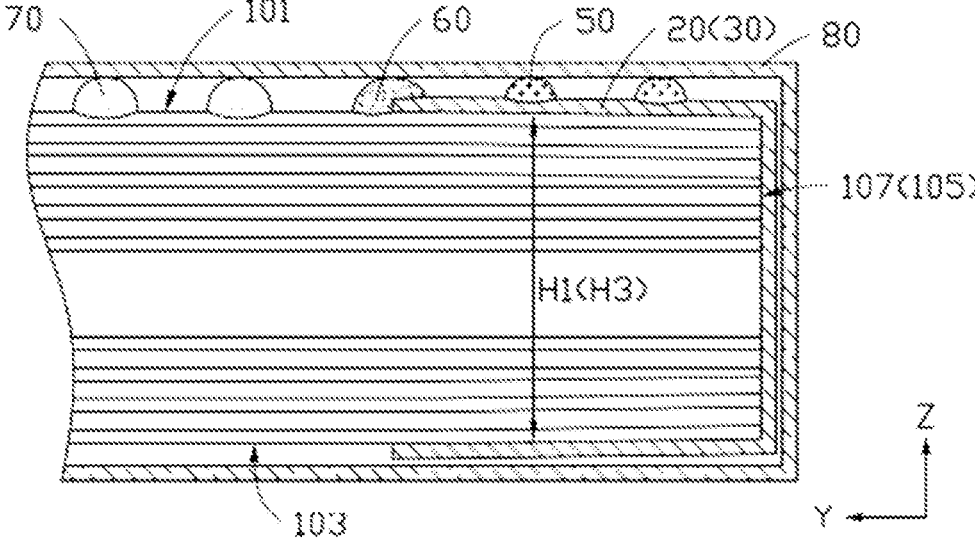
FIG. 21A is a schematic partial cross-sectional diagram of a battery in a second direction according to an embodiment of this application.
Figure 21B:
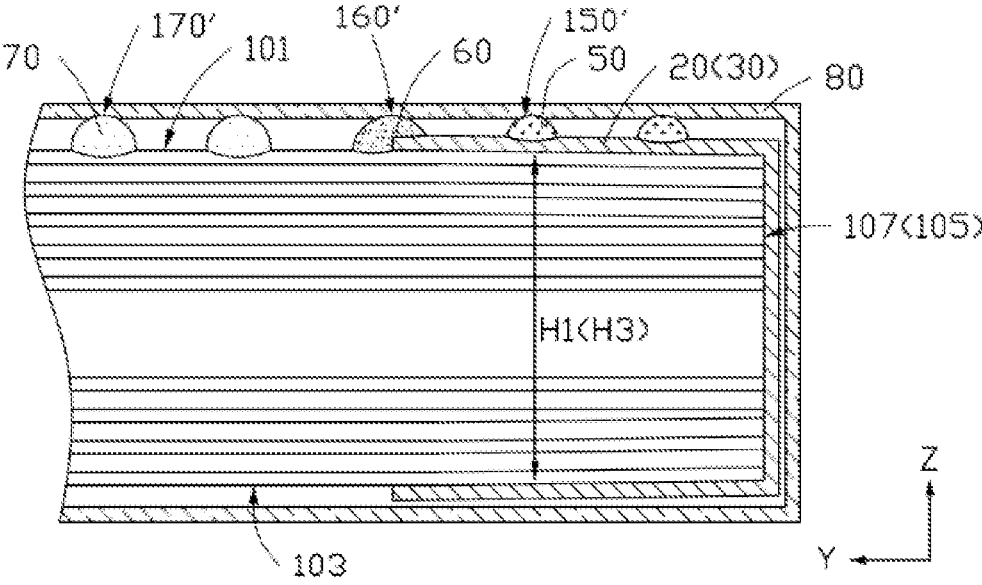
FIG. 21B is a schematic partial cross-sectional diagram of a battery in a second direction according to an embodiment of this application.

Referring to FIG. 18, FIG. 21A, and FIG. 21B, the housing 80 adheres to the first insulation layer 20 through the second adhesion portion 50, which facilitates stability between the electrode assembly 10 and the housing 80. The housing 80 may alternatively adhere to the second insulation layer 30 through the second adhesion portion 50, which facilitates the stability between the electrode assembly 10 and the housing 80. The housing 80 may alternatively adhere to the first insulation layer 20 and the second insulation layer 30 through the second adhesion portion 50. The second adhesion portion 50 avoids direct adhesion to the electrode assembly 10. During a drop process of the battery 100, the second adhesion portion 50 adheres to the housing 80 and the first insulation layer 20, or adheres to the housing 80 and the second insulation layer 30 instead of the housing 80 and the electrode assembly 10, the area of the orthographic projection of the second adhesion portion 50 onto the first surface 101 is less than the area of the orthographic projection of the first insulation layer 20 or the second insulation layer 30 onto the first surface 101 that adheres to the second adhesion portion 50, that is, a contact area between the first insulation layer 20 or the second insulation layer 30 and the electrode assembly 10 is larger, and therefore, a pulling force of the housing 80 on the electrode assembly 10 through the second adhesion portion 50 is dispersed, thereby reducing a probability of damage caused by pulling the electrode assembly 10, and reducing a risk of a short circuit between the positive and negative electrodes caused thereby. When there are a plurality of second adhesion portions 50, after the plurality of second adhesion portions 50 adhere to the housing 80, the plurality of second adhesion portions 50 may be spaced apart, or adjacent second adhesion portions 50 are connected to each other. When the plurality of second adhesion portions 50 are arranged into a dot array, an arrangement of the second adhesion portion 50 is more flexible, a location for providing the second adhesion portion 50 may be more accurate, and thicknesses after adhesion of the second adhesion portions 50 to the housing 80 may be more consistent. In some embodiments, as shown in FIG. 21B, the housing 80 may be further provided with a groove 150', and a portion of the second adhesion portion 50 is located in the groove 150'.

Referring to FIG. 1, FIG. 2, and FIG. 9A, the battery 100 may further include a third adhesion portion 60, and the third adhesion portion 60 is provided on a surface 21 of the first insulation layer 20 facing away from the second surface 103, and extends across an intersection zone of the first insulation layer 20 and the first surface 101 to the first surface 101.

The third adhesion portion 60 may, for example, at least include but is not limited to one polymer or a mixture formed by a combination of any polymers in cellulose, poly(vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and polypropylene-maleic anhydride.

Referring to FIG. 18, FIG. 21A and FIG. 21B, the third adhesion portion 60 adheres to the housing 80. The housing 80 may adhere to the first insulation layer 20 through the third adhesion portion 60. The housing 80 may alternatively adhere to the second insulation layer 30 through the third adhesion portion 60. The housing 80 may alternatively adhere to both the first insulation layer 20 and the second insulation layer 30 through the third adhesion portion 60. In some embodiments, as shown in FIG. 21B, the housing 80 may be further provided with a groove 160', and a portion of the third adhesion portion 60 is located in the groove 160'.

Referring to FIG. 1, FIG. 2, FIG. 9A, FIG. 21A, and FIG. 21B, the battery 100 may further include a fourth adhesion portion 70, and the fourth adhesion portion 70 is provided on a zone 101*b* of the first surface 101. The zone 101*b* is spaced apart from a zone in which each of the first insulation layer 20 and the second insulation layer 30 is provided in the first surface 101 and the zone 101*a* in the first surface 101, and the fourth adhesion portion 70 is in contact with neither the first insulation layer 20 nor the second insulation layer 30.

Specifically, referring to FIG. 9A, the zone 101*b* includes a first section 101*b*1 and a second section 101*b*2. The first section 101*b*1 faces away from the zone 101*a* in the second direction Y. The second section 101*b*2 is located on a side of the first insulation layer 20 facing away from the second insulation layer 30 and a side of the second insulation layer 30 facing away from the first insulation layer 20 in the first direction X. In this embodiment, the fourth adhesion portion 70 is located in a first section 101*b*1 of the zone 101*b*.

The fourth adhesion portion 70 may, for example, at least include but is not limited to one polymer or a mixture formed by a combination of any polymers in cellulose, poly(vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and polypropylene-maleic anhydride.

When viewed in the third direction Z, a shape of the fourth adhesion portion 70 is not limited, and the shape may be a round shape (refer to FIG. 9A), a rectangular shape (refer to FIG. 14 and FIG. 15), a strip shape (refer to FIG. 16), another regular or irregular shape, or a combination of these graphics. The number of the fourth adhesion portions 70 may also be set as actually needed, and may be one or more. When there are a plurality of fourth adhesion portions 70, the plurality of fourth adhesion portions 70 are spaced apart (for example, arranged into a dot array). When viewed in the third direction Z, the battery 100 may include at least two fourth adhesion portions 70 (refer to FIG. 17) with different shapes. In some embodiments, when viewed in the third direction Z, shapes of all the fourth adhesion portions 70 may also be the same.

Referring to FIG. 18, FIG. 21A, and FIG. 21B, the housing 80 further adheres to the electrode assembly 10 through the fourth adhesion portion 70. When there are a plurality of fourth adhesion portions 70, after the plurality of fourth adhesion portions 70 adhere to the housing 80, the plurality of fourth adhesion portions 70 may be spaced apart, or adjacent fourth adhesion portions 70 are connected to each other (refer to FIG. 16). In some embodiments, as shown in FIG. 21B, the housing 80 may be further provided with a groove 170', and a portion of the fourth adhesion portion 70 is located in the groove 170'.

In an embodiment, in order that the shear stress between the electrode assembly 10 and the housing 80 concentrates on the first section 101b1 instead of the gap zone 101a during dropping, so as to prevent a failure of the battery 100 due to a short circuit between the positive and negative electrodes that is caused when the electrode plate in the gap zone 101a is torn or severely pulled, an average area of an orthographic projection of the fourth adhesion portions 70 onto the first surface 101 is set to be greater than an average area of an orthographic projection of the first adhesion portions 40 onto the first surface 101.

In an embodiment, in order that the first insulation layer 20 or the second insulation layer 30 adheres to the first surface 101 tighter, so as to prevent the first insulation layer 20 or the second insulation layer 30 from falling off under the shear stress when the battery is dropped, an average area of an orthographic projection of the third adhesion portions 60 onto the first surface 101 is set to be greater than an average area of an orthographic projection of the first adhesion portions 40 onto the first surface 101, and greater than an average area of an orthographic projection of the second adhesion portions 50 onto the first surface 101.

Figure 22:
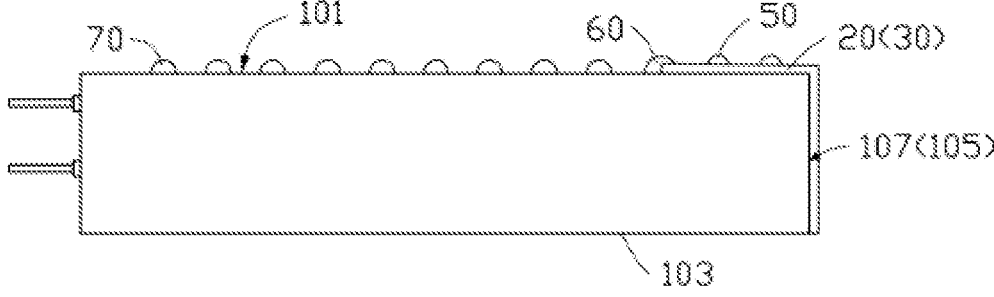
FIG. 22 is a side view of a battery according to an embodiment of this application.

Referring to FIG. 2, FIG. 21A and FIG. 22, each of the first insulation layer 20 and the second insulation layer 30 alternatively extends from the first surface 101 to the connection zone 105. In this embodiment, the first insulation layer 20 and the second insulation layer 30 each extend from the first surface 101 to the second portion 107. Further, each of the first insulation layer 20 and the second insulation layer 30 may alternatively extend from the second portion 107 to the second surface 103. The first insulation layer 20 and the second insulation layer 30 are provided on the first surface 101 and may separate the electrode assembly 10 from the housing 80, thereby reducing contact between the electrode assembly 10 and the housing 80, reducing a possibility of damaging the housing 80 by the electrode assembly 10, and avoiding damage to the housing caused because an active substance falls off from a zone in which the electrode assembly 10 is integrated with the first insulation layer 20 and the second insulation layer 30. In addition, when the battery 100 is dropped, the first insulation layer 20 and the second insulation layer 30 may also serve as a buffer between the electrode assembly 10 and the housing 80, thereby reducing a possibility of damage to the housing 80 caused by a sharp point on a surface of the electrode assembly 10. In addition, when the first insulation layer 20 and the second insulation layer 30 extend to the second portion 107 and even the second surface 103, the first insulation layer 20 and the second insulation layer 30 may also fasten the electrode assembly 10 and inhibit the electrode assembly 10 from falling loose, thereby reducing a risk of a short circuit between the positive and negative electrodes caused by a movement of a component in the electrode assembly 10 during a dropping process, and improving safety performance of the battery 100. In this case, further, an area of projection of the first adhesion portion 40 onto the first surface 101 in the third direction Z perpendicular to the first surface 101 may be less than a total area of an orthographic projection of the first insulation layer 20 and the second insulation layer 30 onto the first surface 101, to help enhance adhesion between the electrode assembly 10 and the housing 80 through the first adhesion portion 40 on the premise that the first insulation layer 20 and the second insulation layer 30 effectively inhibit the electrode assembly 10 from falling loose, thereby improving stability between the electrode assembly 10 and the housing 80, and further improving safety performance of the battery 100. Further, a length of the zone 101a in the first direction X may be less than a half of a length of the first surface 101 in the first direction X, to further help enhance adhesion between the electrode assembly 10 and the housing 80 through the first adhesion portion 40 on the premise that the first insulation layer 20 and the second insulation layer 30 effectively inhibit the electrode assembly 10 from falling loose, thereby improving stability between the electrode assembly 10 and the housing 80, and further improving safety performance of the battery 100.

Figure 23:
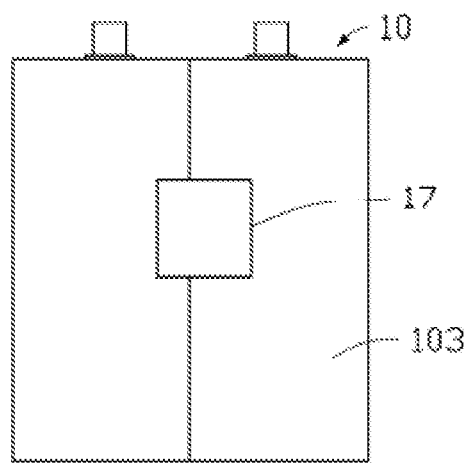
FIG. 23 is a rear view of a battery according to an embodiment of this application.
Figure 24:
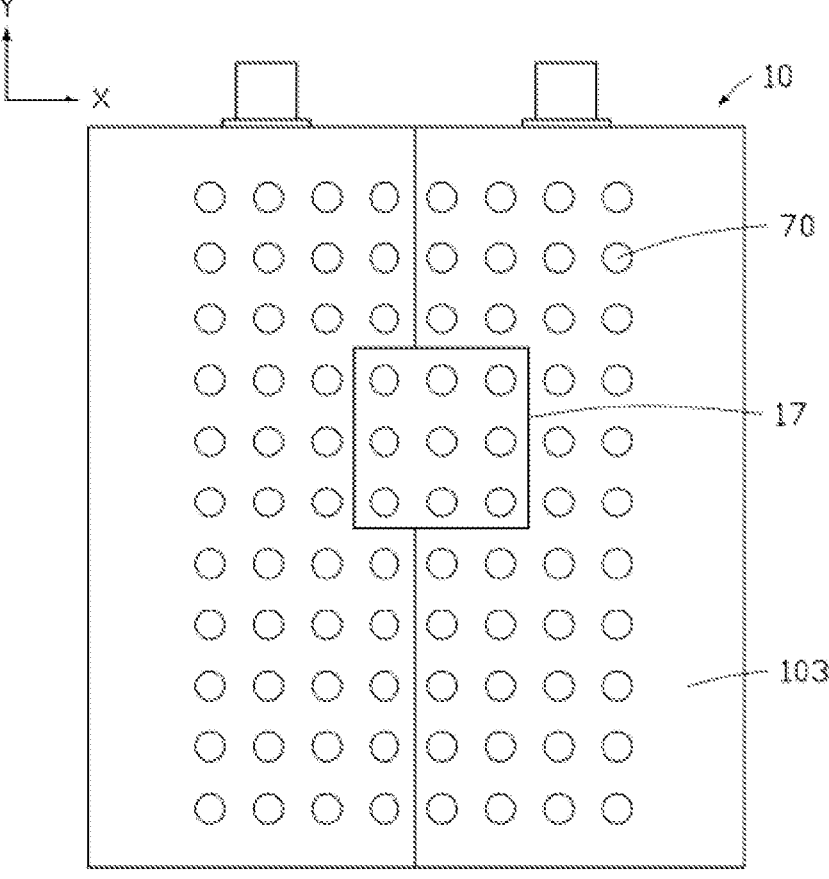
FIG. 24 is a bottom view of a battery according to an embodiment of this application.

Referring to FIG. 23 and FIG. 24, the electrode assembly 10 may further include a third insulation layer 17, and the third insulation layer 17 is provided on the second surface 103 and fastens to an end of an outermost ring of the electrode assembly 10. The outermost ring of the electrode assembly 10 may be a positive electrode plate, a negative electrode plate, or a separator.

Figure 25:
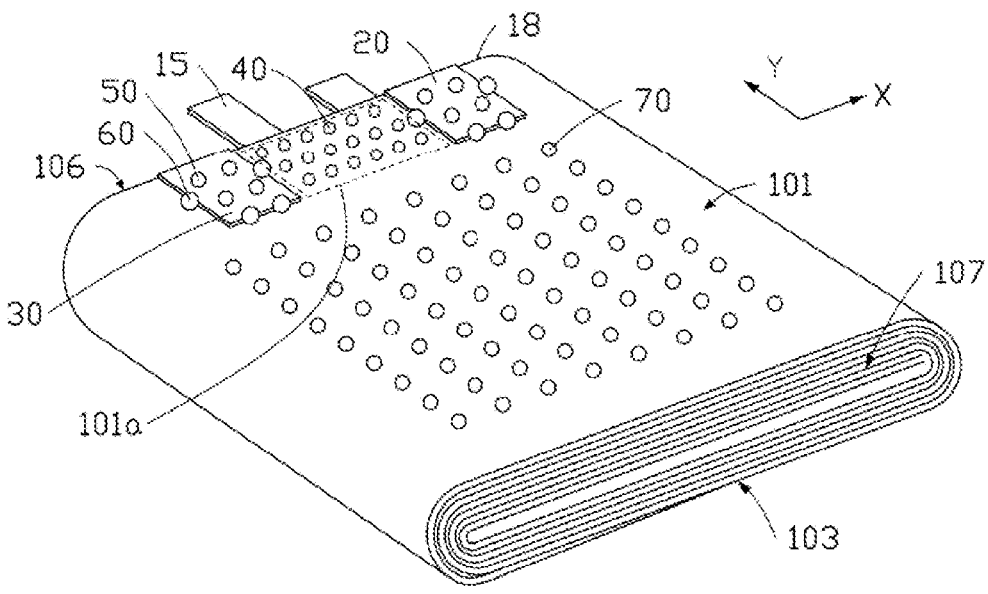
FIG. 25 is a schematic structural diagram of a battery according to an embodiment of this application.
Figure 26:
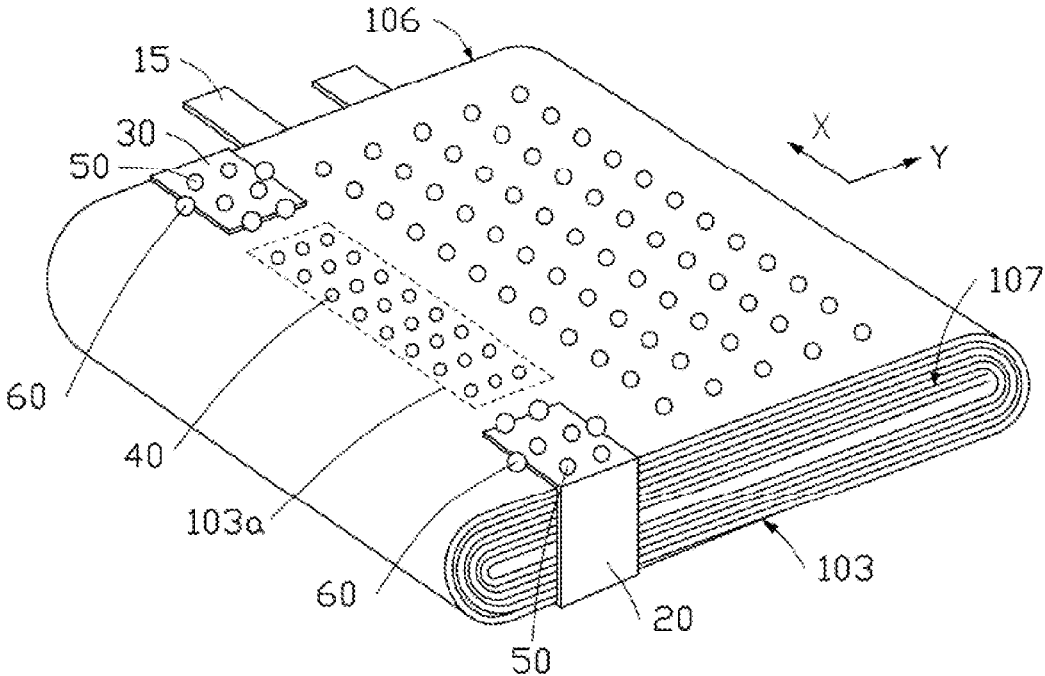
FIG. 26 is a schematic structural diagram of a battery according to an embodiment of this application.

In some embodiments, a location for providing the first insulation layer 20 and the second insulation layer 30 is not limited to the foregoing situation. For example, referring to FIG. 25, the first insulation layer 20 may alternatively extend from the first portion 106 to the first surface 101 but apart from the second portion 107, and the second insulation layer 30 may alternatively extend from the first portion 106 to the first surface 101 but apart from the second portion 107. The first surface 101 and the first portion 106 intersect at the second edge 18. Further, when viewed in the third direction Z, the first insulation layer 20 may extend from the second edge 18 to the second portion 107 along the first surface 101 but apart from the second portion 107;

and the second insulation layer 30 may extend from the second edge 18 to the second portion 107 along the first surface 101 but apart from the second portion 107. For another example, referring to FIG. 26, the first insulation layer 20 extends from the second portion 107 to the first surface 101 but apart from the first portion 106, and the second insulation layer 30 extends from the first portion 106 to the first surface 101 but apart from the second portion 107. In this case, the first direction X is perpendicular to a direction in which the second portion 107 is located. In some embodiments, the electrode assembly 10 may also be a stacked structure.

Figure 27:
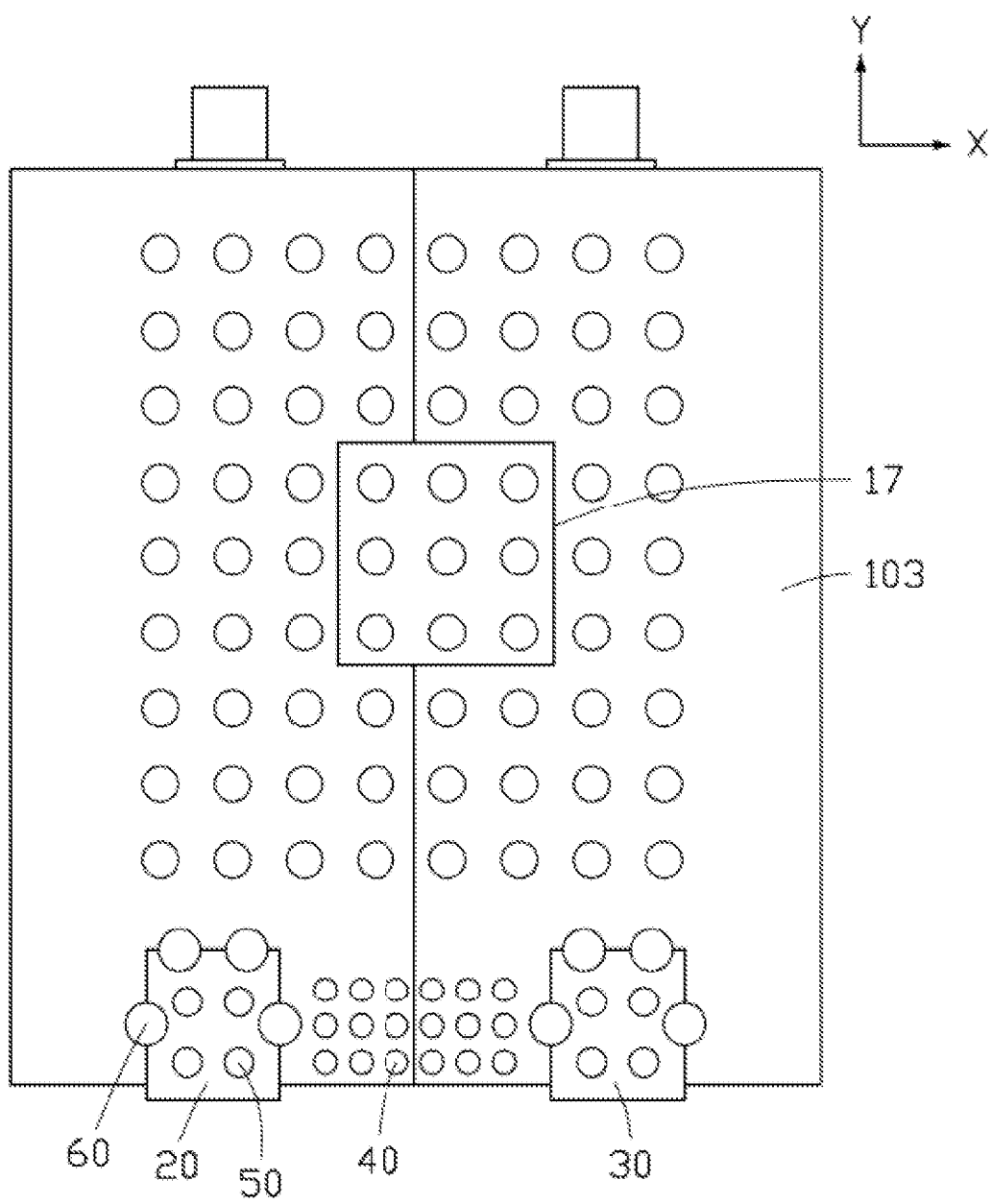
FIG. 27 is a bottom view of a battery according to an embodiment of this application.

In some embodiments, referring to FIG. 24 and FIG. 27, the fourth adhesion portion 70 may alternatively be provided on the second surface 103 and may alternatively be provided on the third insulation layer 17. When the first insulation layer 20 and the second insulation layer 30 extend to the second surface 103, the first adhesion portion 40, the second adhesion portion 50, and the third adhesion portion 60 may also be provided corresponding to the first insulation layer 20 and the second insulation layer 30 on the second surface 103.

The method for manufacturing the battery 100 includes the following steps: providing the electrode assembly 10; pasting the first insulation layer 20 and the second insulation layer 30 on the electrode assembly 10; forming the first adhesion portion 40 on a surface of the electrode assembly 10 through a manner including, for example, but not limited to screen printing or dispensing with a spray gun; accommodating, in the housing 80, the electrode assembly 10 provided with the first adhesion portion 40, the first insulation layer 20, the second insulation layer 30, and the third insulation layer 17; and then compressing an outer side of the housing 80, so that the first adhesion portion 40 adheres to an inner side of the housing 80.

The method for manufacturing the battery 100 may further include: pasting the third insulation layer 17 on the electrode assembly 10 before the first adhesion portion 40 is formed. Preferably, the third insulation layer 17 is pasted on the electrode assembly 10 before the first insulation layer 20 and the second insulation layer 30 are pasted on the electrode assembly 10.

The method for manufacturing the battery 100 may further include: before the electrode assembly 10 is accommodated in the housing 80, forming the second adhesion portion 50 on a surface of at least one of the first insulation layer 20 and the second insulation layer 30 through the manner including, for example, but not limited to the screen printing or the dispensing with the spray gun. After the outer side of the housing 80 is compressed, the second adhesion portion 50 adheres to the inner side of the housing 80.

The method for manufacturing the battery 100 may further include: before the electrode assembly 10 is accommodated in the housing 80, forming the third adhesion portion 60 on a surface of at least one of the first insulation layer 20 and the second insulation layer 30 and on the surface of the electrode assembly 10 through the manner including, for example, but not limited to the screen printing or the dispensing with the spray gun. After the outer side of the housing 80 is compressed, the third adhesion portion 60 adheres to the inner side of the housing 80.

The method for manufacturing the battery 100 may further include: before the electrode assembly 10 is accommodated in the housing 80, forming the fourth adhesion portion 70 on the surface of the electrode assembly 10 through the manner including, for example, but not limited to the screen printing or the dispensing with the spray gun. After the outer side of the housing 80 is compressed, the fourth adhesion portion 70 adheres to the inner side of the housing 80.

The stacked electrode assembly 10' is further described by using an example below.

Figure 7:
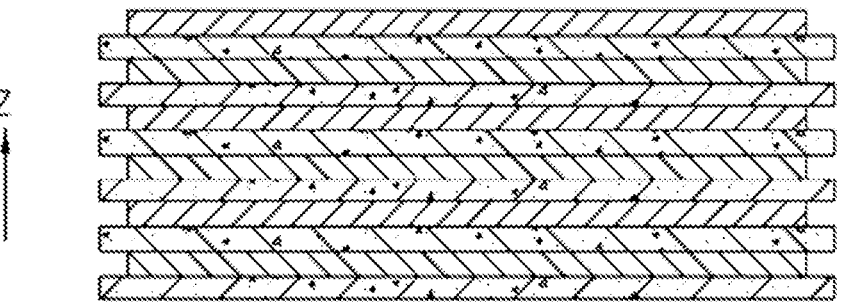
FIG. 7 is a schematic structural diagram of an electrode assembly according to an embodiment of this application.

Referring to FIG. 7, different from the electrode assembly 10Ea (as shown in FIG. 6) formed by stacking and winding stacked bodies 10E, an electrode assembly 10' is formed by directly stacking a plurality of stacked bodies 10E along a direction Z.

Figure 35A:
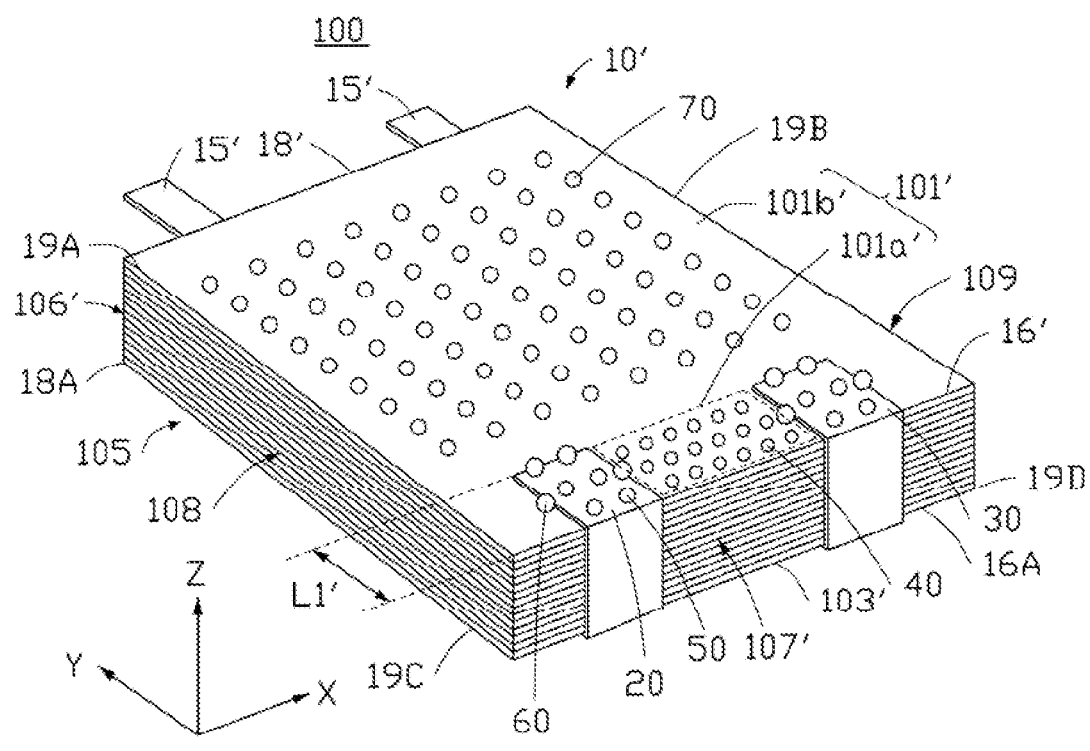
FIG. 35A is a schematic structural diagram of a battery according to an embodiment of this application.

Referring to FIG. 35A, the electrode assembly 10' includes eight edges perpendicular to the direction Z. In this embodiment, a first surface 101' is, for example, a zone enclosed by a first edge 16', a third edge 19A, a second edge 18', and a fourth edge 19B that are sequentially connected end to end when viewed in the direction Z shown in FIG. 35A. The third edge 19A and the fourth edge 19B are provided opposite each other. A second surface 103' is, for example, a zone enclosed by a first edge 16A, a third edge 19C, a second edge 18A, and a fourth edge 19D that are sequentially connected end to end when viewed in the direction Z shown in FIG. 35A. The first edge 16A and the second edge 18A are provided opposite each other, and the third edge 19C and the fourth edge 19D are provided opposite each other. The first surface 101' and the second surface 103' are provided back away from each other, and are portions of an outer surface of the electrode assembly 10'. The outer surface of the electrode assembly 10' further includes a connection zone 105' connecting an edge of the first surface 101' and an edge of the second surface 103'. In the stacked electrode assembly 10', each current collector may be provided with a metal portion 15'.

Figure 35B:
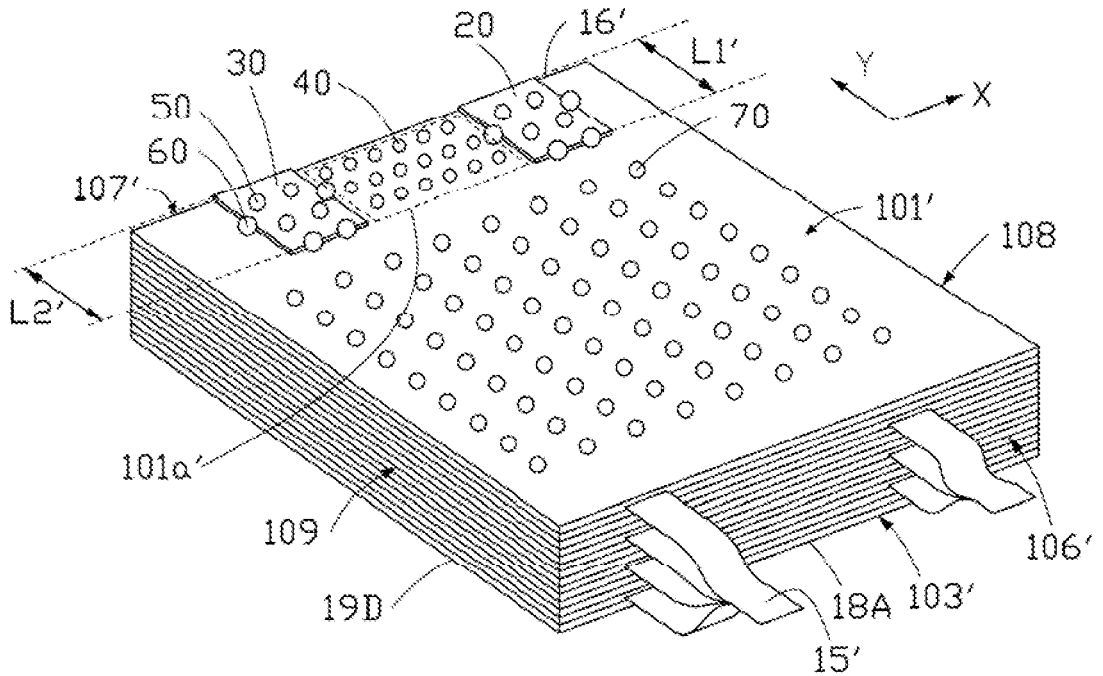
FIG. 35B is a schematic structural diagram of a battery according to an embodiment of this application.
Figure 36A:
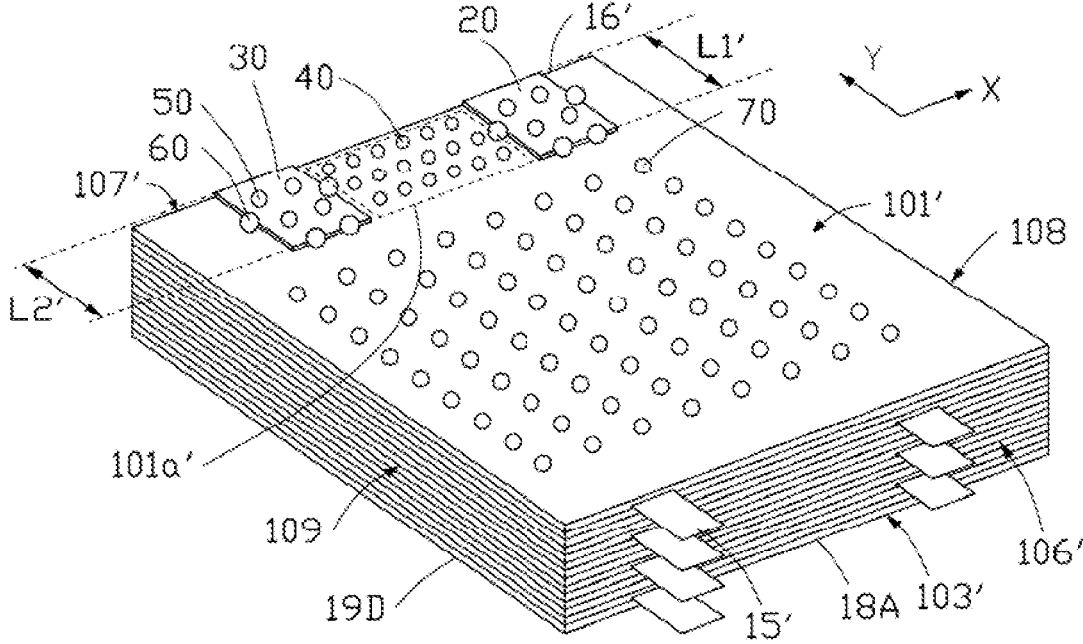
FIG. 36A is a schematic structural diagram of a battery according to an embodiment of this application.

In this embodiment, referring to FIG. 35A, FIG. 35B, and FIG. 36A, the connection zone 105' includes a first portion 106', a third portion 108, a second portion 107', and a fourth portion 109 that are sequentially connected. The first portion 106' and the second portion 107' are provided back away from each other. The third portion 108 and the fourth portion 109 are provided back away from each other.

The electrode assembly 10' may further include a metal portion 15', and the metal portion 15' extends from the first portion 106' in a direction back away from the second portion 107'.

The first insulation layer 20 and the second insulation layer 30 are both provided on the first surface 101', and the first insulation layer 20 and the second insulation layer 30 are spaced apart along a first direction X.

In this embodiment, when viewed in the third direction Z, the first insulation layer 20 may be, for example, rectangular. The first insulation layer 20 may, for example, at least include but is not limited to one or more of polyimide, polyvinyl chloride, polyethylene, and polypropylene. When viewed in the third direction Z, the second insulation layer 30 may be, for example, rectangular. The second insulation layer 30 may, for example, at least include but is not limited to one or more of polyimide, polyvinyl chloride, polyethylene, and polypropylene.

The first surface 101' and the second portion 107' intersect at the first edge 16'. In some embodiments, the first direction X is a direction in which the first edge 16' is located. When viewed in the third direction Z, the first insulation layer 20 and the second insulation layer 30 each extend from the first edge 16' along the first surface 101' toward the first portion 106' but do not reach the first portion 106'.

A length L1' of the first insulation layer 20 extending from the first edge 16' toward the first portion 106' and a length L2' of the second insulation layer 30 extending from the first edge 16' toward the first portion 106' are not particularly limited in a case that the first insulation layer 20 apart from the first portion 106' and the second insulation layer 30 apart from the first portion 106'. In this embodiment, the length L1' of the first insulation layer 20 extending from the first edge 16' toward the first portion 106' is equal to the length L2' of the second insulation layer 30 extending from the first edge 16' toward the first portion 106'. In this case, the foregoing length direction is defined as the second direction Y. It should be understood that, in this embodiment, an equal length or width of the two components generally means that a difference between a length or a width of a component and a corresponding length or width of the other component is within ±3 mm.

The first insulation layer 20 and the second insulation layer 30 may each include an adhesive layer and a substrate that are laminated. The adhesive layer adheres to the substrate and the electrode assembly 10'. The adhesive layer may, for example, include but is not limited to at least one of natural rubber, synthetic rubber, acrylate, silica gel, and ethylene-vinyl acetate. The substrate may, for example, include but is not limited to at least one of polyethylene, polypropylene, Teflon, polyvinyl chloride, polyimide, and non-woven fabric.

Figure 36B:
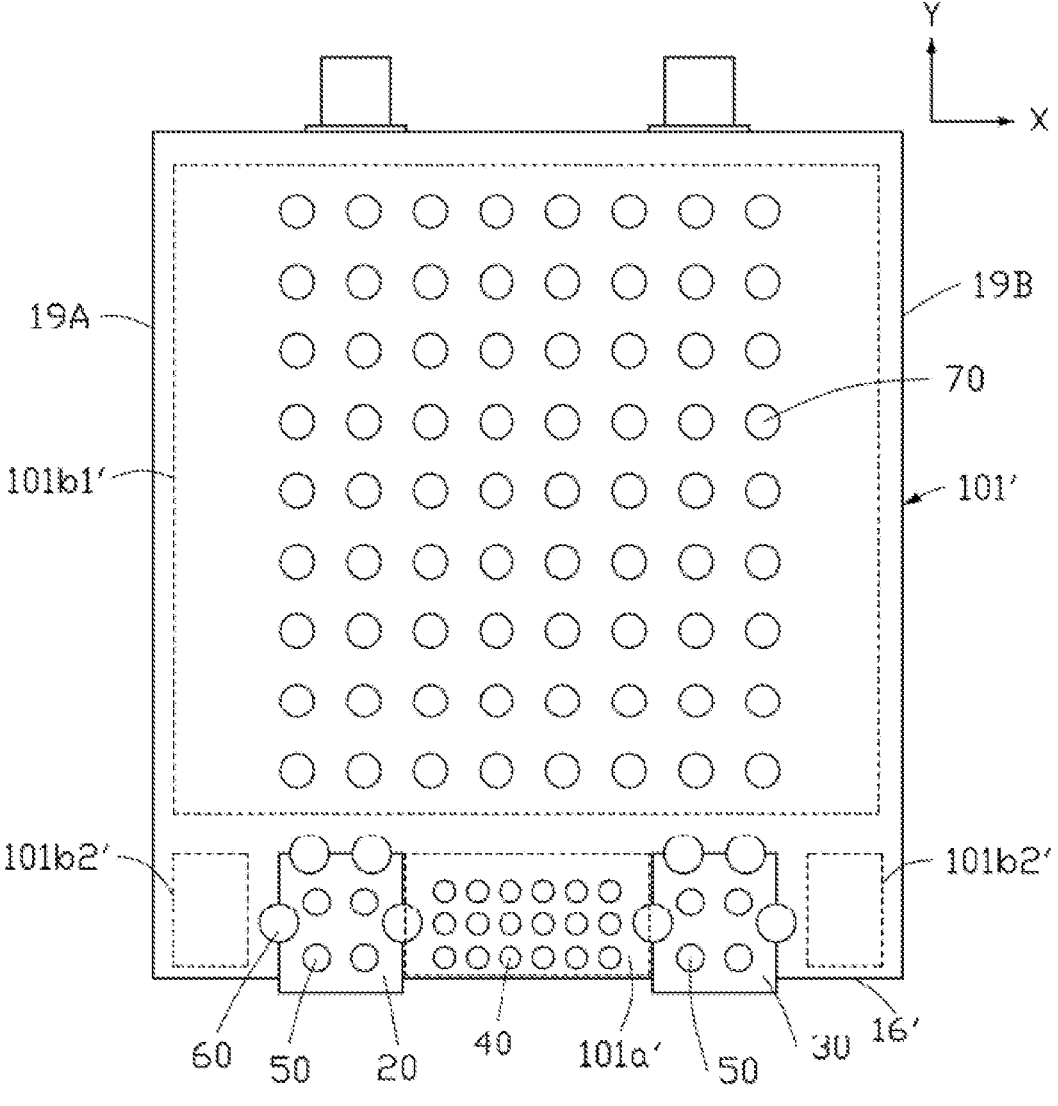
FIG. 36B is a front view of a battery according to an embodiment of this application.
Figure 37:
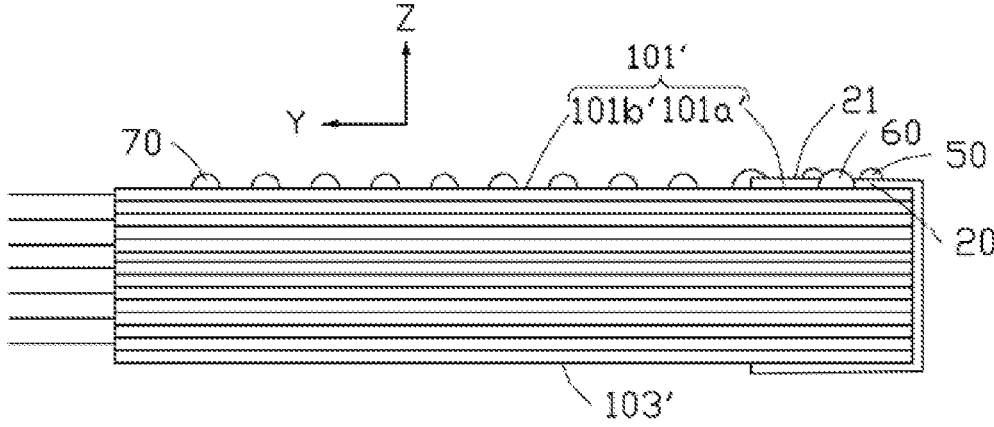
FIG. 37 is a side view of a battery according to an embodiment of this application.

Referring to FIG. 35A, FIG. 37, and FIG. 36B, when viewed in the third direction Z perpendicular to the first surface 101', the first adhesion portion 40 is provided on the first surface 101' and located in a zone 101$a$' between the first insulation layer 20 and the second insulation layer 30. In the second direction Y, the first adhesion portion 40 extends beyond neither the first insulation layer 20 nor the second insulation layer 30. In some embodiments, a length of the zone 101$a$' in the first direction X may be less than a half of a length of the first surface 101' in the first direction X.

In some embodiments, an area of an orthographic projection of the first adhesion portion 40 onto the first surface 101', that is, an area of projection of the first adhesion portion 40 onto the first surface 101' along the third direction Z perpendicular to the first surface 101', may be less than a total area of an orthographic projection of the first insulation layer 20 and the second insulation layer 30 onto the first surface 101'. Further, in some embodiments, the area of the orthographic projection of the first adhesion portion 40 onto the first surface 101' may be less than an area of an orthographic projection of the first insulation layer 20 onto the first surface 101', and may also be less than an area of an orthographic projection of the second insulation layer 30 onto the first surface 101'.

Figure 38:
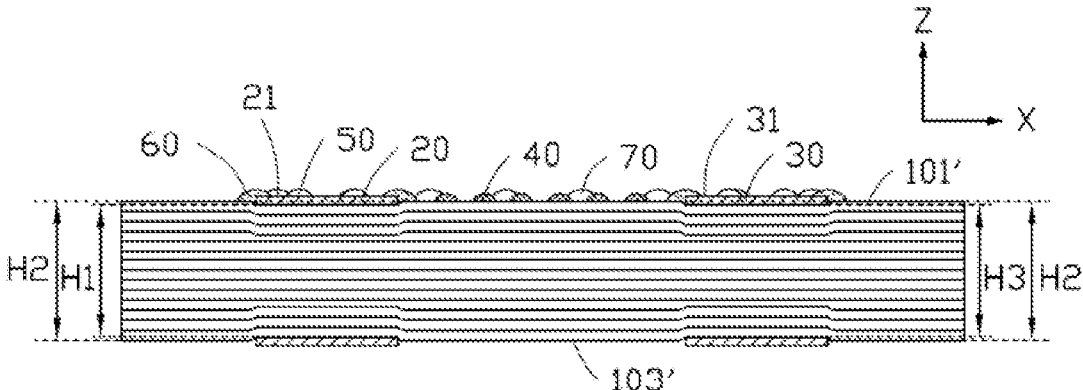
FIG. 38 is a schematic cross-sectional diagram of a battery in a first direction according to an embodiment of this application.

Referring to FIG. 38, a first distance H1 from at least a part of an overlapped zone of the first surface 101' and the first insulation layer 20 to the second surface 103' is less than a second distance H2 from the first adhesion portion 40 to the second surface 103'. On the premise of ensuring that the first distance H1 is less than the second distance H2, distances from different locations in the at least a part of the overlapped zone of the first surface 101' and the first insulation layer 20 to the second surface 103' may be different. Further, referring to FIG. 35A, FIG. 36B, and FIG. 38, in the at least a part of an overlapped zone of the first edge 16' and the first insulation layer 20, the first distance H1 from a corresponding bottom portion of the first insulation layer 20 on the first surface 101' to the second surface 103' is less than the second distance H2 from the first adhesion portion 40 to the second surface 103'.

Figure 39:
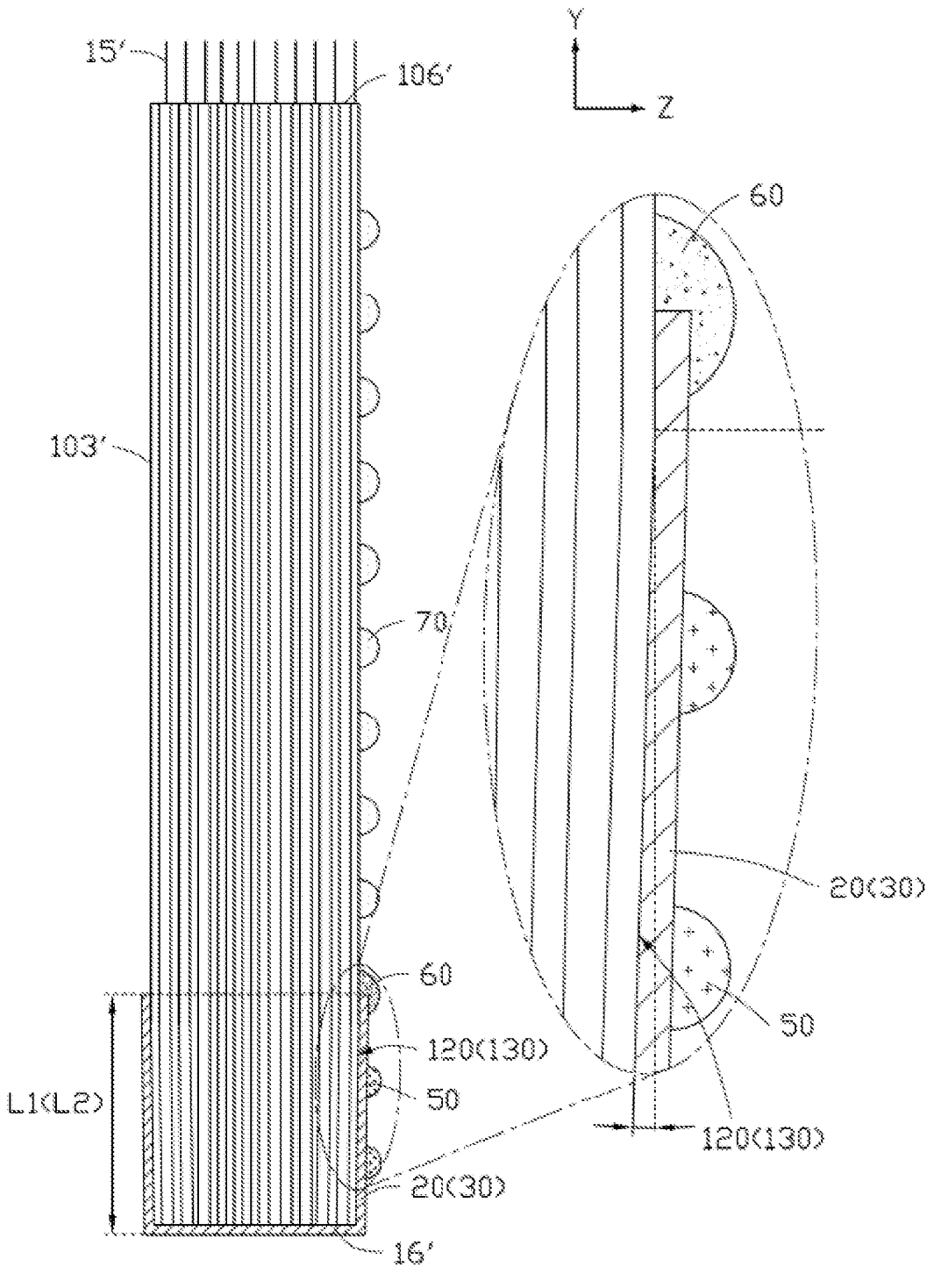
FIG. 39 is a schematic cross-sectional diagram of a battery in a second direction according to an embodiment of this application.

Specifically, referring to FIG. 39, a first recess 120 is provided on the first surface 101', and the first recess 120 is such provided that it extends from the first edge 16' toward the first portion 106'. At least a portion of the first insulation layer 20 further away from the first portion 106' is provided in the first recess 120. In this embodiment, the first recess 120 may be an inclined groove whose depth gradually decreases from the first edge 16' toward the first portion 106' along the second direction Y. A portion of the first insulation layer 20 close to the first portion 106' may be located outside the first recess 120.

Referring to FIG. 35A, FIG. 36B, and FIG. 38, a third distance H3 from at least a part of an overlapped zone of the first surface 101' and the second insulation layer 30 to the second surface 103' is less than the second distance H2. On the premise of ensuring that the third distance H3 is less than the second distance H2, distances from different locations in the at least a part of an overlapped zone of the first surface 101' and the second insulation layer 30 to the second surface 103' may be different. Further, herein, in the at least a part of an overlapped zone of the first edge 16' and the second insulation layer 30, the third distance H3 from a corresponding button portion of the second insulation layer 30 on the first surface 101' to the second surface 103' is less than the second distance H2.

Referring to FIG. 39, a second recess 130 is provided on the first surface 101', and the second recess 130 is such provided that it extends from the first edge 16' toward the first portion 106'. At least a portion of the second insulation layer 30 further away from the first portion 106' is provided in the second recess 130. In this embodiment, the second recess 130 may be an inclined groove whose depth gradually decreases from the first edge 16' toward the first portion 106' along the second direction Y. A portion of the second insulation layer 30 close to the first portion 106' may be located outside the second recess 130.

Figure 40:
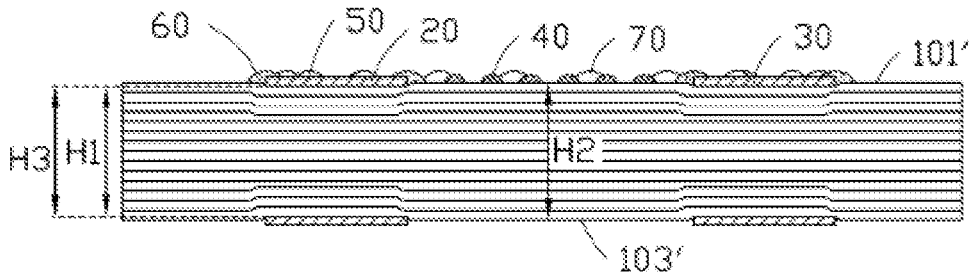
FIG. 40 is a schematic cross-sectional diagram of a battery in a first direction according to an embodiment of this application.

In some embodiments, referring to FIG. 40, the first distance H1 may be equal to the third distance H3. In some embodiments, the first distance H1 may not be equal to the third distance H3.

Figure 41:
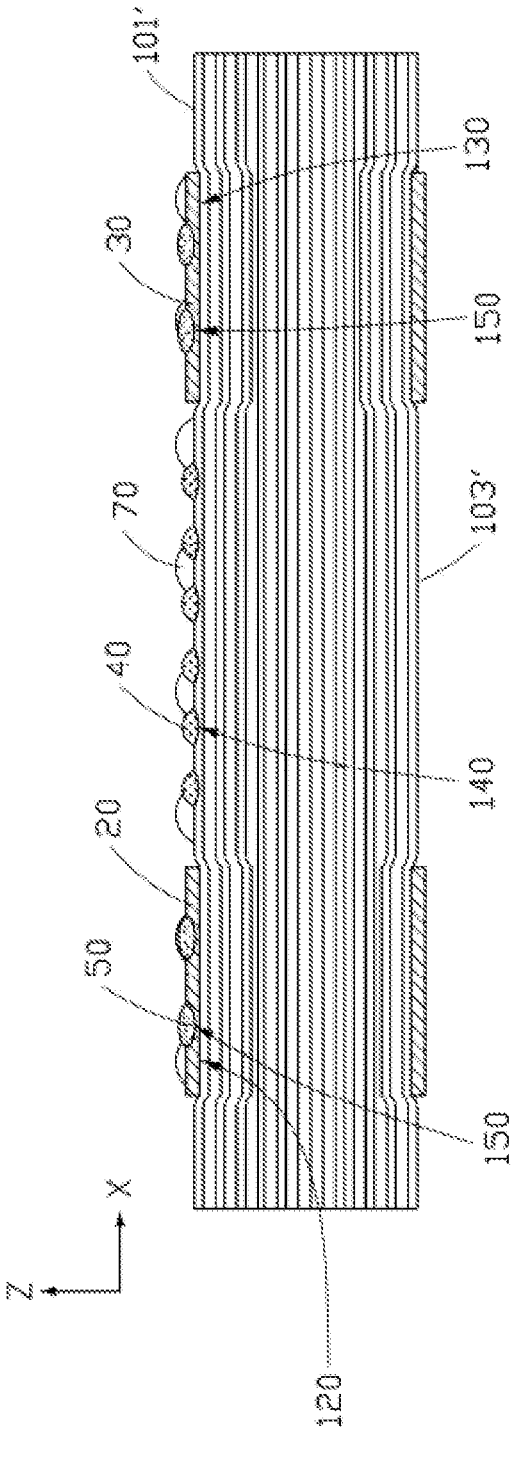
FIG. 41 is a schematic cross-sectional diagram of a battery in a first direction according to an embodiment of this application.

Referring to FIG. 41, the first surface 101' may be provided with a first groove 140, and the first adhesion portion 40 is located in the first groove 140. In this embodiment, there are a plurality of first adhesion portions 40, there are a plurality of first grooves 140, and each first adhesion portion 40 is located in one first groove 140.

Figure 36C:
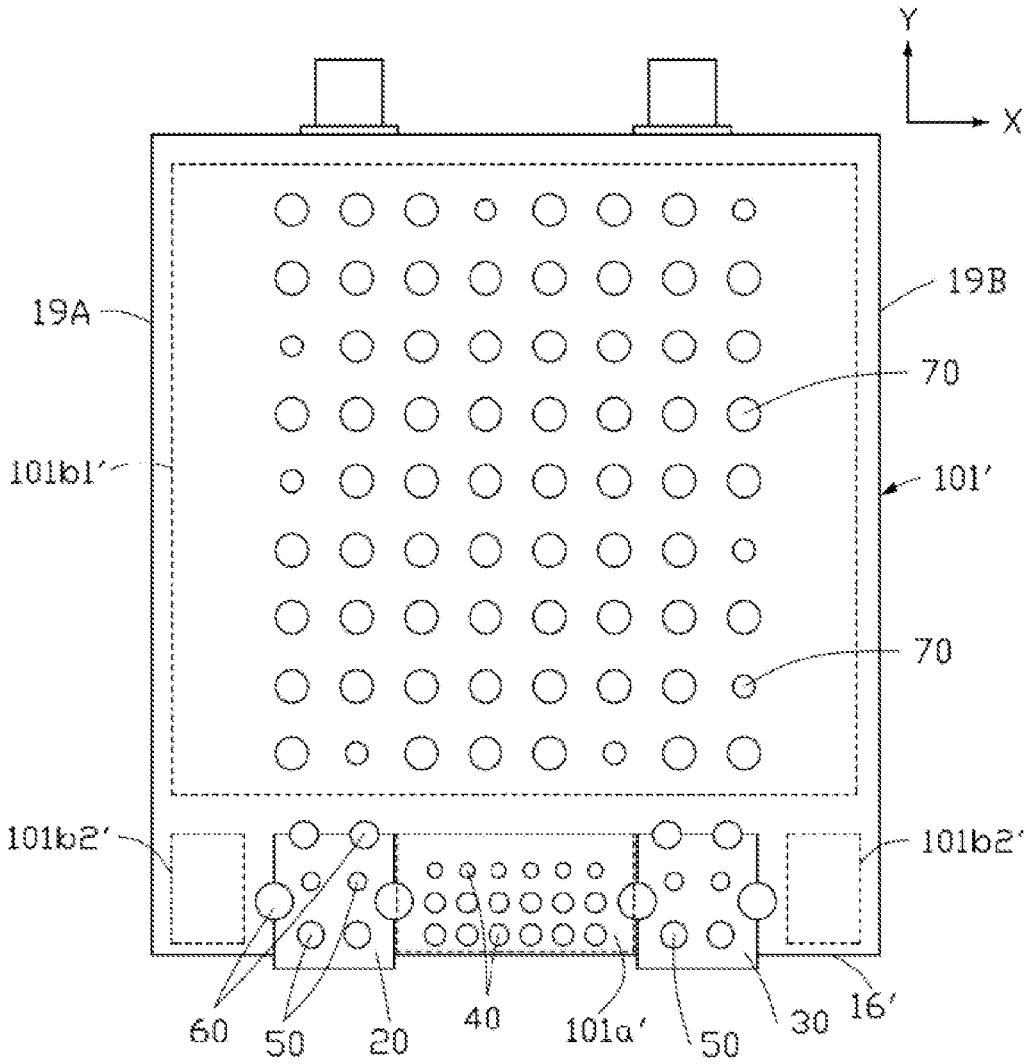
FIG. 36C is a front view of a battery according to an embodiment of this application.

When viewed in the third direction Z, neither a shape nor a size of the first adhesion portion 40 is limited, and the shape may be a round shape (refer to FIG. 36B), a rectangular shape (refer to FIG. 14 and FIG. 15), a strip shape (refer to FIG. 16), another regular or irregular shape, or a combination of these graphics. The number of the first adhesion portions 40 may also be set as actually needed, and may be one or more. When there are a plurality of first adhesion portions 40, the plurality of first adhesion portions 40 are spaced apart (for example, arranged into a dot array). When viewed in the third direction Z, the battery 100 may include at least two first adhesion portions 40 (refer to FIG. 17) with different shapes, or may include at least two first adhesion portions 40 of different sizes (refer to FIG. 36C). In some embodiments, referring to FIG. 36B, when viewed in the third direction Z, shapes of all the first adhesion portions 40 may also be the same.

Figure 42:
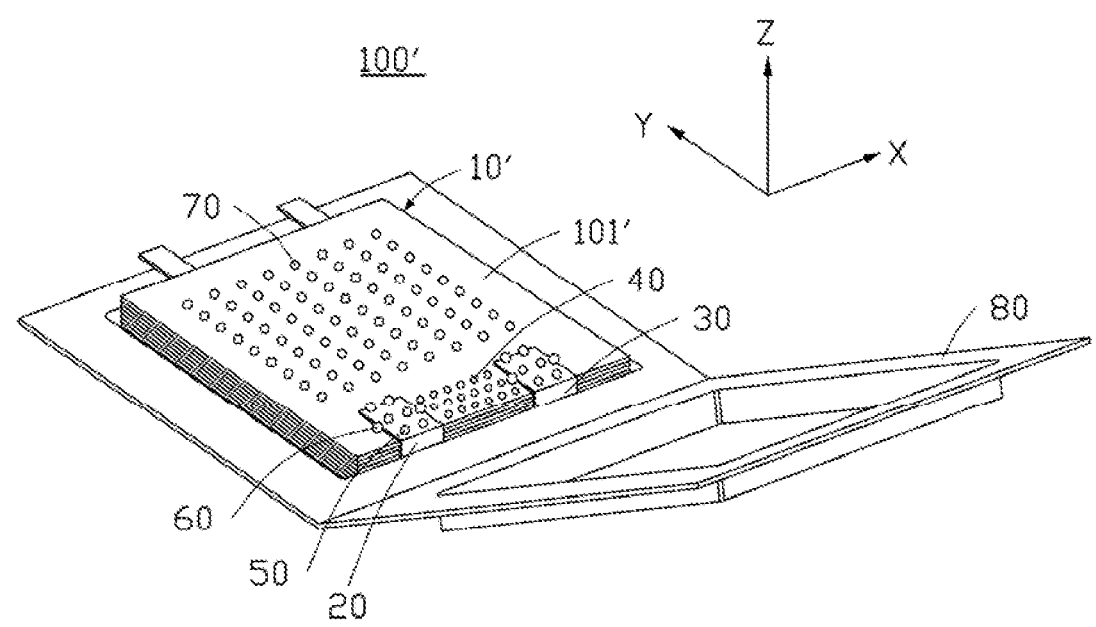
FIG. 42 is a schematic partial exploded view of a battery according to an embodiment of this application.
Figure 43:
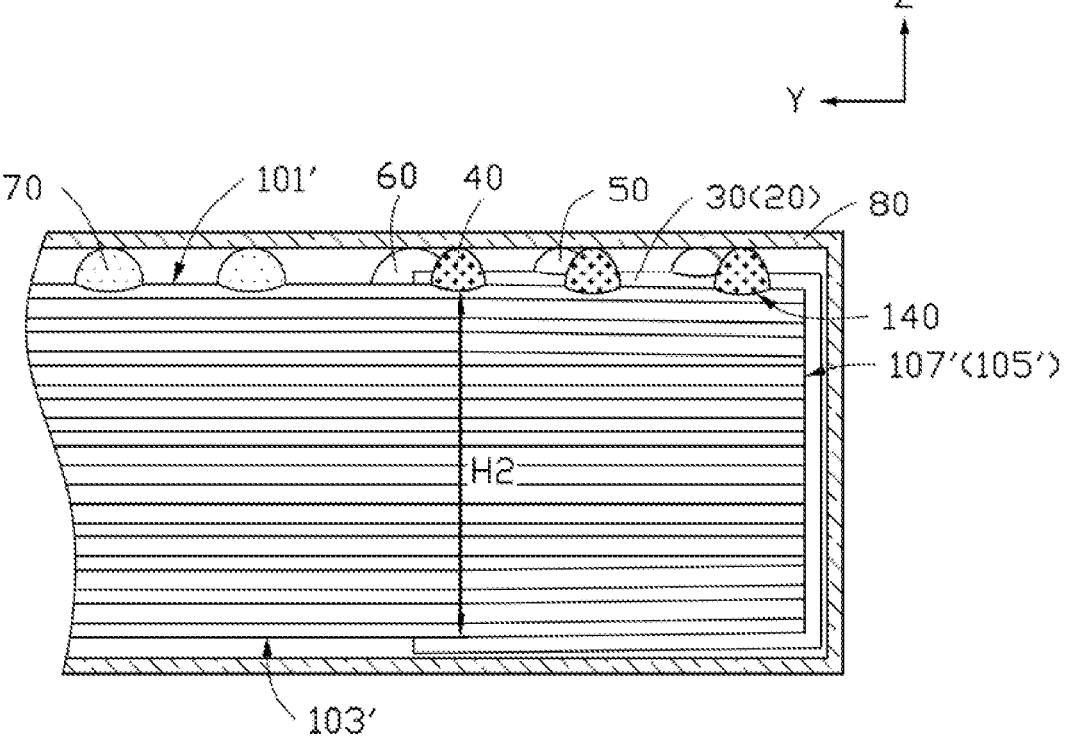
FIG. 43 is a schematic partial cross-sectional diagram of a battery in a second direction according to an embodiment of this application.
Figure 44:
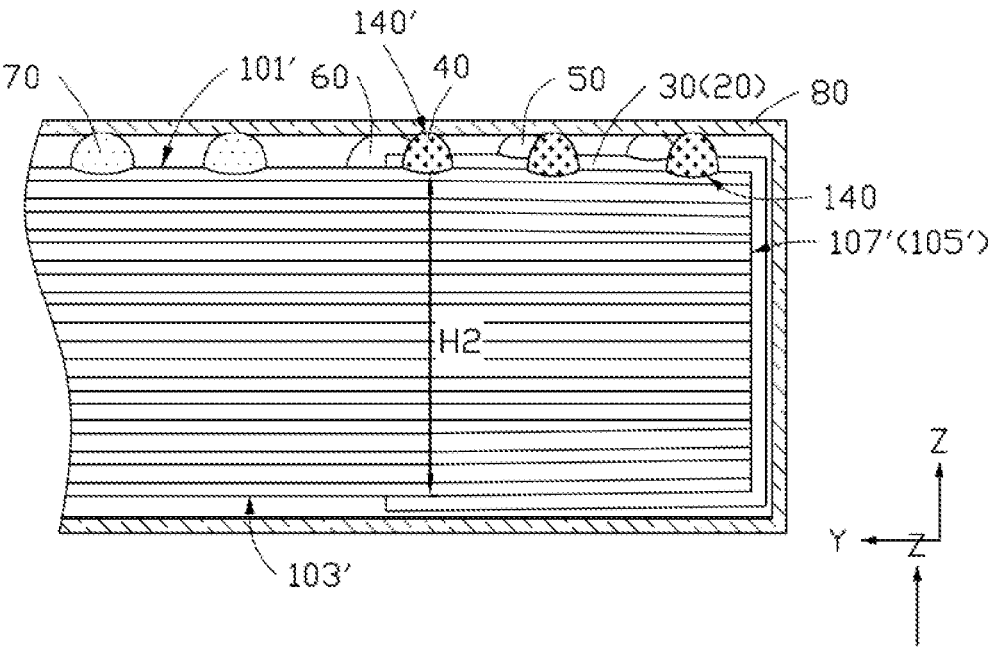
FIG. 44 is a schematic partial cross-sectional diagram of a battery in a second direction according to an embodiment of this application.

Referring to FIG. 18 and FIG. 42, the battery 100 may further include a housing 80. The housing 80 may be, for example, but is not limited to, one or more of an aluminum-plastic film, a heat shrinkable film, an aluminum housing, and a steel housing. The housing 80 encloses the electrode assembly 10', the first insulation layer 20, and the second insulation layer 30, and adheres to the electrode assembly 10' through the first adhesion portion 40 (refer to both FIG. 43 and FIG. 44). In some embodiments, as shown in FIG. 44, the housing 80 may be provided with a groove 140', and a portion of the first adhesion portion 40 is located in the groove 140'. The first adhesion portion 40 is provided in the zone 101$a$' between the first insulation layer 20 and the second insulation layer 30, so that compression degrees of a zone in which each of the first insulation layer 20 and the second insulation layer 30 is provided in the battery 100 and a zone corresponding to the zone 101*a*' in the battery during chemical conversion are more uniform in a horizontal direction (that is, along the first direction X and the second direction Y), thereby helping reduce a deformation degree of the battery 100 during use. Providing the first adhesion portion 40 between the first insulation layer 20 and the second insulation layer 30 may increase an adhesion force between the electrode assembly 10' and the housing 80, to suppress relative displacement between the electrode assembly 10' and the housing 80 when the battery 100 is subject to an external force, thereby further reducing a possibility of damage to the battery 100 due to the external force and prolonging service life of the battery 100. In addition, because the first adhesion portion 40 adheres to the housing 80 and the electrode assembly 10', thereby further helping suppress deformation of the electrode assembly 10'. In addition, a shape of the first adhesion portion 40 after adhesion to the housing 80 may change. When there are a plurality of first adhesion portions 40, after the plurality of first adhesion portions 40 adhere to the housing 80, the plurality of first adhesion portions 40 may be spaced apart, or adjacent first adhesion portions 40 are connected to each other (refer to FIG. 16).

Referring to FIG. 35A, FIG. 37, FIG. 36B, and FIG. 38, the battery 100 may further include a second adhesion portion 50, and the second adhesion portion 50 is provided on a surface 21 of the first insulation layer 20 facing away from the second surface 103'. An area of an orthographic projection of the second adhesion portion 50 onto the first surface 101' is smaller than an area of an orthographic projection of the first insulation layer 20 onto the first surface 101'. A surface 31 of the second insulation layer 30 facing away from the second surface 103' may also be provided with the second adhesion portion 50. In this case, an area of an orthographic projection of the second adhesion portion 50 onto the first surface 101' is smaller than an area of an orthographic projection of the second insulation layer 30 onto the first surface 101'.

The second adhesion portion 50 may, for example, at least include but is not limited to one polymer or a mixture formed by a combination of any polymers in cellulose, poly(vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and polypropylene-maleic anhydride.

When viewed in the third direction Z, a shape of the second adhesion portion 50 is not limited, and the shape may be a round shape, a rectangular shape, a strip shape, another regular or irregular shape, or a combination of these graphics. The number of the second adhesion portions 50 may also be set as actually needed, and may be one or more. When there are a plurality of second adhesion portions 50, the plurality of second adhesion portions 50 are spaced apart (for example, arranged into a dot array). When viewed in the third direction Z, the battery 100 may include at least two second adhesion portions 50 with different shapes. In some embodiments, when viewed in the third direction Z, shapes of all the second adhesion portions 50 may also be the same.

In some embodiments, referring to FIG. 41, a surface of the first insulation layer 20 facing away from the second surface 103' is provided with a second groove 150, and the second adhesion portion 50 is located in the second groove 150.

Figure 45:
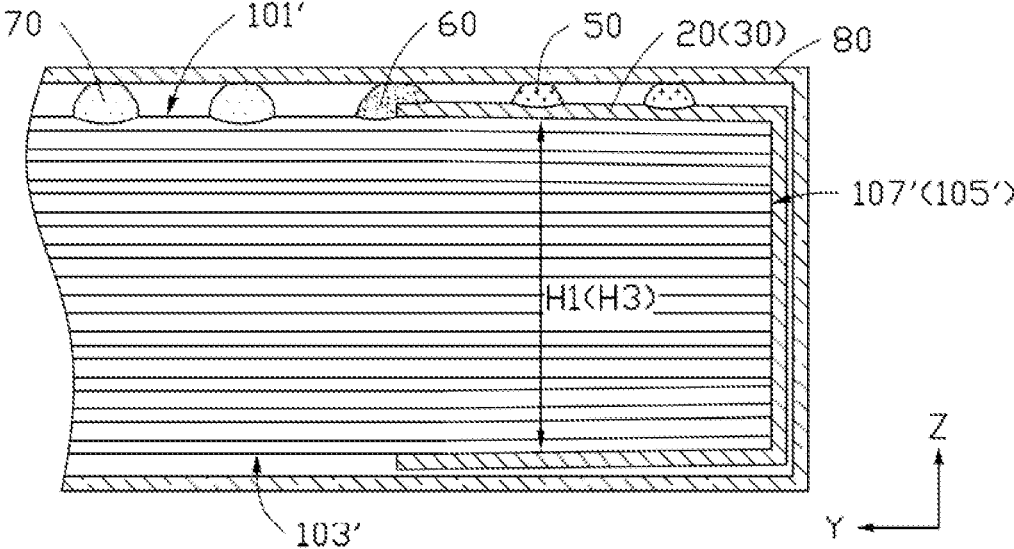
FIG. 45 is a schematic partial cross-sectional diagram of a battery in a second direction according to an embodiment of this application.
Figure 46:
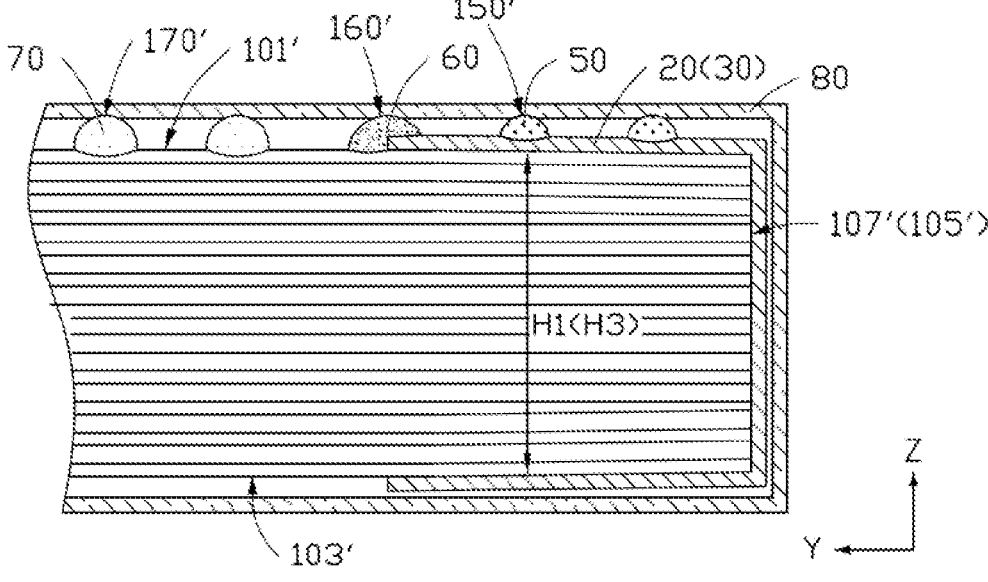
FIG. 46 is a schematic partial cross-sectional diagram of a battery in a second direction according to an embodiment of this application.

Referring to FIG. 18, FIG. 45, and FIG. 46, the housing 80 adheres to the first insulation layer 20 through the second adhesion portion 50. The housing 80 may alternatively adhere to the second insulation layer 30 through the second adhesion portion 50. The housing 80 may alternatively adhere to the first insulation layer 20 and the second insulation layer 30 through the second adhesion portion 50. When there are a plurality of second adhesion portions 50, after the plurality of second adhesion portions 50 adhere to the housing 80, the plurality of second adhesion portions 50 may be spaced apart, or adjacent second adhesion portions 50 are connected to each other. In some embodiments, as shown in FIG. 46, the housing 80 may be further provided with a groove 150', and a portion of the second adhesion portion 50 is located in the groove 150'.

Referring to FIG. 35A, FIG. 37, and FIG. 36B, the battery 100 may further include a third adhesion portion 60, and the third adhesion portion 60 is provided on a surface 21 of the first insulation layer 20 facing away from the second surface 103', and extends across an intersection zone of the first insulation layer 20 and the first surface 101' to the first surface 101'.

The third adhesion portion 60 may, for example, at least include but is not limited to one polymer or a mixture formed by a combination of any polymers in cellulose, poly(vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and polypropylene-maleic anhydride.

Referring to FIG. 18, FIG. 45, and FIG. 46, the third adhesion portion 60 adheres to the housing 80. The housing 80 may adhere to the first insulation layer 20 through the third adhesion portion 60. The housing 80 may alternatively adhere to the second insulation layer 30 through the third adhesion portion 60. The housing 80 may alternatively adhere to both the first insulation layer 20 and the second insulation layer 30 through the third adhesion portion 60. In some embodiments, as shown in FIG. 46, the housing 80 may be further provided with a groove 160', and a portion of the third adhesion portion 60 is located in the groove 160'.

Referring to FIG. 36B, FIG. 35A, FIG. 37, FIG. 45, and FIG. 46, the battery 100 may further include a fourth adhesion portion 70, and the fourth adhesion portion 70 is provided on a zone 101*b*' of the first surface 101'. The zone 101*b*' is spaced apart from a zone in which each of the first insulation layer 20 and the second insulation layer 30 is provided in the first surface 101' and the zone 101*a*' of the first surface 101', and the fourth adhesion portion 70 is in contact with neither the first insulation layer 20 nor the second insulation layer 30.

Specifically, referring to FIG. 36B, the zone 101*b*' includes a first section 101*b*1' and a second section 101*b*2'. The first section 101*b*1' faces away from the zone 101*a*' in the second direction Y. The second section 101*b*2' is located on a side of the first insulation layer 20 facing away from the second insulation layer 30 and a side of the second insulation layer 30 facing away from the first insulation layer 20 in the first direction X. In this embodiment, the fourth adhesion portion 70 is located in a first section 101*b*1' of the zone 101*b'*.

The fourth adhesion portion 70 may, for example, at least include but is not limited to one polymer or a mixture formed by a combination of any polymers in cellulose, poly(vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and polypropylene-maleic anhydride.

When viewed in the third direction Z, a shape of the fourth adhesion portion 70 is not limited, and the shape may be a round shape (refer to FIG. 36B), a rectangular shape (refer to FIG. 14 and FIG. 15), a strip shape (refer to FIG. 16), another regular or irregular shape, or a combination of these graphics. The number of the fourth adhesion portions 70 may also be set as actually needed, and may be one or more. When there are a plurality of fourth adhesion portions 70, the plurality of fourth adhesion portions 70 are spaced apart (for example, arranged into a dot array). When viewed in the third direction Z, the battery 100 may include at least two fourth adhesion portions 70 (refer to FIG. 17) with different shapes. In some embodiments, when viewed in the third direction Z, shapes of all the fourth adhesion portions 70 may also be the same.

Referring to FIG. 18, FIG. 45, and FIG. 46, the housing 80 further adheres to the electrode assembly 10' through the fourth adhesion portion 70. When there are a plurality of fourth adhesion portions 70, after the plurality of fourth adhesion portions 70 adhere to the housing 80, the plurality of fourth adhesion portions 70 may be spaced apart, or adjacent fourth adhesion portions 70 are connected to each other (refer to FIG. 16). In some embodiments, as shown in FIG. 46, the housing 80 may be further provided with a groove 170', and a portion of the fourth adhesion portion 70 is located in the groove 170'.

Figure 47:
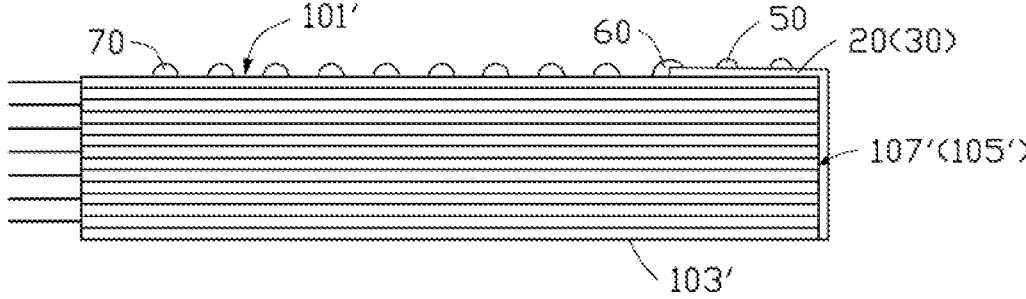
FIG. 47 is a side view of a battery according to an embodiment of this application.

Referring to FIG. 37, FIG. 45, and FIG. 47, each of the first insulation layer 20 and the second insulation layer 30 alternatively extends from the first surface 101' to the connection zone 105'. In this embodiment, the first insulation layer 20 and the second insulation layer 30 each extend from the first surface 101' to the second portion 107'. Further, each of the first insulation layer 20 and the second insulation layer 30 may alternatively extend from the second portion 107' to the second surface 103'. The first insulation layer 20 and the second insulation layer 30 are provided on the first surface 101' and may separate the electrode assembly 10' from the housing 80, thereby reducing contact between the electrode assembly 10' and the housing 80, reducing a possibility of damaging the housing 80 by the electrode assembly 10', and avoiding damage to the housing caused because an active substance falls off from a zone in which the electrode assembly 10' is integrated with the first insulation layer 20 and the second insulation layer 30. In addition, when the battery 100 is dropped, the first insulation layer 20 and the second insulation layer 30 may also serve as a buffer between the electrode assembly 10' and the housing 80, thereby reducing a possibility of damage to the housing 80 caused by a sharp point on a surface of the electrode assembly 10'. In addition, when the first insulation layer 20 and the second insulation layer 30 extend to the second portion 107' and even the second surface 103', the first insulation layer 20 and the second insulation layer 30 may also fasten the electrode assembly 10' and inhibit the electrode assembly 10' from falling loose.

Figure 48:
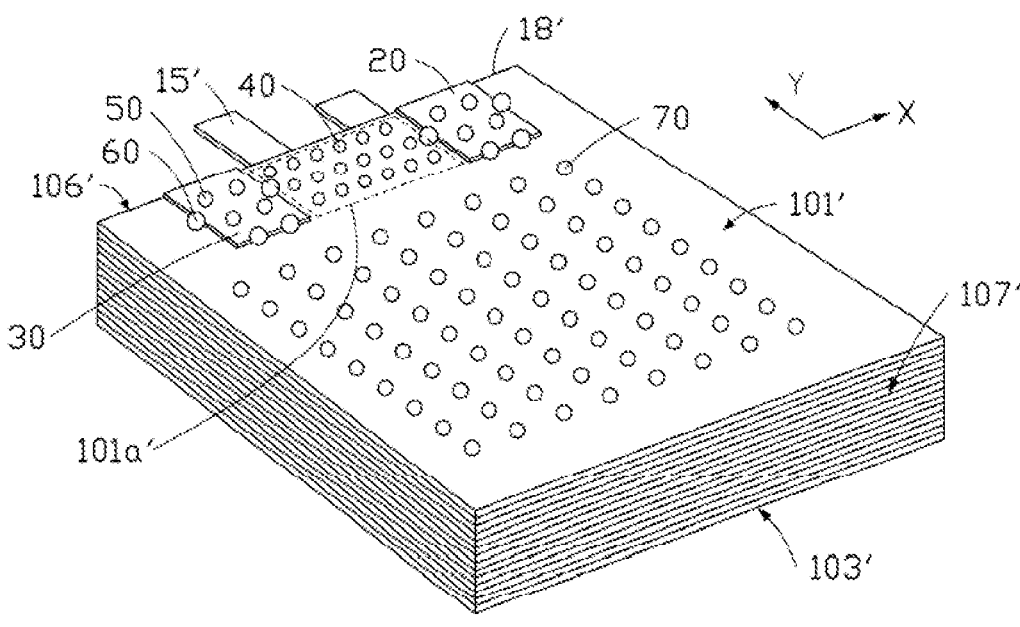
FIG. 48 is a schematic structural diagram of a battery according to an embodiment of this application.
Figure 49:
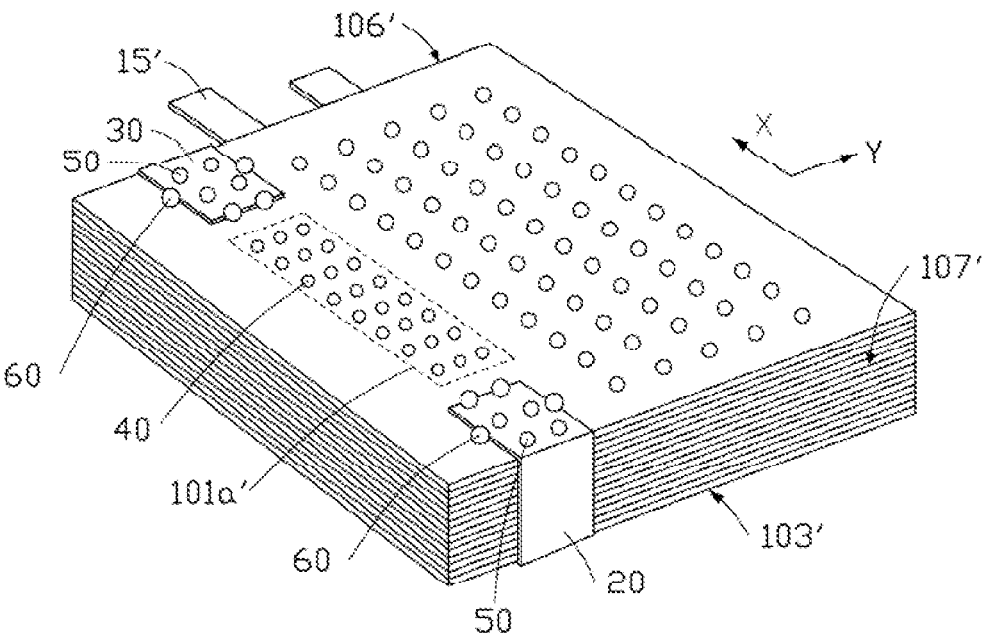
FIG. 49 is a schematic structural diagram of a battery according to an embodiment of this application.

In some embodiments, a location for providing the first insulation layer 20 and the second insulation layer 30 is not limited to the foregoing situation. For example, referring to FIG. 48 and FIG. 59, the first insulation layer 20 may alternatively extend from the first portion 106' to the first surface 101' but apart from the second portion 107', and the second insulation layer 30 may alternatively extend from the first portion 106' to the first surface 101' but apart from the second portion 107'. The first surface 101' and the first portion 106' intersect at the second edge 18'. Further, when viewed in the third direction Z, the first insulation layer 20 may extend from the second edge 18' to the second portion 107' along the first surface 101' but apart from the second portion 107'; and the second insulation layer 30 may extend from the second edge 18' to the second portion 107' along the first surface 101' but apart from the second portion 107'. For another example, referring to FIG. 49, the first insulation layer 20 extends from the second portion 107' to the first surface 101' but apart from the first portion 106', and the second insulation layer 30 extends from the first portion 106' to the first surface 101' but apart from the second portion 107'. In this case, the first direction X is perpendicular to a direction in which the second portion 107' is located.

Figure 50:
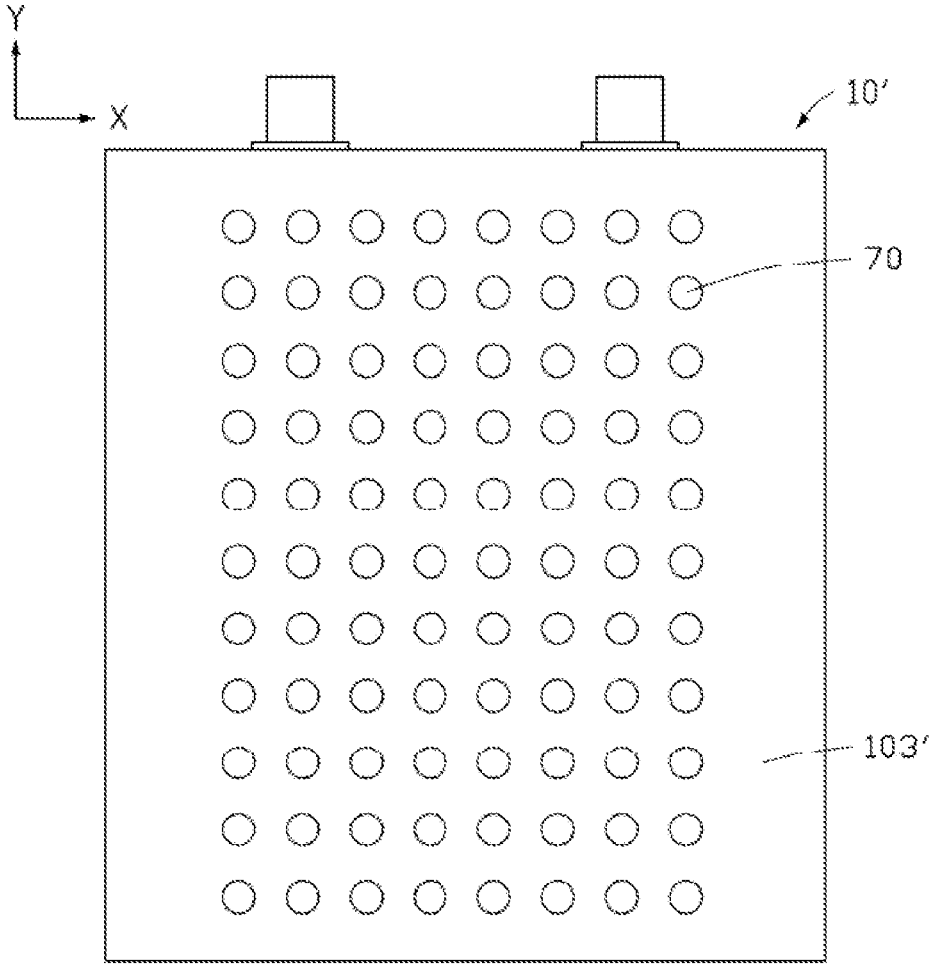
FIG. 50 is a bottom view of a battery according to an embodiment of this application.
Figure 51:
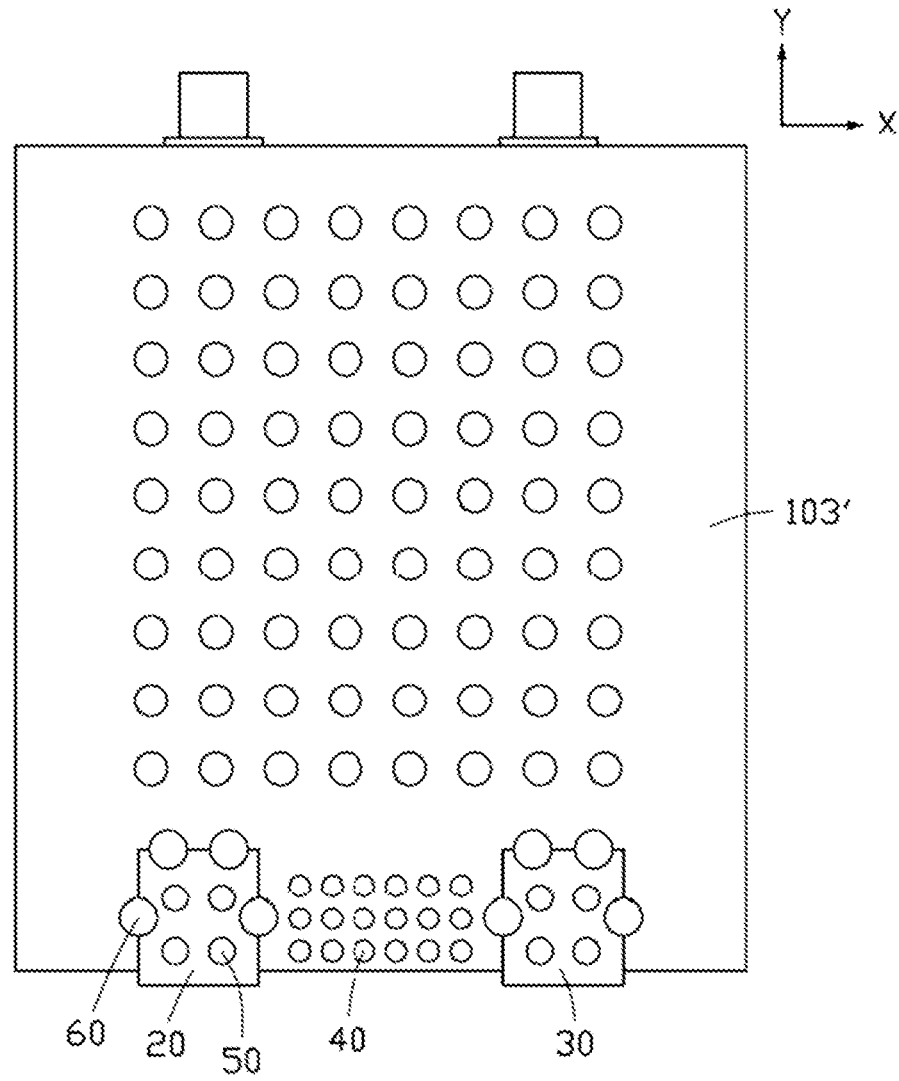
FIG. 51 is a bottom view of a battery according to an embodiment of this application.

In some embodiments, referring to FIG. 50 and FIG. 51, the fourth adhesion portion 70 may alternatively be provided on the second surface 103'. When the first insulation layer 20 and the second insulation layer 30 extend to the second surface 103', the first adhesion portion 40, the second adhesion portion 50, and the third adhesion portion 60 may also be provided corresponding to the first insulation layer 20 and the second insulation layer 30 on the second surface 103'.

Figure 52:
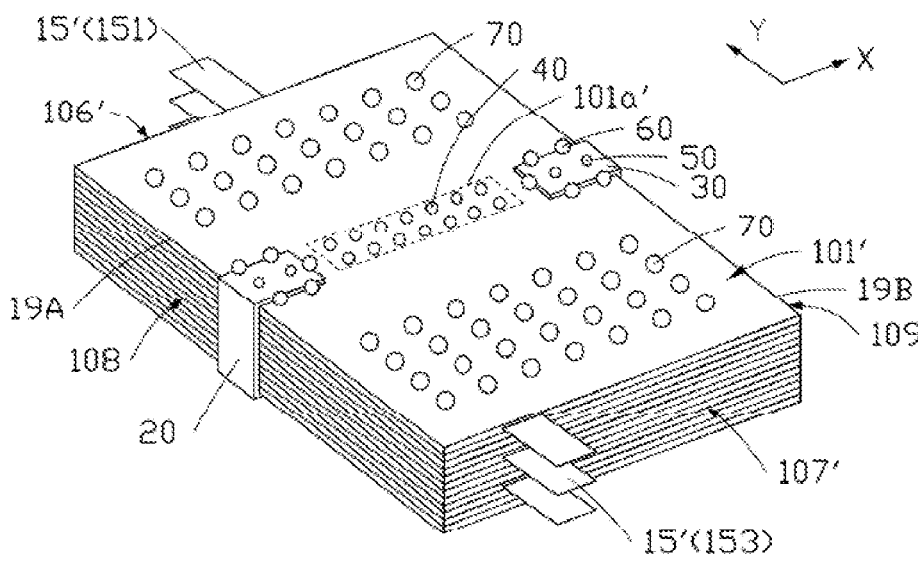
FIG. 52 is a schematic structural diagram of a battery according to an embodiment of this application.
Figure 53:
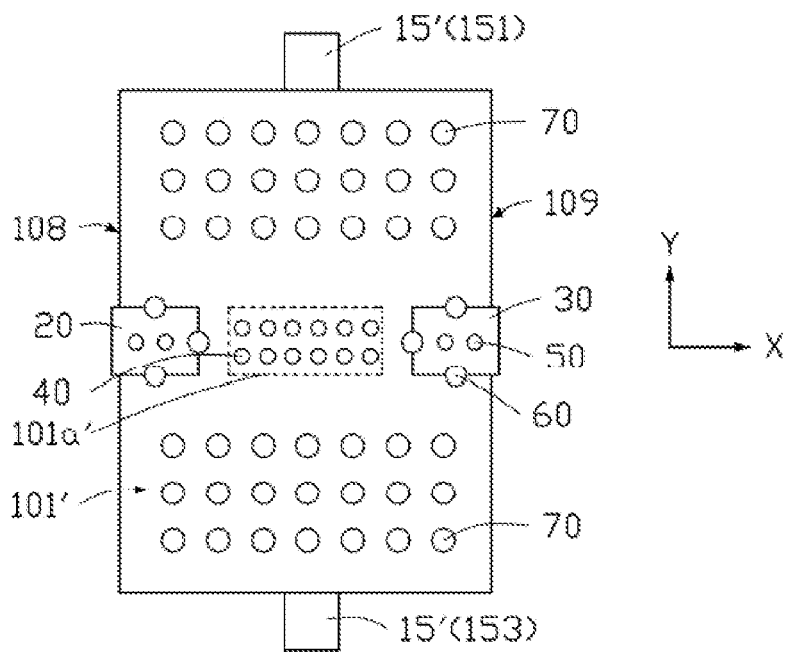
FIG. 53 is a schematic structural diagram of a battery according to an embodiment of this application.

In some embodiments, referring to FIG. 52 and FIG. 53, the first insulation layer 20 may alternatively extend from the third portion 108 to the first surface 101' but apart from the fourth portion 109, and the second insulation layer 30 may alternatively extend from the fourth portion 109 to the first surface 101' but apart from the third portion 108. The first surface 101' and the third portion 108 intersect at the third edge 19A, and the first surface 101' and the fourth portion 109 intersect at the fourth edge 19B. Further, when viewed in the third direction Z, the first insulation layer 20 may extend from the third edge 19A to the fourth portion 109 along the first surface 101' but apart from the fourth portion 109; and the second insulation layer 30 may extend from the fourth edge 19B to the third portion 108 along the first surface 101' but apart from the third portion 108.

Referring to FIG. 54A to FIG. 59, there may be one first insulation layer 20, or there may be a plurality of spaced first insulation layers 20, and a size of the first insulation layer 20 may be set as needed. There may be one second insulation layer 30, or there may be a plurality of spaced second insulation layer 30, and a size of the second insulation layer 30 may be set as needed. In some embodiments, the plurality of first insulation layers 20 and/or the plurality of second insulation layers 30 are all applicable to the electrode assembly 10 of a winding structure.

Figure 54A:
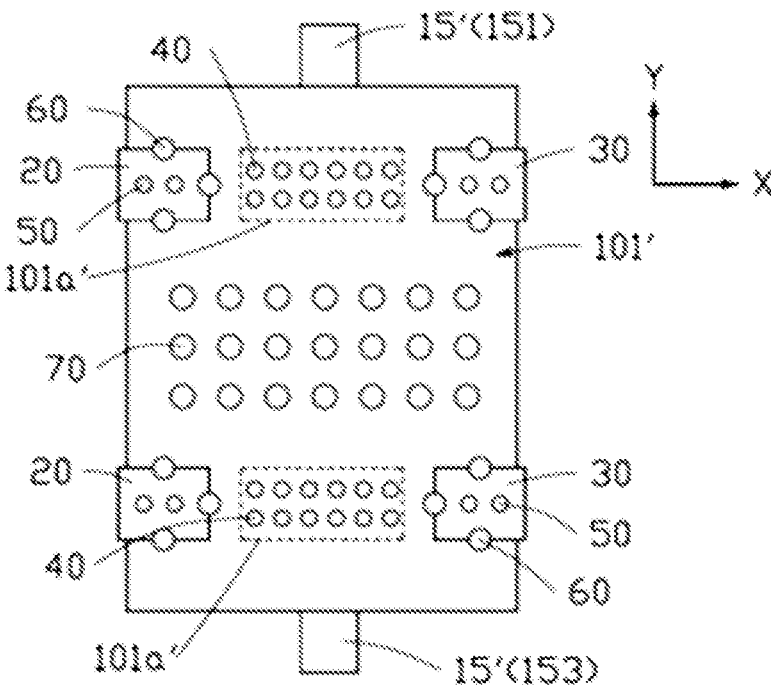
FIG. 54A is a schematic structural diagram of a battery according to an embodiment of this application.
Figure 54B:
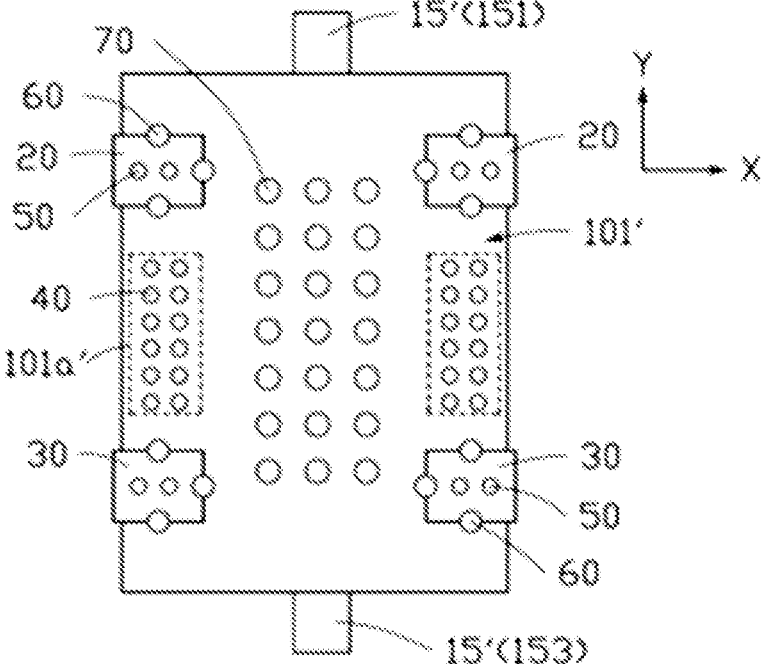
FIG. 54B is a schematic structural diagram of a battery according to an embodiment of this application.
Figure 55:
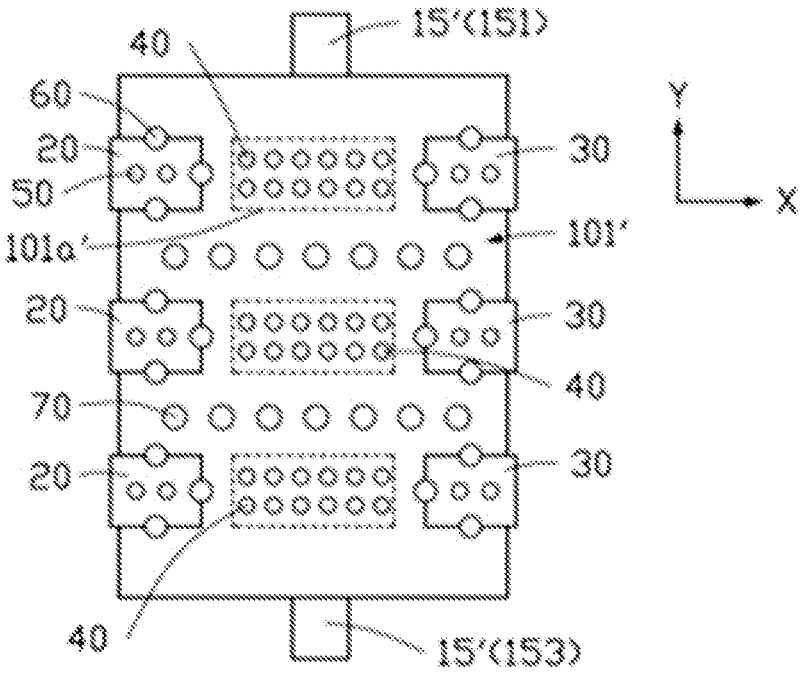
FIG. 55 is a schematic structural diagram of a battery according to an embodiment of this application.
Figure 56:
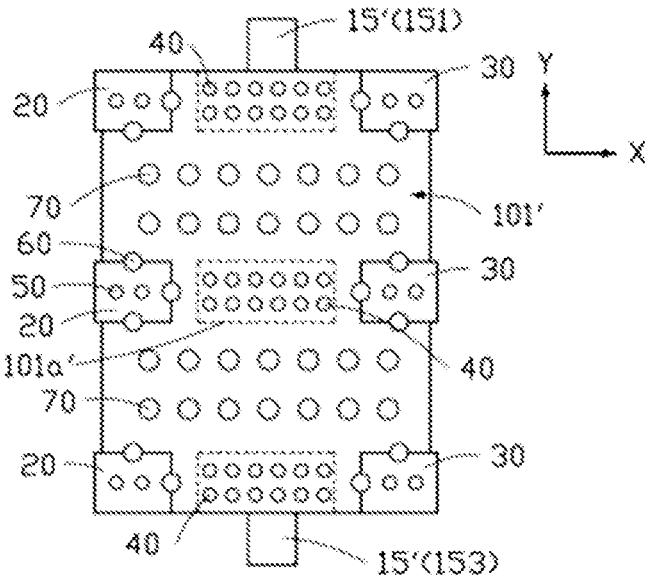
FIG. 56 is a schematic structural diagram of a battery according to an embodiment of this application.
Figure 57:
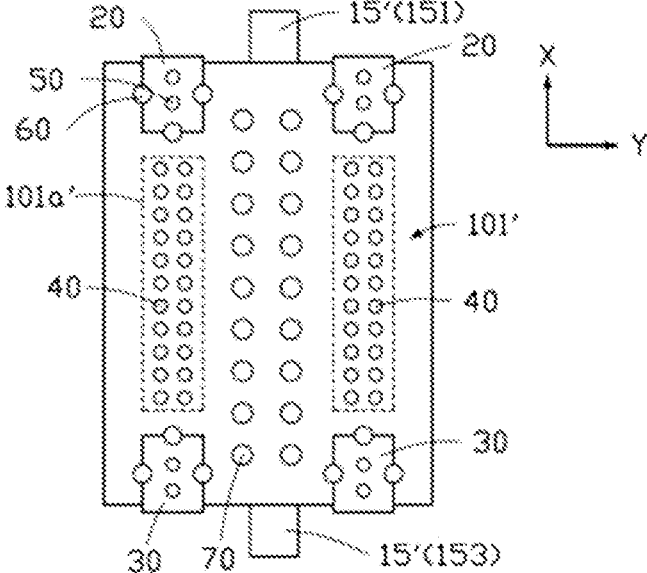
FIG. 57 is a schematic structural diagram of a battery according to an embodiment of this application.
Figure 58:
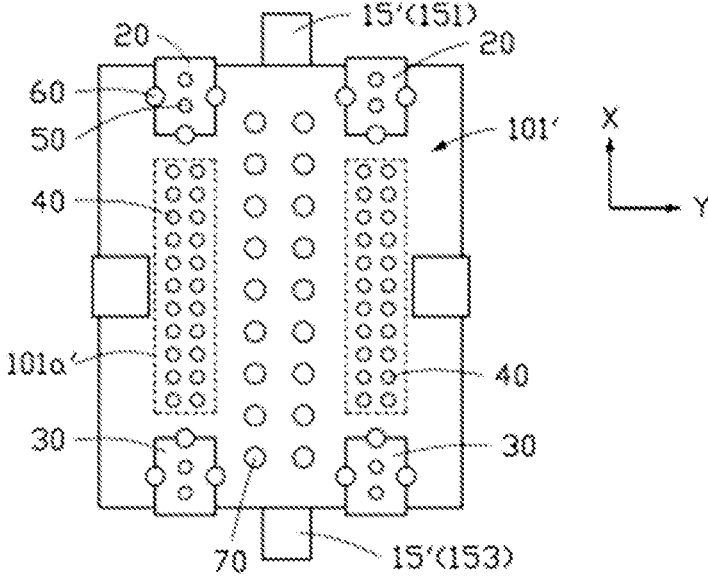
FIG. 58 is a schematic structural diagram of a battery according to an embodiment of this application.

As shown in FIG. 54B, one first insulation layer 20 and one second insulation layer 30 each may alternatively extend from the third portion 108 to the first surface 101' but do not reach the fourth portion 109. Another first insulation layer 20 and another second insulation layer 30 each may alternatively extend from the fourth portion 109 to the first surface 101' but do not reach the third portion 108.

Figure 59:
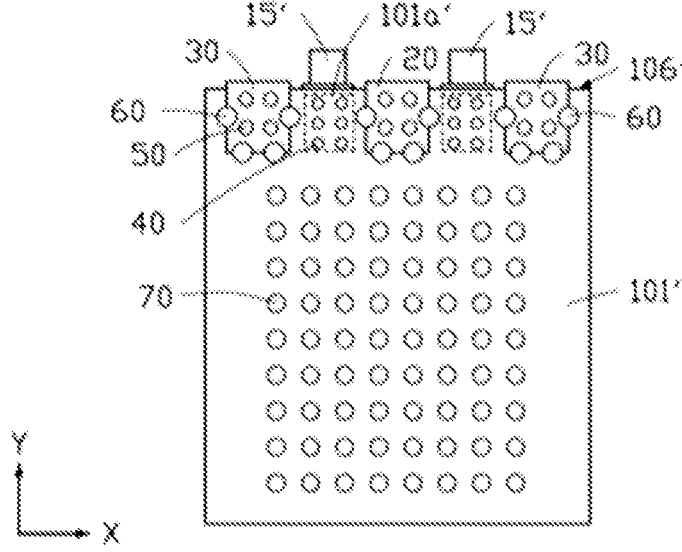
FIG. 59 is a schematic structural diagram of a battery according to an embodiment of this application.

As shown in FIG. 52 to FIG. 58, in some embodiments, the metal portion 15' includes a plurality of first metal portions 151 and a plurality of second metal portions 153. The first metal portion 151 is provided on the first portion 106', and the second metal portion 153 is provided on the second portion 107'. As shown in FIG. 59, in some embodiments, the first metal portion 151 and the second metal portion 153 may be provided and spaced apart on the second portion 107'. In some embodiments, the first metal portion 151 is provided on the first portion 106', and the second metal portion 153 is provided on the second portion 107', and both are applicable to the electrode assembly 10 of a winding structure.

Figure 60:
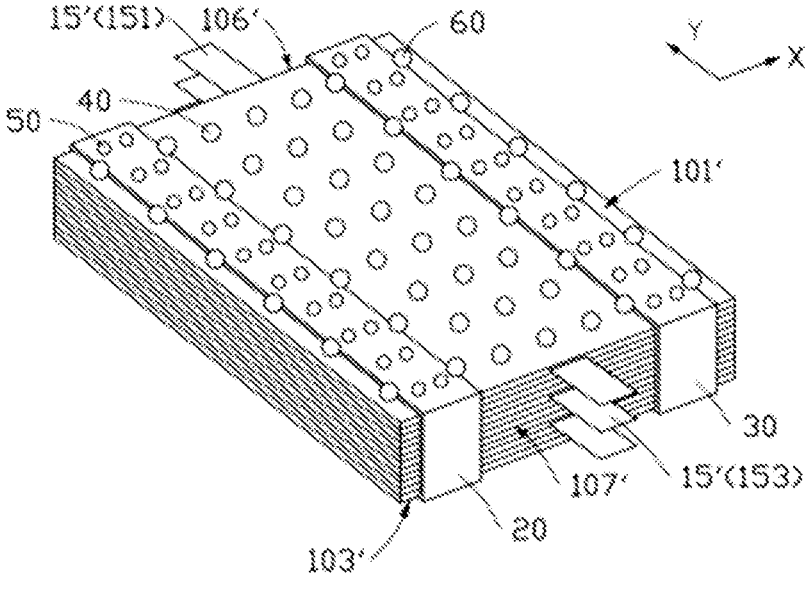
FIG. 60 is a schematic structural diagram of a battery according to an embodiment of this application.
Figure 61:
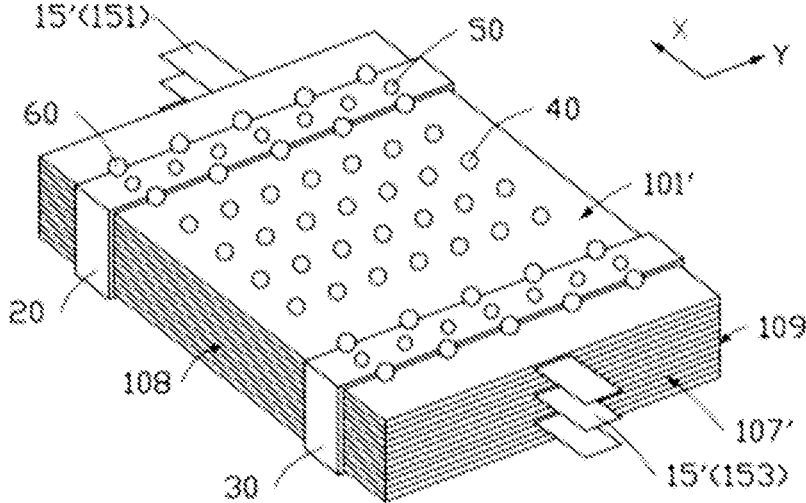
FIG. 61 is a schematic structural diagram of a battery according to an embodiment of this application.

In some embodiments, for example, referring to FIG. 60, the first insulation layer 20 may alternatively extend from the first portion 106' to the second portion 107' across the first surface 101', and the second insulation layer 30 may alternatively extend from the first portion 106' to the second portion 107' across the first surface 101'. Further, the first insulation layer 20 may alternatively extend from the first portion 106' to the second surface 103', and may alternatively extend from the second portion 107' to the second surface 103'; and the second insulation layer 30 may alternatively extend from the first portion 106' to the second surface 103', and may alternatively extend from the second portion 107' to the second surface 103'. Further, the first insulation layer 20 may alternatively be ring-shaped and the first surface 101', the first portion 106', the second surface 103', and the second portion 107' are sleeved with the first insulation layer 20; and the second insulation layer 30 may alternatively be ring-shaped and the first surface 101', the first portion 106', the second surface 103', and the second portion 107' are sleeved with the second insulation layer 30. For another example, referring to FIG. 61, the first insulation layer 20 may alternatively extend from the third portion 108 to the fourth portion 109 across the first surface 101', and the second insulation layer 30 may alternatively extend from the third portion 108 to the fourth portion 109 across the first surface 101'. Further, the first insulation layer 20 may alternatively extend from the third portion 108 to the second surface 103', and may alternatively extend from the fourth portion 109 to the second surface 103'; and the second insulation layer 30 may alternatively extend from the third portion 108 to the second surface 103', and may alternatively extend from the fourth portion 109 to the second surface 103'. Further, the first insulation layer 20 may alternatively be ring-shaped and the first surface 101', the third portion 108, the second surface 103', and the fourth portion 109 are sleeved with the first insulation layer 20; and the second insulation layer 30 may alternatively be ring-shaped and the first surface 101', the third portion 108, the second surface 103', and the fourth portion 109 are sleeved with the second insulation layer 30. In some embodiments, the first insulation layer 20 and the second insulation layer 30 in FIG. 60 are both applicable to the electrode assembly 10 of a winding structure.

In some embodiments, the battery assembly 10 is formed by stacking a plurality of stacked bodies 10E of different sizes along the third direction Z. For example, referring to FIG. 62 to FIG. 66, the battery assembly 10 is formed by sequentially stacking a first stacked body 10Ea, a second stacked body 10Eb, and a third stacked body 10Ec along the third direction Z whose sizes increase sequentially. When viewed in the third direction Z, it may be seen that a surface of the first stacked body 10Ea is the first surface 101', a portion of the second stacked body 10Eb uncovered by the first stacked body 10Ea is a first step face 102a, a portion of the third stacked body 10Ec uncovered by the second stacked body 10Eb is a second step face 102b, and a surface of the third stacked body 10Ec facing away from the first surface 101' is the second surface 103'. The connection zone 105' includes the first step face 102a and the second step face 102b.

Figure 62:
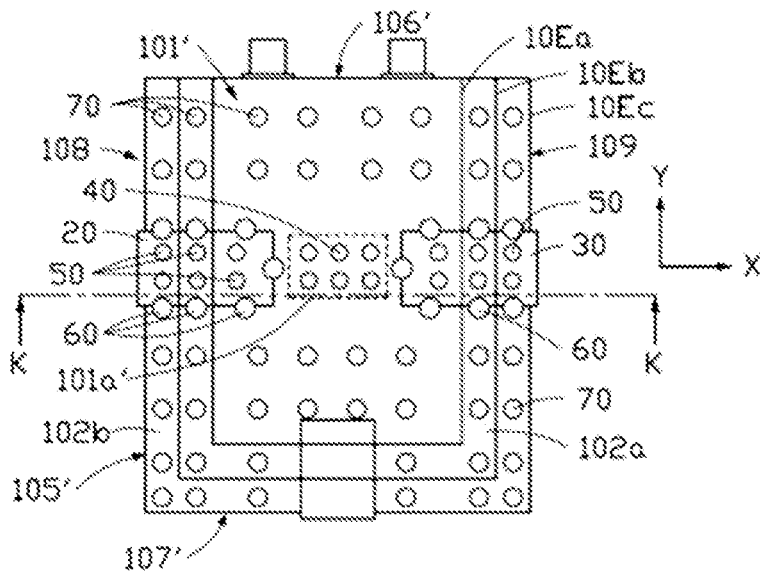
FIG. 62 is a schematic structural diagram of a battery according to an embodiment of this application.
Figure 64:
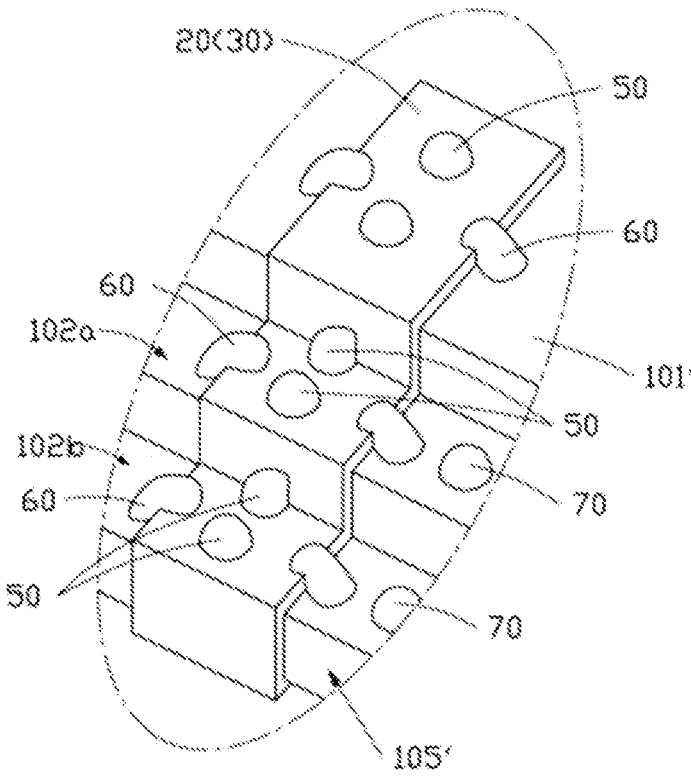
FIG. 64 is a partially enlarged schematic diagram of a battery according to an embodiment of this application.
Figure 65A:
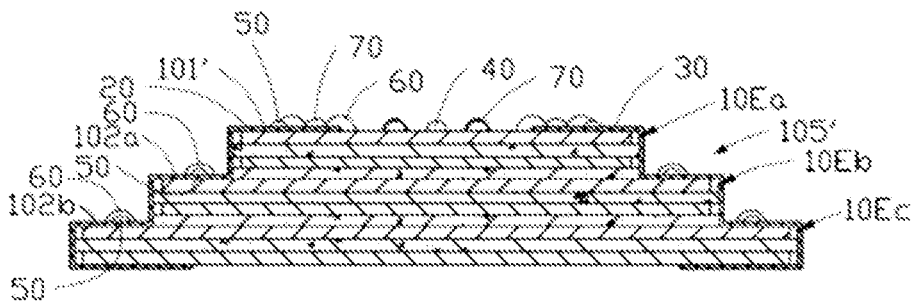
FIG. 65A is a schematic cross-sectional diagram of a battery in a K-K direction in FIG. 62 according to an embodiment of this application.
Figure 65B:
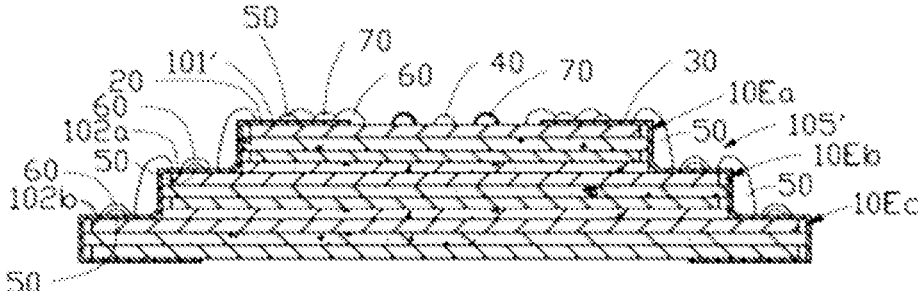
FIG. 65B is a schematic cross-sectional diagram of a battery according to an embodiment of this application.
Figure 66:
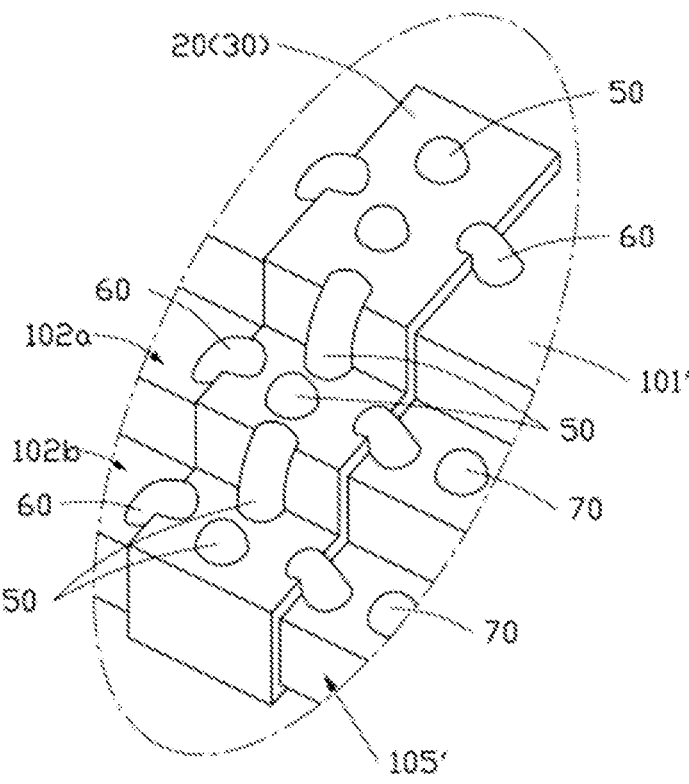
FIG. 66 is a partially enlarged schematic diagram of a battery according to an embodiment of this application.
Figure 67:
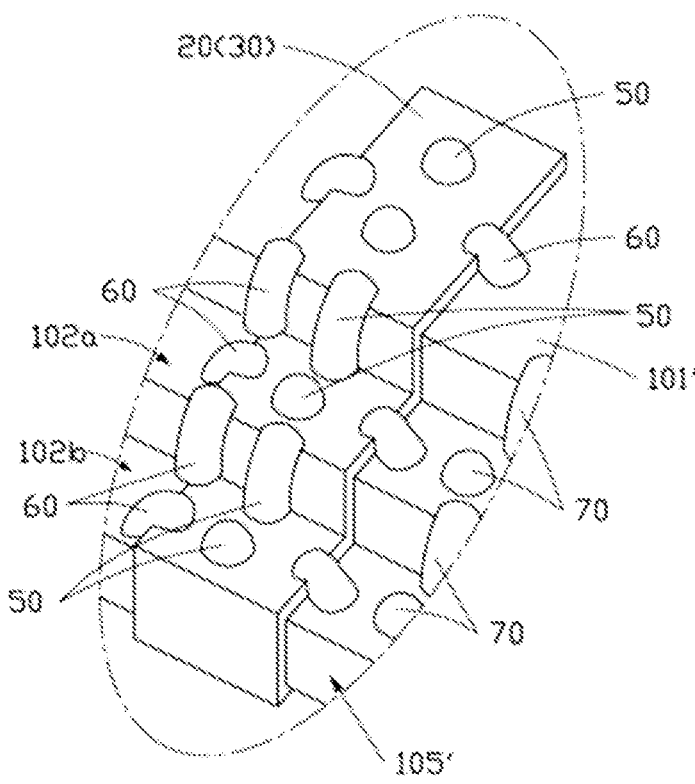
FIG. 67 is a partially enlarged schematic diagram of a battery according to an embodiment of this application.

In some embodiments, for example, referring to FIG. 62 and FIG. 65A, the first portion 106' is a surface provided along the direction Z. The second portion 107', the third portion 108, and the fourth portion 109 are step-shaped and respectively include a portion of the first step face 102a and a portion of the second step face 102b. The first insulation layer 20 is provided on the first surface 101' and may extend from the first surface 101' to the first step face 102a and the second step face 102b corresponding to the third portion 108. Further, the first insulation layer 20 may continue to extend from the second step face 102b corresponding to the third portion 108 to the second surface 103'. The second insulation layer 30 is provided on the first surface 101' and may extend from the first surface 101' to the first step face 102a and the second step face 102b corresponding to the fourth portion 109. Further, the second insulation layer 30 may continue to extend from the second step face 102b corresponding to the fourth portion 109 to the second surface 103'. As shown in FIG. 64 and FIG. 65A, none of the second adhesion portion 50, the third adhesion portion 60, and the fourth adhesion portion 70 provided corresponding to the first step face 102a extends beyond the first stacked body 10Ea in the direction Z, and none of the second adhesion portion 50, the third adhesion portion 60, and the fourth adhesion portion 70 provided corresponding to the second step face 102b extends beyond the second stacked body 10Eb in the direction Z. As shown in FIG. 65B and FIG. 66, there may be a second adhesion portion 50 that is provided corresponding to the first step face 102a and that extends to the first surface 101', or there may also be a second adhesion portion 50 that is provided corresponding to the second step face 102b and that extends to the first step face 102a, that is, there is the second adhesion portion 50 spanning two parallel surfaces to adhere to two adjacent stacked bodies, thereby improving structure stability of the electrode assembly. In another embodiment, there may also be a third adhesion portion 60 and/or a fourth adhesion portion 70 that is provided corresponding to the first step face 102a and that extends to the first surface 101', or there may be a third adhesion portion 60 and/or a fourth adhesion portion 70 that is provided corresponding to the second step face 102b and that extends to the first step face 102a, that is, there is the third adhesion portion 60 and/or the fourth adhesion portion 70 spanning two parallel surfaces. As shown in FIG. 67, there may be a second adhesion portion 50 that is provided corresponding to the first step face 102a and that extends to the first surface 101', a second adhesion portion 50 that is provided corresponding to the second step face 102b and that extends to the first step face 102a, a third adhesion portion 60 and a fourth adhesion portion 70 that are provided corresponding to the first step face 102a and that extend to the first surface 101', and a third adhesion portion 60 and a fourth adhesion portion 70 that are provided corresponding to the second step face 102b and that extend to the first step face 102a. The third adhesion portion 60 helps enhance firmness of adhesion between the insulation layer and the electrode assembly. In some embodiments, there may be one or any two of the second adhesion portion 50 that spans the two parallel surfaces, the third adhesion portion 60 that spans the two parallel surfaces, and the fourth adhesion portion 70 that spans the two parallel surfaces, which may be specifically set as required.

Figure 63:
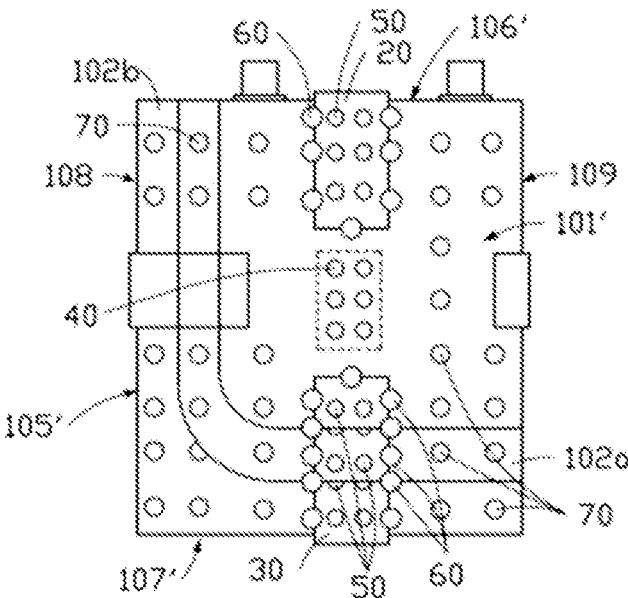
FIG. 63 is a schematic structural diagram of a battery according to an embodiment of this application.

For another example, referring to FIG. 63, the first portion 106' and the fourth portion 109 are surfaces provided along the direction Z. The second portion 107' and the third portion 108 are step-shaped and respectively include a portion of the first step face 102a and a portion of the second step face 102b. The first insulation layer 20 is provided on the first surface 101' and may extend from the first surface 101' to the first portion 106'. Further, the first insulation layer 20 may continue to extend from the first portion 106' to the second surface 103'. The second insulation layer 30 is provided on the first surface 101' and may extend from the first surface 101' to the first step face 102a and the second step face 102b corresponding to the second portion 107'. Further, the second insulation layer 30 may continue to extend from the second step face 102b corresponding to the second portion 107' to the second surface 103'. As shown in FIG. 64, none of the second adhesion portion 50, the third adhesion portion 60, and the fourth adhesion portion 70 provided corresponding to the first step face 102a extends beyond the first stacked body 10Ea in the direction Z, and none of the second adhesion portion 50, the third adhesion portion 60, and the fourth adhesion portion 70 provided corresponding to the second step face 102b extends beyond the second stacked body 10Eb in the direction Z.

The following provides further descriptions by using specific examples and comparative examples. Structures and models of the electrode assembly 10 used in examples and comparative examples are the same.

Comparative Example 1

Figure 28:
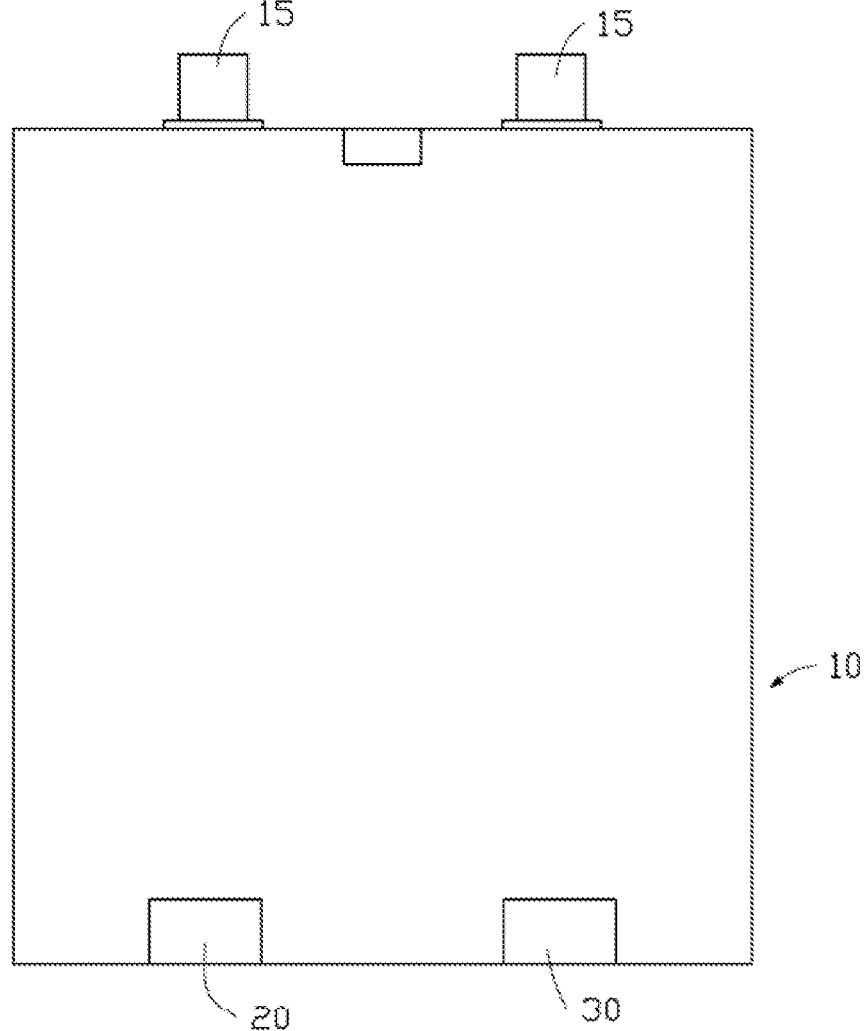
FIG. 28 is a schematic partial structural diagram of a battery according to Comparative Example 2 in this application.

Referring to FIG. 28, a surface of an electrode assembly was provided with no adhesion portion. A first insulation layer and a second insulation layer were provided on the electrode assembly. The first insulation layer and the second insulation layer respectively extended from a first surface to a second surface across a second portion to fasten the electrode assembly. A housing (aluminum-plastic film) accommodated the electrode assembly and was fastened to the electrode assembly through an adhesion portion. The battery was obtained after the electrolyte was injected and the housing was sealed. After the battery was subject to chemical conversion treatment and a standard charge and discharge process, the battery was subject to capacity activation, and finally preparation of the battery was completed after degassing treatment.

Comparative Example 2

Figure 29:
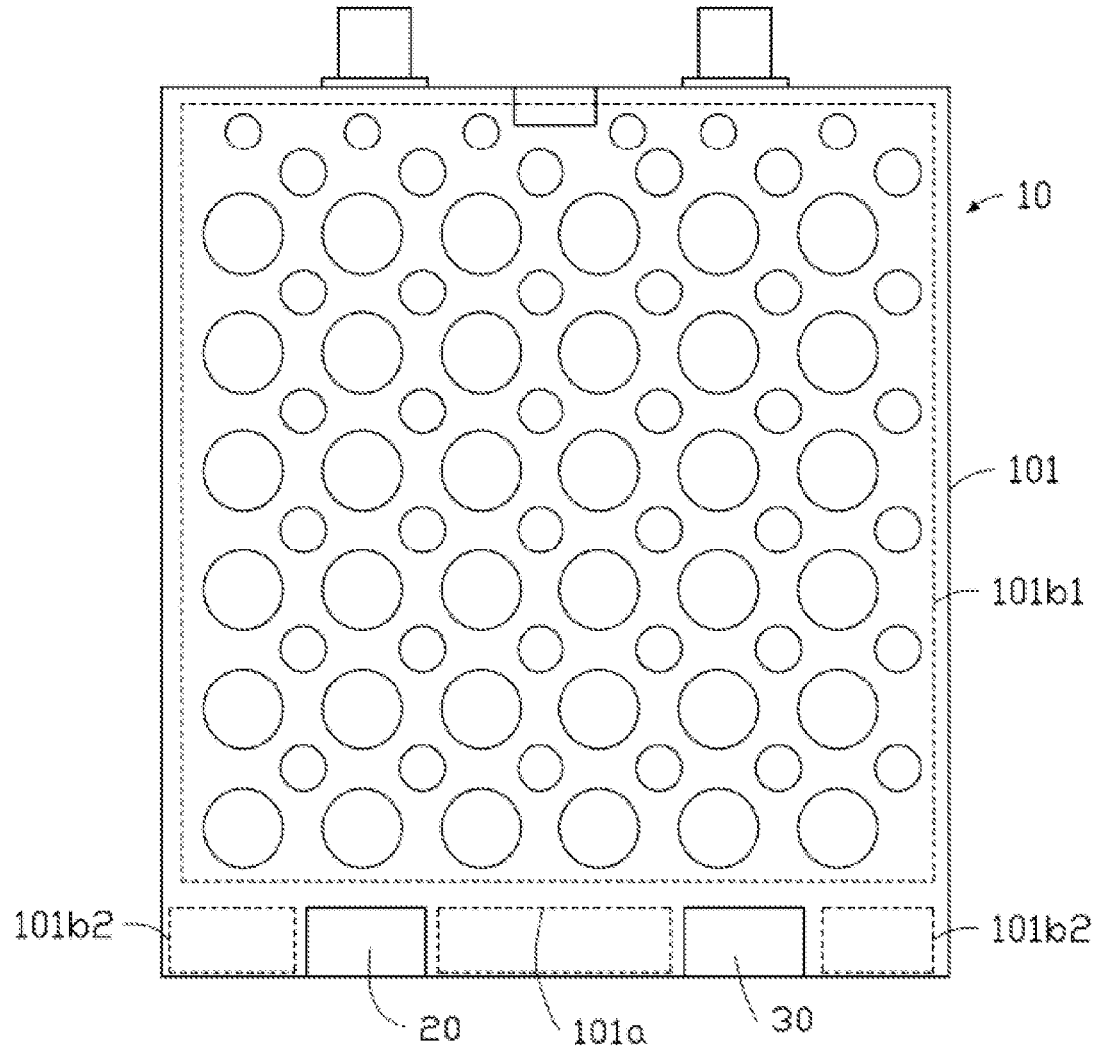
FIG. 29 is a schematic partial structural diagram of a battery according to Comparative Example 3 in this application.

Referring to FIG. 29, a difference between Comparative Example 2 and Comparative Example 1 was that an adhesion portion was provided in a first zone on a side of the first insulation layer and the second insulation layer that faced away from a second portion on the first surface of the electrode assembly.

Example 1

Figure 30:
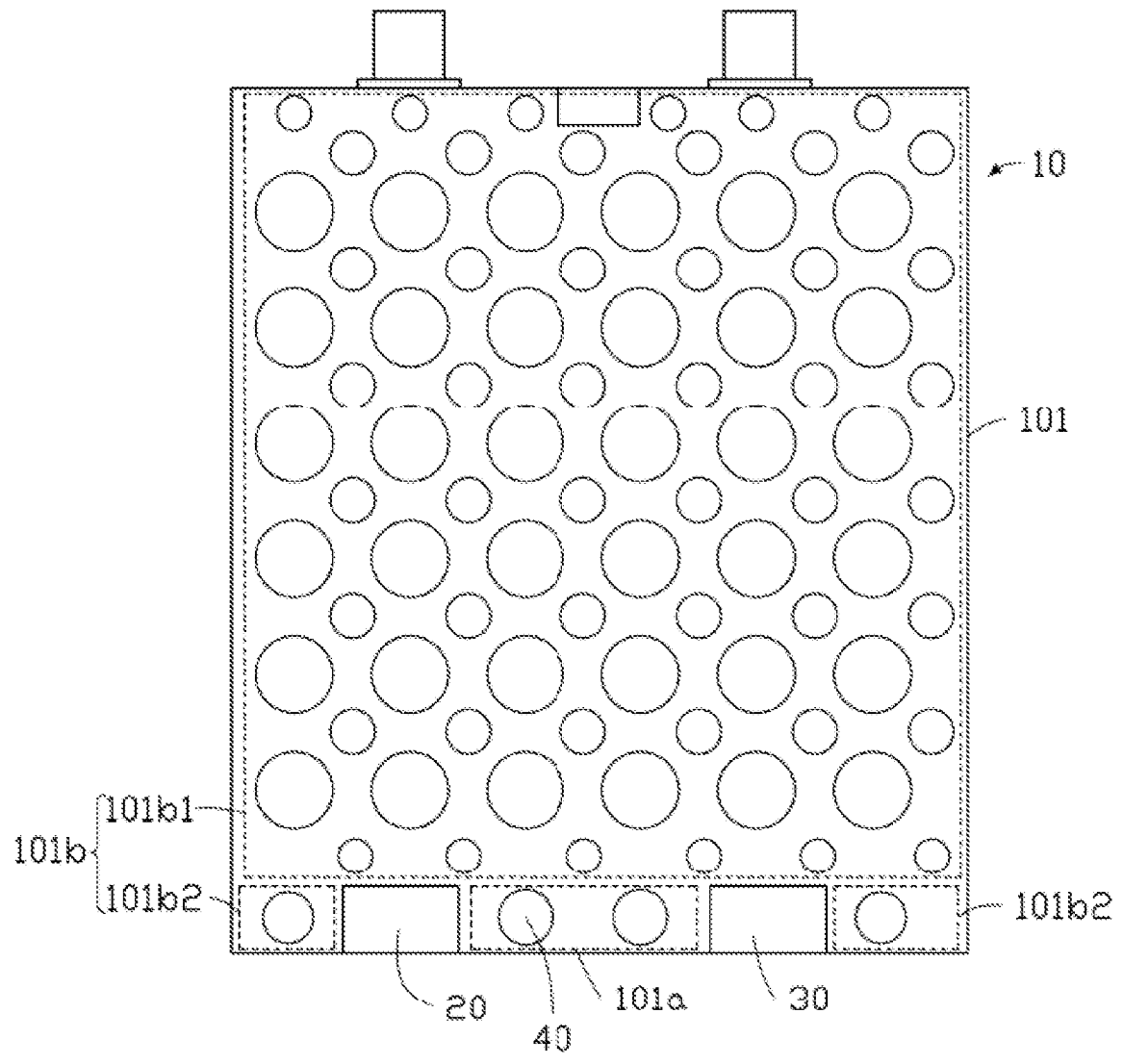
FIG. 30 is a schematic partial structural diagram of a battery according to Example 1 in this application.

Referring to FIG. 30, a difference between Example 1 and Comparative Example 2 was that an adhesion portion was also provided in a second zone on the first surface of the electrode assembly in addition to a zone in which each of the first insulation layer and the second insulation layer was provided and the first zone, that is, the second zone included a zone between the first insulation layer and the second insulation layer, a zone on a side of the first insulation layer away from the second insulation layer, and a zone on a side of the second insulation layer away from the first insulation layer.

Example 2

Figure 31:
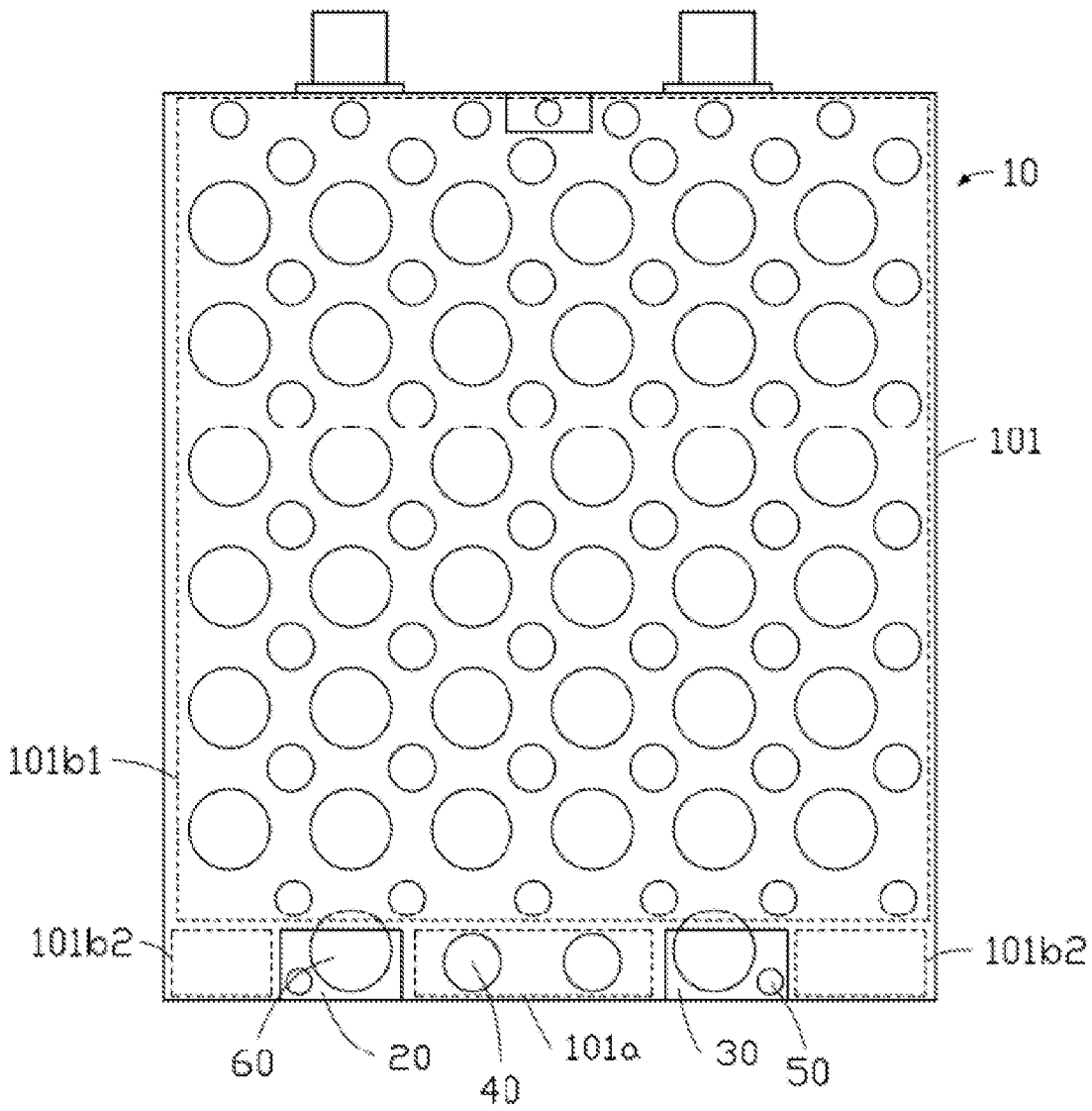
FIG. 31 is a schematic partial structural diagram of a battery according to Example 2 in this application.

Referring to FIG. 31, a difference between Example 2 and Example 1 was that an adhesion portion was also provided in an intersection zone of a surface of the first insulation layer away from the first surface and the first surface, the surface of the first insulation layer away from the first surface, an intersection zone of a surface of the second insulation layer away from the first surface and the first surface, and the surface of the second insulation layer away from the first surface.

Example 3

Figure 32:
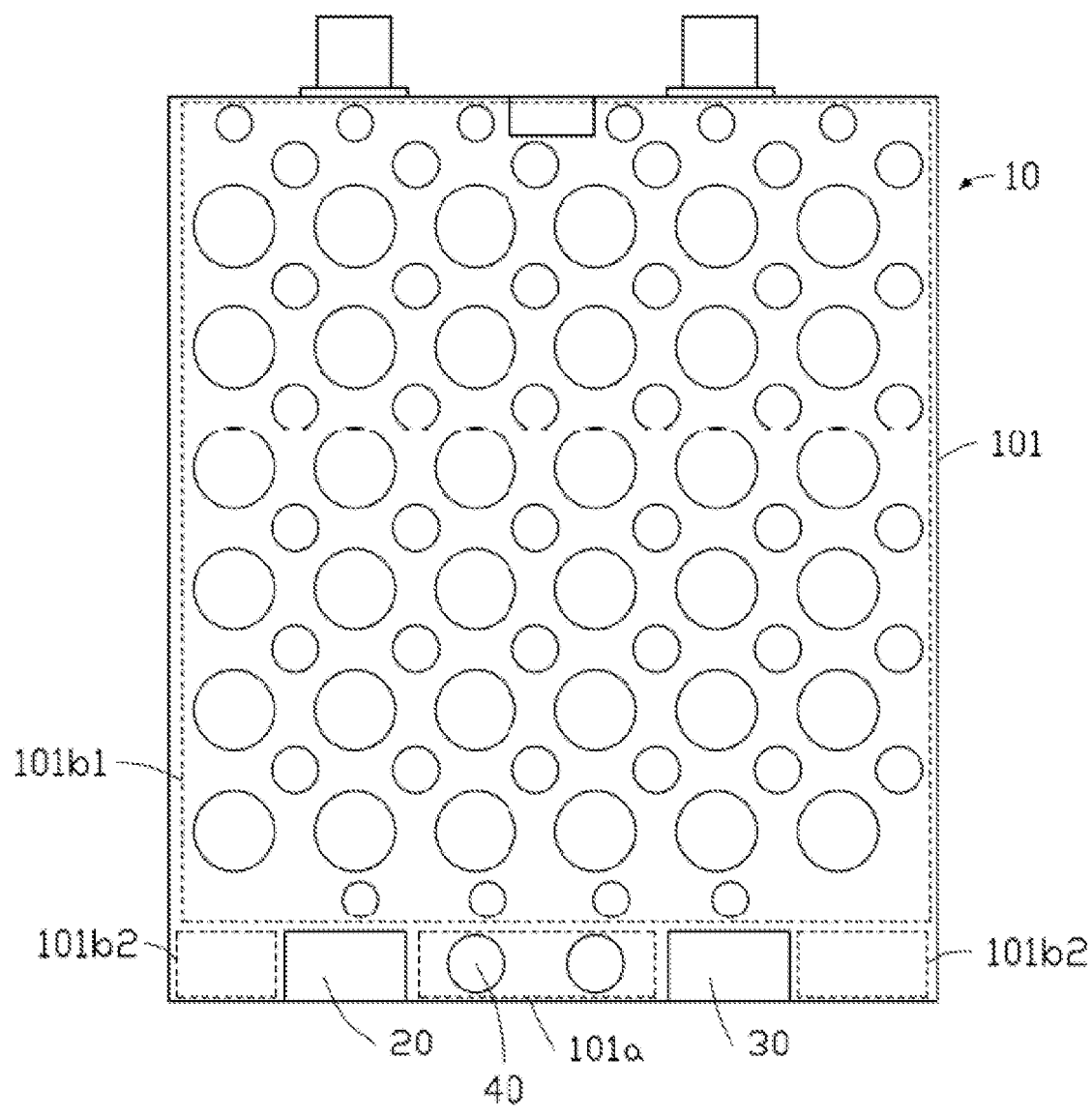
FIG. 32 is a schematic partial structural diagram of a battery according to Example 3 in this application.

Referring to FIG. 32, a difference between Example 3 and Comparative Example 2 was that an adhesion portion was further provided in a zone, on the first surface of the electrode assembly, between the first insulation layer and the second insulation layer.

Example 4

Figure 33:
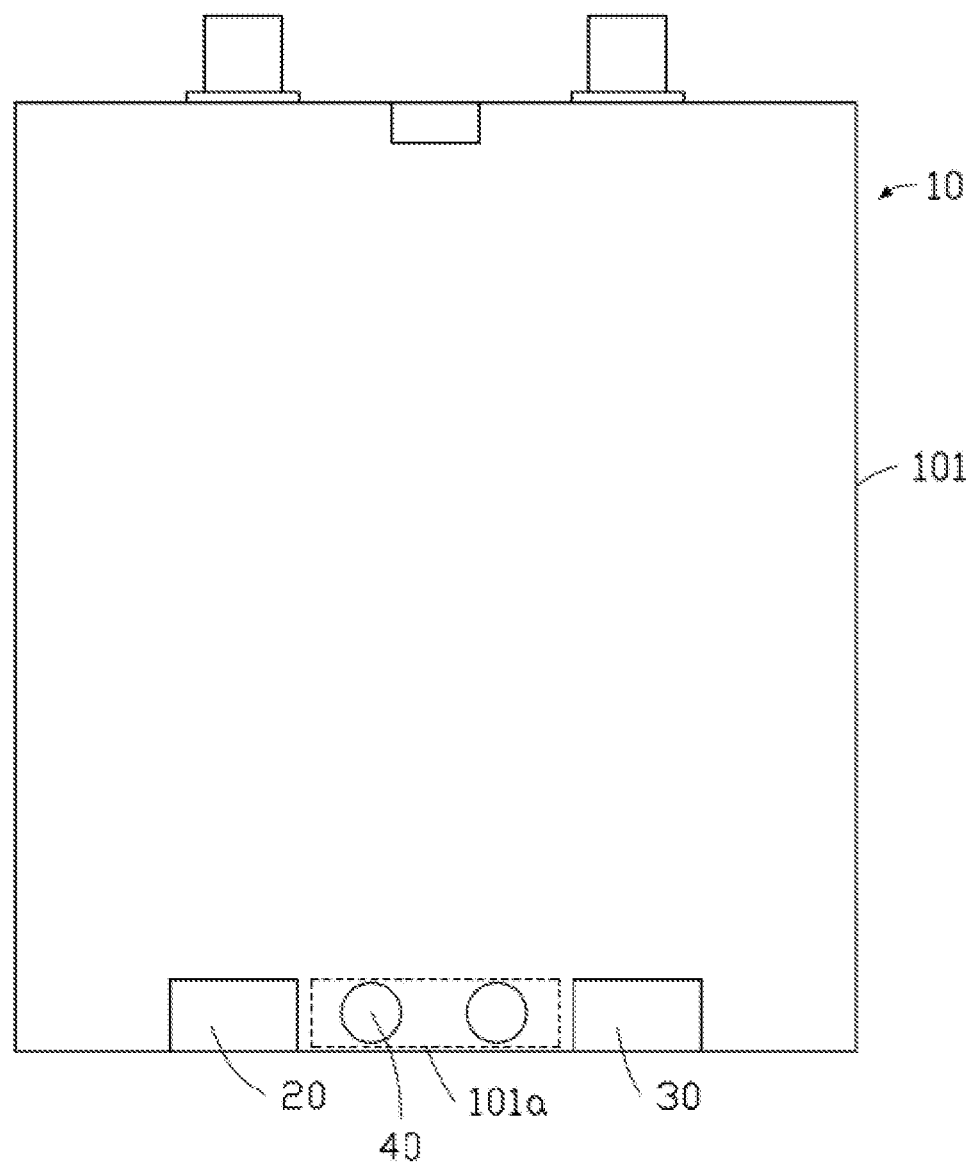
FIG. 33 is a schematic partial structural diagram of a battery according to Example 4 in this application.

Referring to FIG. 33, a difference between Example 4 and Comparative Example 1 was that an adhesion portion was only provided in a zone, on the first surface of the electrode assembly, between the first insulation layer and the second insulation layer.

Figure 34:
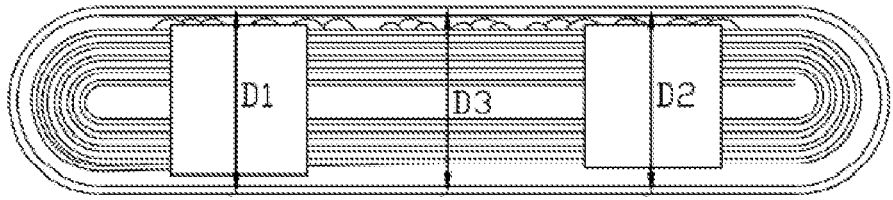
FIG. 34 is a schematic structural diagram of a battery according to an example of this application.

The batteries in Comparative Examples 1 and 2 and Examples 1 to 4 were charged with a current of 0.2 C at room temperature, and thicknesses of the batteries were measured after full charging; then the batteries were discharged to a cut-off voltage, and then the batteries were charged to a limit voltage with a current of 0.8 C at a constant current and a constant voltage, and then thicknesses of zones of the batteries were measured and used as initial thicknesses (herein, referring to FIG. 34, a thickness D1 of a zone of the battery in which the first insulation layer was provided or a thickness D2 of a zone of the battery in which the second insulation layer was provided, and a thickness D3 of a zone of the battery between the first insulation layer and the second insulation layer; measured zones of batteries that were provided with no first insulation layer and second insulation layer in Comparative Example 1 were corresponding to measured zones of batteries that were provided with the first insulation layer and the second insulation layer in examples/comparative examples), and a difference between D3 and D1 or a difference □ΔD between D3 and D2 was calculated and recorded in Table 1 below. Then the batteries were cyclically charged and discharged 700 times with 0.8 C/1 C, and after 700 cycles, the thicknesses of the foregoing zones were measured again, that is, the thicknesses after the cycles, and the difference between D3 and D1 or the difference □ΔD between D3 and D2 was calculated and recorded in Table 1 below.

TABLE 1

| | Parameter | | | | |
|---|---|---|---|---|---|
| | Initial thickness | | $\square$AD (µm) | Thickness after cycling | | $\square$AD (µm) |
| Group | D1 or D2 (µm) | D3 (µm) | corresponding to initial thicknesses | D1 or D2 (µm) | D3 (µm) | corresponding to thicknesses after cycling |
| Comparative Example 1 | 4300 | 4300 | 0 | 4560 | 4826 | 266 |
| Comparative Example 2 | 4300 | 4300 | 0 | 4547 | 4839 | 292 |
| Example 1 | 4300 | 4300 | 0 | 4552 | 4573 | 21 |
| Example 2 | 4300 | 4300 | 0 | 4588 | 4641 | 53 |
| Example 3 | 4300 | 4300 | 0 | 4558 | 4580 | 22 |
| Example 4 | 4300 | 4300 | 0 | 4550 | 4597 | 47 |

It could be seen from the foregoing data that the first insulation layer and the second insulation layer may suppress swelling of the battery. After the battery was cyclically charged and discharged, a deformation amount of a battery with the adhesion portion provided between the first insulation layer and the second insulation layer was significantly less than a deformation amount of the battery with no adhesion portion provided between the first insulation layer and the second insulation layer.

The two back-away surfaces that connected the first portion (that is, a head) to the second portion (that is, a bottom) in the connection zone of the electrode assembly were defined as the third portion and the fourth portion respectively. After the batteries in Comparative Examples 1 and 2 and Examples 1 to 4 were charged to the limit voltage with a current of 0.2 C at room temperature, the batteries were subject to a drop test, and details were: The battery was fastened in a battery-dedicated drop test box with a dedicated adhesive, a robot arm grabbed the drop test box containing the battery and released the drop test box to drop the battery onto a marble slab at a height of 1.8 m in a preset drop method, the preset drop method was six rounds of dropping in a sequence of the first surface facing down the second surface facing down the first portion facing down the third portion facing down the second portion facing down the fourth portion facing down. After each round of dropping, it was observed whether the surface of the battery (that is, the aluminum-plastic film) was damaged, and an open-circuit voltage of the battery was measured. If the open-circuit voltage of the battery was less than 3.0V, the battery failed. If the surface of the battery, that is, the aluminum-plastic film, was damaged, the battery was also determined to fail. In each group of comparative examples or examples, 5 batteries were tested in each round and an average was selected. The number of drop rounds when each battery failed, a failure reason, and a damage status of the battery during failure were recorded in Table 2.

TABLE 2

| | Parameter | | | | | |
|---|---|---|---|---|---|---|
| Group | Number of drop rounds when each battery failed | | | | | Damage status of battery |
| Comparative Example 1 | 26 | 26 | 24 | 26 | 24 | An electrode assembly was damaged |
| Comparative Example 2 | 44 | 42 | 42 | 44 | 44 | A zone of an electrode assembly corresponding to a first insulation layer and a second insulation layer was damaged |

TABLE 2-continued

| | Parameter | | | | | |
|---|---|---|---|---|---|---|
| Group | Number of drop rounds when each battery failed | | | | | Damage status of battery |
| Example 1 | 56 | 57 | 59 | 57 | 57 | No damage to an electrode assembly |
| Example 2 | 59 | 57 | 60 | 55 | 59 | No damage to an electrode assembly |
| Example 3 | 50 | 51 | 51 | 49 | 49 | No damage to an electrode assembly |
| Example 4 | 49 | 48 | 50 | 49 | 49 | Electrode assembly was slightly damaged |

It may be seen from the foregoing data that provision of the adhesion portion in the zone between the first insulation layer and the second insulation layer better helped alleviate drop failure of the battery compared with no provision of the adhesion portion, which better helped improve safety of the battery. The provision of the first insulation layer and the second insulation layer, and the adhesion portion could alleviate the drop failure of the battery, which helped improve safety of the battery.

Based on the battery according to this application, the first insulation layer and the second insulation layer are provided on the surface of the electrode assembly, and the first adhesion portion is provided between the first insulation layer and the second insulation layer. When the housing encloses the electrode assembly, the first adhesion portion adheres to the electrode assembly and the housing, to help reduce the damage caused by the electrode assembly to the housing and help protect the electrode assembly when the battery is subject to an external force, thereby improving the safety of the battery and prolonging the service life of the battery.

In addition, a person of ordinary skill in the art may make various other corresponding changes and modifications according to the technical concept of this application, and all such changes and modifications should fall within the protection scope of this application.

What is claimed is:

1. A battery, comprising:
an electrode assembly, a first layer and a first adhesion portion;
the electrode assembly comprising a first surface, a second surface opposite to the first surface in a third direction, a third end of the electrode assembly and a fourth end of the electrode assembly opposite to the third end of the electrode assembly in a second direction, wherein a metal portion extends from the third end of the electrode assembly;
the first layer is provided on the fourth end of the electrode assembly and extends from the first surface to the second surface; and
the first adhesion portion is provided on the first surface of the electrode assembly, the first adhesion portion overlaps with the first layer as viewed from a first direction and at least a part of the first adhesion portion is spaced apart from the first layer in the first direction, wherein the first direction is perpendicular to the second direction;
wherein the battery further comprises a second adhesion portion provided on the first layer; the first layer being disposed between the second adhesion portion and the first surface of the electrode assembly.

2. The battery according to claim 1, further comprising a second layer provided on the fourth end of the electrode assembly and spaced apart from the first layer in the first direction and extending from the first surface to the second surface.

3. The battery according to claim 2, wherein the first adhesion portion is provided on the first surface and is located between the first layer and the second layer in the first direction.

4. The battery according to claim 1, wherein the battery comprises two or more first adhesion portions, and the two or more first adhesion portions are arranged into a dot array.

5. The battery according to claim 1, wherein an area of an orthographic projection of the second adhesion portion onto the first surface is smaller than an area of an orthographic projection of the first layer onto the first surface.

6. The battery according to claim 1, wherein the battery comprises at least two second adhesion portions, and the at least two second adhesion portions are arranged into a dot array.

7. The battery according to claim 1, wherein the first layer comprises at least one of polyimide, polyvinyl chloride, polyethylene, or polypropylene.

8. The battery according to claim 1, wherein the first adhesion portion comprises at least one of cellulose, poly (vinylidene fluoride-co-hexafluoropropylene), poly(vinylidene fluoride-co-trichloroethylene), polymethyl methacrylate, poly butyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, or polypropylene-maleic anhydride.

9. The battery according to claim 2, wherein an area of an orthographic projection of the first adhesion portion onto the first surface is smaller than a total area of an orthographic projection of the first layer and the second layer onto the first surface.

10. The battery according to claim 9, wherein the area of the orthographic projection of the first adhesion portion onto the first surface is smaller than an area of an orthographic projection of the first layer onto the first surface, and is smaller than an area of an orthographic projection of the second layer onto the first surface.

11. The battery according to claim 2, wherein a distance from a part of the first surface in which the first surface is in contact with the first layer to the second surface in the third direction is a first distance, a distance from the first adhesion portion to the second surface in the third direction is a second distance, and the first distance is shorter than the second distance.

12. The battery according to claim 11, wherein a distance from a part of the first surface in which the first surface is in contact with the second layer to the second surface in the third direction is a third distance, and the third distance is shorter than the second distance.

13. The battery according to claim 1, wherein a length of the first adhesion portion in the first direction is smaller than a half of a length of the first surface in the first direction.

14. The battery according to claim 1, wherein the first surface is provided with a first groove, and at least a part of the first adhesion portion is located in the first groove.

15. The battery according to claim 14, wherein a surface of the first layer is provided with a second groove, and at least a part of the second adhesion portion is located in the second groove.

16. The battery according to claim 1, wherein the battery further comprises a third adhesion portion provided on a surface of the first layer facing away from the second surface, and the third adhesion portion extends from the surface of the first layer to the first surface.

17. The battery according to claim 1, wherein the battery further comprises a plurality of fourth adhesion portions provided on the first surface, the plurality of fourth adhesion portions being provided between the third end of the electrode assembly and the fourth end of the electrode assembly.

18. The battery according to claim 17, wherein the electrode assembly comprises at least two fourth adhesion portions with different orthographic projection shapes.

19. The battery according to claim 17, wherein the electrode assembly comprises at least two fourth adhesion portions, and the fourth adhesion portions are arranged into a dot array.

20. The battery according to claim 1, wherein,
the electrode assembly is of a winding structure;
the electrode assembly further comprises a third layer; and
the third layer is provided on the second surface and fastened to an end of an outermost electrode plate of the electrode assembly.

21. The battery according to claim 2, wherein the battery further comprises a housing, and the housing encloses the electrode assembly, the first layer, and the second layer, and adheres to the electrode assembly through the first adhesion portion.

22. The battery according to claim 1 further comprises two or more second adhesion portions provided on a surface of first layer facing away from the first surface.

23. The battery according to claim 22, wherein for each of the two or more second adhesion portions, an area of an orthographic projection of the second adhesion portion onto the first surface is smaller than an area of an orthographic projection of the first layer onto the first surface.

24. The battery according to claim 22, wherein an area of an orthographic projection of the second adhesion portions onto the first surface is smaller than an area of an orthographic projection of the first layer onto the first surface.

25. The battery according to claim 22, wherein the surface of the first layer is provided with two or more second grooves, wherein each second groove is provided with one of the at least two or more second adhesion portions.

26. An electronic device, comprising the battery according to claim 1.

* * * * *